US012521296B2

(12) United States Patent
Kemper et al.

(10) Patent No.: US 12,521,296 B2
(45) Date of Patent: Jan. 13, 2026

(54) USER INTERFACE AND FEEDBACK SYSTEMS AND METHODS FOR A MOBILE ROBOT

(71) Applicant: ROAM ROBOTICS INC., San Francisco, CA (US)

(72) Inventors: Kevin Conrad Kemper, San Francisco, CA (US); Kyle Kaveny, San Francisco, CA (US); Kyle Motter, Fort Myers, FL (US); Robert Stuart, Arcata, CA (US); Aaron Peck, Minneapolis, MN (US); Kris Li, San Francisco, CA (US); Linus Park, Pacifica, CA (US); Ashley Swartz, Daly City, CA (US); Timothy Alan Swift, Walnut Creek, CA (US)

(73) Assignee: ROAM ROBOTICS INC., San Francisco, CA (US)

( * ) Notice: Subject to any disclaimer, the term of this patent is extended or adjusted under 35 U.S.C. 154(b) by 358 days.

(21) Appl. No.: 17/332,172

(22) Filed: May 27, 2021

(65) Prior Publication Data
US 2021/0369540 A1    Dec. 2, 2021

Related U.S. Application Data

(60) Provisional application No. 63/058,825, filed on Jul. 30, 2020, provisional application No. 63/030,586, filed on May 27, 2020.

(51) Int. Cl.
*A61H 3/00* (2006.01)
*A61H 1/02* (2006.01)
(Continued)

(52) U.S. Cl.
CPC .............. *A61H 3/00* (2013.01); *A61H 1/024* (2013.01); *B25J 9/0006* (2013.01); *B25J 9/1602* (2013.01);
(Continued)

(58) Field of Classification Search
CPC . B25J 9/0006; B25J 9/1602; A61H 3/00–068; A61H 2003/001–065;
(Continued)

(56) References Cited

U.S. PATENT DOCUMENTS

| 440,684 A | 11/1890 | Yagn |
| 3,503,634 A | 3/1970 | Georges |

(Continued)

FOREIGN PATENT DOCUMENTS

| CN | 1693036 A | 11/2005 |
| CN | 101151071 A | 3/2008 |

(Continued)

OTHER PUBLICATIONS

Chinese Patent Office Notification to Grant Patent Right for Invention dated Nov. 4, 2022; Application No. 201880023218.5; 2 pages.
(Continued)

*Primary Examiner* — Paige Kathleen Bugg
(74) *Attorney, Agent, or Firm* — Davis Wright Tremaine LLP

(57) ABSTRACT

An exoskeleton system comprising at least one leg actuator unit configured to be coupled to leg of a user, the leg actuator unit including: an upper arm and a lower arm that are rotatably coupled via a joint, the joint positioned at a knee of the user with the upper arm coupled about an upper leg portion of the user above the knee and with the lower arm coupled about a lower leg portion of the user below the knee, a leg-actuator-unit user interface comprising a plurality of input and feedback elements, and an actuator that extends between the upper arm and lower arms.

7 Claims, 26 Drawing Sheets

(51) Int. Cl.
  *B25J 9/00* (2006.01)
  *B25J 9/16* (2006.01)
(52) U.S. Cl.
  CPC .................. *A61H 2003/007* (2013.01); *A61H 2201/1238* (2013.01); *A61H 2201/1261* (2013.01); *A61H 2201/164* (2013.01); *A61H 2201/1642* (2013.01); *A61H 2201/165* (2013.01); *A61H 2201/1652* (2013.01); *A61H 2201/1671* (2013.01); *A61H 2201/5007* (2013.01); *A61H 2201/501* (2013.01); *A61H 2201/5012* (2013.01); *A61H 2201/5025* (2013.01); *A61H 2201/5046* (2013.01); *A61H 2201/5048* (2013.01); *A61H 2201/5058* (2013.01); *A61H 2201/5097* (2013.01); *A61H 2203/0406* (2013.01); *A61H 2203/0431* (2013.01); *A61H 2205/102* (2013.01); *A61H 2230/00* (2013.01)

(58) Field of Classification Search
  CPC .......... A61H 1/0237–0296; A61H 2201/1214; A61H 2201/1238; A61H 2201/1261; A61H 2201/164; A61H 2201/1642; A61H 2201/165; A61H 2201/1652; A61H 2201/1671; A61H 2201/5002; A61H 2201/5007; A61H 2201/501; A61H 2201/5012; A61H 2201/5025; A61H 2201/5046; A61H 2201/5048; A61H 2201/5058; A61H 2201/5097; A61H 2203/0406; A61H 2203/0431; A61H 2205/102; A61H 2230/00
  USPC ............................................................ 601/5
  See application file for complete search history.

(56) References Cited

U.S. PATENT DOCUMENTS

| | | |
|---|---|---|
| 3,823,711 A | 7/1974 | Hatton |
| 3,868,952 A | 3/1975 | Hatton |
| 3,982,531 A | 9/1976 | Shaffer |
| 3,993,056 A | 11/1976 | Rabischong et al. |
| 4,080,877 A | 3/1978 | deFries |
| 4,274,399 A | 6/1981 | Mummert |
| 4,408,600 A | 10/1983 | Davis |
| 4,523,582 A | 6/1985 | Barber |
| 4,623,158 A | 11/1986 | Monreal |
| 4,671,258 A | 6/1987 | Barthlome |
| 4,944,755 A | 7/1990 | Hennequin et al. |
| 4,953,856 A | 9/1990 | Fox, III |
| 5,033,457 A | 7/1991 | Bonutti |
| 5,067,302 A | 11/1991 | Boeckmann |
| 5,169,169 A | 12/1992 | Crawford |
| 5,295,704 A | 3/1994 | Flock |
| 5,483,838 A | 1/1996 | Holden |
| 5,704,945 A | 1/1998 | Wagner et al. |
| 5,780,123 A | 7/1998 | Kamiyama et al. |
| 5,951,048 A | 9/1999 | Slaughter |
| 6,117,507 A | 9/2000 | Smith |
| 6,248,463 B1 | 6/2001 | Dopp et al. |
| 6,612,340 B1 | 9/2003 | Lause |
| 6,776,769 B2 | 8/2004 | Smith |
| 7,086,322 B2 | 8/2006 | Schulz |
| 7,479,121 B2 | 1/2009 | Branch |
| 7,628,766 B1 | 12/2009 | Kazerooni et al. |
| 8,171,570 B2 | 5/2012 | Adarraga |
| 8,784,350 B2 | 7/2014 | Cohen |
| 9,205,560 B1 | 12/2015 | Edsinger et al. |
| 9,709,206 B2 | 7/2017 | Duttenhoefer et al. |
| 9,821,475 B1 | 11/2017 | Lynn et al. |
| 9,827,667 B2 | 11/2017 | Griffith et al. |
| 9,995,321 B2 | 6/2018 | Lynn et al. |
| 10,012,229 B2 | 7/2018 | Ynn et al. |
| 10,245,204 B2 | 4/2019 | Sandler et al. |
| 10,322,015 B2 | 6/2019 | Lee et al. |
| 10,543,110 B2 | 1/2020 | Piercy et al. |
| 10,548,800 B1 | 2/2020 | Barnes |
| 10,562,180 B2 | 2/2020 | Telleria et al. |
| 10,605,365 B1 | 3/2020 | Griffith et al. |
| 10,611,020 B2 | 4/2020 | Griffith et al. |
| 10,619,633 B2 | 4/2020 | Lynn et al. |
| 10,702,742 B2 | 7/2020 | Sharma et al. |
| 10,780,011 B2 | 9/2020 | Yang et al. |
| 10,780,012 B2 | 9/2020 | Lamb et al. |
| 10,966,895 B2 | 4/2021 | Lamb et al. |
| 11,033,450 B2 | 6/2021 | Lamb et al. |
| 11,191,653 B2 | 12/2021 | Grandmaison et al. |
| 11,213,417 B2 | 1/2022 | Piercy et al. |
| 11,254,002 B1 | 2/2022 | Ebrahimi Afrouzi et al. |
| 11,259,979 B2 | 3/2022 | Swift et al. |
| 11,351,083 B2 | 6/2022 | Swift et al. |
| 11,498,203 B2 | 11/2022 | Ding et al. |
| 11,780,186 B1 | 10/2023 | Swierkocki et al. |
| 11,801,153 B2 | 10/2023 | Bulea et al. |
| 2001/0029343 A1 | 10/2001 | Seto et al. |
| 2002/0026794 A1 | 3/2002 | Shahinpoor et al. |
| 2004/0010720 A1 | 1/2004 | Singh et al. |
| 2004/0102723 A1 | 5/2004 | Horst |
| 2004/0140295 A1 | 7/2004 | Herres |
| 2004/0176715 A1 | 9/2004 | Nelson |
| 2005/0066810 A1 | 3/2005 | Schulz |
| 2005/0102863 A1 | 5/2005 | Hannon et al. |
| 2005/0107726 A1 | 5/2005 | Oyen et al. |
| 2005/0124924 A1 | 6/2005 | Slautterback et al. |
| 2005/0177082 A1 | 8/2005 | Bledsoe |
| 2006/0069336 A1 | 3/2006 | Krebs et al. |
| 2006/0128538 A1 | 6/2006 | Sato et al. |
| 2006/0161220 A1 | 7/2006 | Kobayashi et al. |
| 2006/0173552 A1 | 8/2006 | Roy |
| 2006/0174760 A1 | 8/2006 | Rentz |
| 2006/0178030 A1 | 8/2006 | Lund et al. |
| 2006/0184280 A1 | 8/2006 | Oddsson et al. |
| 2006/0207726 A1 | 9/2006 | Driver et al. |
| 2006/0211956 A1 | 9/2006 | Sankai |
| 2007/0042710 A1 | 2/2007 | Mahini et al. |
| 2007/0061107 A1 | 3/2007 | Vock et al. |
| 2007/0075543 A1 | 4/2007 | Marx et al. |
| 2007/0239087 A1 | 10/2007 | Kivisto |
| 2008/0009771 A1 | 1/2008 | Perry et al. |
| 2008/0161937 A1 | 7/2008 | Sankai |
| 2008/0195005 A1 | 8/2008 | Horst et al. |
| 2008/0234608 A1 | 9/2008 | Sankai |
| 2008/0287850 A1 | 11/2008 | Adarraga |
| 2009/0024061 A1 | 1/2009 | Ueda et al. |
| 2009/0118656 A1 | 5/2009 | Ingimundarson et al. |
| 2009/0179112 A1 | 7/2009 | Gu |
| 2009/0198164 A1 | 8/2009 | Krause |
| 2009/0276058 A1 | 11/2009 | Ueda et al. |
| 2010/0040936 A1 | 2/2010 | Pozin et al. |
| 2010/0094188 A1 | 4/2010 | Goffer et al. |
| 2010/0106065 A1 | 4/2010 | Ward |
| 2010/0114329 A1 | 5/2010 | Casler et al. |
| 2010/0204627 A1 | 8/2010 | Kazerooni et al. |
| 2010/0217169 A1 | 8/2010 | Ingimundarson |
| 2010/0249675 A1 | 9/2010 | Fujimoto et al. |
| 2010/0270771 A1 | 10/2010 | Kobayashi et al. |
| 2010/0280424 A1 | 11/2010 | Kawakami et al. |
| 2010/0292556 A1 | 11/2010 | Golden |
| 2011/0059355 A1 | 3/2011 | Zhang et al. |
| 2011/0066088 A1 | 3/2011 | Little et al. |
| 2011/0071417 A1 | 3/2011 | Liu et al. |
| 2011/0099026 A1 | 4/2011 | Oakley et al. |
| 2011/0105966 A1 | 5/2011 | Kazerooni et al. |
| 2011/0105969 A1 | 5/2011 | Nace |
| 2011/0112447 A1 | 5/2011 | Hsiao-Wecksler et al. |
| 2011/0118635 A1 | 5/2011 | Yamamoto |
| 2011/0186208 A1 | 8/2011 | Cartabbia et al. |
| 2011/0290798 A1 | 12/2011 | Corbett et al. |
| 2012/0041348 A1 | 2/2012 | Maekita |
| 2012/0059291 A1 | 3/2012 | Nguyen |
| 2012/0259429 A1 | 10/2012 | Han et al. |
| 2012/0259431 A1 | 10/2012 | Han et al. |

(56) References Cited

U.S. PATENT DOCUMENTS

| | | |
|---|---|---|
| 2012/0271211 A1 | 10/2012 | Bledsoe |
| 2012/0289870 A1 | 11/2012 | Hsiao-Wecksler et al. |
| 2012/0316477 A1 | 12/2012 | Hamaya et al. |
| 2012/0328824 A1 | 12/2012 | Cartabbia et al. |
| 2013/0053736 A1 | 2/2013 | Konishi |
| 2013/0150980 A1 | 6/2013 | Swift et al. |
| 2013/0158445 A1 | 6/2013 | Kazerooni et al. |
| 2013/0172797 A1 | 7/2013 | Merkley et al. |
| 2013/0197408 A1 | 8/2013 | Goldfarb et al. |
| 2013/0226048 A1 | 8/2013 | Unluhisarcikli et al. |
| 2013/0245512 A1 | 9/2013 | Goffer et al. |
| 2013/0289452 A1 | 10/2013 | Smith et al. |
| 2013/0296746 A1 | 11/2013 | Herr et al. |
| 2013/0296758 A1 | 11/2013 | Castillo |
| 2013/0333368 A1 | 12/2013 | Durfee et al. |
| 2014/0109560 A1 | 4/2014 | Ilievski et al. |
| 2014/0124557 A1 | 5/2014 | Velarde |
| 2014/0148745 A1 | 5/2014 | Castillo |
| 2014/0148747 A1 | 5/2014 | Fleming |
| 2014/0171838 A1 | 6/2014 | Aleksov et al. |
| 2014/0206251 A1 | 7/2014 | Stokes |
| 2014/0207037 A1 | 7/2014 | Horst |
| 2014/0212243 A1 | 7/2014 | Yagi et al. |
| 2014/0276262 A1 | 9/2014 | Kare et al. |
| 2014/0276264 A1 | 9/2014 | Caires et al. |
| 2014/0277739 A1 | 9/2014 | Kornbluh et al. |
| 2014/0318118 A1 | 10/2014 | Mazzeo et al. |
| 2014/0358290 A1 | 12/2014 | Kazerooni et al. |
| 2015/0005685 A1 | 1/2015 | Chetlapalli et al. |
| 2015/0068636 A1 | 3/2015 | Duttenhoefer et al. |
| 2015/0088043 A1 | 3/2015 | Goldfield et al. |
| 2015/0108191 A1 | 4/2015 | Velarde |
| 2015/0126911 A1 | 5/2015 | Abramowicz et al. |
| 2015/0134080 A1 | 5/2015 | Roh |
| 2015/0157525 A1 | 6/2015 | Choi et al. |
| 2015/0173927 A1 | 6/2015 | Castillo |
| 2015/0173993 A1 | 6/2015 | Walsh et al. |
| 2015/0196449 A1 | 7/2015 | Ahn et al. |
| 2015/0197008 A1 | 7/2015 | Yoon et al. |
| 2015/0209214 A1 | 7/2015 | Herr et al. |
| 2015/0219262 A1 | 8/2015 | Schuessler et al. |
| 2015/0285238 A1 | 10/2015 | Lynn et al. |
| 2015/0290794 A1 | 10/2015 | Griffith et al. |
| 2015/0302162 A1 | 10/2015 | Hughes et al. |
| 2015/0351991 A1* | 12/2015 | Amundson ........... A61H 1/0244 623/24 |
| 2015/0351995 A1 | 12/2015 | Zoss et al. |
| 2015/0366696 A1 | 12/2015 | Ingimundarson et al. |
| 2016/0008157 A1 | 1/2016 | Brookover et al. |
| 2016/0045386 A1* | 2/2016 | Sandler ................ A61B 5/6811 623/24 |
| 2016/0051389 A1 | 2/2016 | Seligman |
| 2016/0058647 A1 | 3/2016 | Maddry |
| 2016/0074272 A1 | 3/2016 | Ahn et al. |
| 2016/0082319 A1 | 3/2016 | Macri et al. |
| 2016/0089591 A1 | 3/2016 | Williamson |
| 2016/0107309 A1* | 4/2016 | Walsh ................. A63B 21/0054 248/550 |
| 2016/0120683 A1 | 5/2016 | Romo et al. |
| 2016/0143800 A1 | 5/2016 | Hyung et al. |
| 2016/0158087 A1 | 6/2016 | Huang et al. |
| 2016/0184166 A1 | 6/2016 | Takenaka et al. |
| 2016/0213548 A1 | 7/2016 | John et al. |
| 2016/0235616 A1 | 8/2016 | Goffer et al. |
| 2016/0242986 A1 | 8/2016 | Nagata et al. |
| 2016/0242987 A1 | 8/2016 | Nagata et al. |
| 2016/0252110 A1 | 9/2016 | Galloway et al. |
| 2016/0261224 A1 | 9/2016 | Madrone et al. |
| 2016/0278948 A1 | 9/2016 | Piercy et al. |
| 2016/0297504 A1 | 10/2016 | Saindon et al. |
| 2016/0300156 A1 | 10/2016 | Bowers et al. |
| 2016/0302955 A1 | 10/2016 | Siddiqui et al. |
| 2016/0331557 A1 | 11/2016 | Tong et al. |
| 2016/0331560 A1 | 11/2016 | Tong et al. |
| 2016/0331624 A1* | 11/2016 | Sankai .................... B25J 9/101 |
| 2016/0346156 A1 | 12/2016 | Walsh et al. |
| 2017/0018761 A1 | 1/2017 | Ogino |
| 2017/0049587 A1 | 2/2017 | Herr et al. |
| 2017/0071812 A1 | 3/2017 | Sandler et al. |
| 2017/0202724 A1 | 7/2017 | De Rossi et al. |
| 2017/0202725 A1 | 7/2017 | Robertson et al. |
| 2017/0246068 A1 | 8/2017 | Schultz et al. |
| 2017/0252255 A1 | 9/2017 | Asano et al. |
| 2017/0259157 A1 | 9/2017 | Stewart et al. |
| 2017/0279126 A1 | 9/2017 | Dreher |
| 2017/0282360 A1 | 10/2017 | Telleria et al. |
| 2017/0356201 A1 | 12/2017 | Campbell |
| 2018/0028806 A1 | 2/2018 | Hardt et al. |
| 2018/0042803 A1 | 2/2018 | Amundson |
| 2018/0056104 A1 | 3/2018 | Cromie et al. |
| 2018/0071129 A1 | 3/2018 | Ozsecen et al. |
| 2018/0079071 A1 | 3/2018 | Griffith et al. |
| 2018/0085280 A1 | 3/2018 | Shimada et al. |
| 2018/0086178 A1 | 3/2018 | Stanek et al. |
| 2018/0090961 A1 | 3/2018 | Namolovan et al. |
| 2018/0092536 A1 | 4/2018 | Sandler et al. |
| 2018/0116852 A1 | 5/2018 | Petursson et al. |
| 2018/0125152 A1 | 5/2018 | Bruel |
| 2018/0200878 A1 | 7/2018 | Tsai et al. |
| 2018/0221237 A1* | 8/2018 | Swift .................... G16H 50/20 |
| 2018/0235830 A1 | 8/2018 | Rokosz et al. |
| 2018/0243546 A1 | 8/2018 | Leuthardt et al. |
| 2018/0264642 A1* | 9/2018 | Harding ................ G16H 40/63 |
| 2018/0283414 A1 | 10/2018 | Lynn et al. |
| 2018/0290009 A1 | 10/2018 | Avila |
| 2018/0296424 A1* | 10/2018 | Parra ................. A61N 1/36034 |
| 2018/0296425 A1 | 10/2018 | Lamb et al. |
| 2018/0325765 A1 | 11/2018 | Wilmington |
| 2018/0330817 A1 | 11/2018 | Avni et al. |
| 2019/0015233 A1 | 1/2019 | Galloway et al. |
| 2019/0029918 A1 | 1/2019 | Nada et al. |
| 2019/0060156 A1* | 2/2019 | Swift ....................... A61H 1/00 |
| 2019/0060157 A1 | 2/2019 | Lamb et al. |
| 2019/0083002 A1 | 3/2019 | Jang et al. |
| 2019/0090744 A1 | 3/2019 | Mahfouz |
| 2019/0099877 A1 | 4/2019 | Goehlich et al. |
| 2019/0105189 A1 | 4/2019 | Petursson et al. |
| 2019/0105215 A1* | 4/2019 | Dalley ....................... A61H 3/00 |
| 2019/0159954 A1 | 5/2019 | Ozsecen et al. |
| 2019/0168398 A1 | 6/2019 | Lessing et al. |
| 2019/0224922 A1 | 7/2019 | Brensinger |
| 2019/0240103 A1 | 8/2019 | Hepler et al. |
| 2019/0280266 A1 | 9/2019 | Zhang et al. |
| 2019/0283235 A1 | 9/2019 | Nam et al. |
| 2019/0290464 A1 | 9/2019 | Fleming |
| 2019/0290465 A1 | 9/2019 | Fleming |
| 2019/0293223 A1 | 9/2019 | Free et al. |
| 2019/0307583 A1 | 10/2019 | Herr et al. |
| 2019/0328604 A1* | 10/2019 | Contreras-Vidal ........... A61H 1/0244 |
| 2019/0344434 A1 | 11/2019 | Lerner |
| 2019/0350735 A1 | 11/2019 | Ingimundarson et al. |
| 2019/0358808 A1* | 11/2019 | Yoshimi ................ B25J 9/0006 |
| 2019/0383313 A1 | 12/2019 | Fowler et al. |
| 2020/0069441 A1 | 3/2020 | Larose et al. |
| 2020/0100978 A1 | 4/2020 | Moody |
| 2020/0114588 A1 | 4/2020 | Wang et al. |
| 2020/0197209 A1 | 6/2020 | Bejarano et al. |
| 2020/0206899 A1 | 7/2020 | Storz et al. |
| 2020/0223071 A1* | 7/2020 | Mahoney .......... A63B 21/00181 |
| 2020/0253808 A1 | 8/2020 | Swift et al. |
| 2020/0253822 A1 | 8/2020 | Sibue et al. |
| 2020/0306070 A1 | 10/2020 | Hsu et al. |
| 2020/0386354 A1 | 12/2020 | Zoe |
| 2020/0397641 A1 | 12/2020 | Teng et al. |
| 2020/0410892 A1 | 12/2020 | Otsuki et al. |
| 2021/0121729 A1 | 4/2021 | Kim et al. |
| 2021/0162262 A1 | 6/2021 | Lee |
| 2021/0177686 A1 | 6/2021 | Lamson et al. |
| 2021/0251518 A1 | 8/2021 | Huizenga |
| 2021/0369539 A1 | 12/2021 | Campbell et al. |
| 2021/0369540 A1 | 12/2021 | Kemper et al. |
| 2021/0369541 A1 | 12/2021 | Stuart et al. |
| 2021/0369542 A1 | 12/2021 | Stuart et al. |

(56) References Cited

U.S. PATENT DOCUMENTS

| | | |
|---|---|---|
| 2021/0370493 A1 | 12/2021 | Samia et al. |
| 2021/0370494 A1 | 12/2021 | Hurley et al. |
| 2021/0370495 A1 | 12/2021 | Swartz et al. |
| 2021/0370496 A1 | 12/2021 | Stuart et al. |
| 2021/0386611 A1 | 12/2021 | Dalley et al. |
| 2022/0015490 A1 | 1/2022 | Drasler |
| 2022/0087833 A1 | 3/2022 | Farris |
| 2022/0347847 A1 | 11/2022 | Duburcq et al. |
| 2022/0407129 A1 | 12/2022 | Phares |
| 2023/0055998 A1 | 2/2023 | Park et al. |

FOREIGN PATENT DOCUMENTS

| | | |
|---|---|---|
| CN | 101960441 A | 1/2011 |
| CN | 103412003 A | 11/2013 |
| CN | 104582668 A | 4/2015 |
| CN | 105205436 A | 12/2015 |
| CN | 204814712 U | 12/2015 |
| CN | 105264255 A | 1/2016 |
| CN | 105590409 A | 5/2016 |
| CN | 105816301 A | 8/2016 |
| CN | 105992554 A | 10/2016 |
| CN | 106029039 A | 10/2016 |
| CN | 106137489 A | 11/2016 |
| CN | 106413998 A | 2/2017 |
| CN | 106420279 A | 2/2017 |
| CN | 106650224 A | 5/2017 |
| CN | 207253461 U | 4/2018 |
| CN | 110545777 A | 12/2019 |
| CN | 110603021 A | 12/2019 |
| CN | 110868964 A | 3/2020 |
| CN | 111135031 A | 5/2020 |
| CN | 111278398 A | 6/2020 |
| CN | 111571568 A | 8/2020 |
| DE | 102011107580 A1 | 1/2013 |
| EP | 2827809 A1 | 1/2015 |
| EP | 3173191 A2 | 5/2017 |
| EP | 3539528 A1 | 9/2019 |
| EP | 3576707 A4 | 3/2021 |
| FR | 1463850 A | 7/1966 |
| JP | S601405 A | 1/1985 |
| JP | 1987501723 A | 7/1987 |
| JP | S62501723 A | 7/1987 |
| JP | 1988199965 A | 8/1988 |
| JP | S63199965 A | 8/1988 |
| JP | H07163607 A | 6/1995 |
| JP | 2000051289 A | 2/2000 |
| JP | 2005118959 A | 5/2005 |
| JP | 2005296103 A | 10/2005 |
| JP | 2006000347 A | 1/2006 |
| JP | 2007282991 A | 11/2007 |
| JP | 2010263934 A | 11/2010 |
| JP | 2011058564 A | 3/2011 |
| JP | 2011173211 A | 9/2011 |
| JP | 2012501739 A | 1/2012 |
| JP | 3179088 U | 10/2012 |
| JP | 2012532001 | 12/2012 |
| JP | 2012532001 A | 12/2012 |
| JP | 2014023773 A | 2/2014 |
| JP | 2015008938 A | 1/2015 |
| JP | 2015089386 A | 5/2015 |
| JP | 2015139665 A | 8/2015 |
| JP | 2016521212 A | 7/2016 |
| JP | 2016137146 | 8/2016 |
| JP | 2017086296 A | 5/2017 |
| JP | 2017154210 A | 9/2017 |
| JP | 2018019899 A | 2/2018 |
| JP | 2018184266 A | 11/2018 |
| JP | 2019500928 A | 1/2019 |
| JP | 2019077037 A | 5/2019 |
| JP | 2019093464 A | 6/2019 |
| JP | 2019111635 A | 7/2019 |
| JP | 2020506030 A | 2/2020 |
| JP | 2020518295 A | 6/2020 |
| JP | 6860743 B2 | 4/2021 |
| KR | 10 2008 0048450 A | 6/2008 |
| KR | 10-2011-0104781 A | 9/2011 |
| KR | 10-2012-0025571 A | 3/2012 |
| KR | 10-2014-0062931 A | 5/2014 |
| KR | 20160020780 A | 2/2016 |
| KR | 101812603 B1 | 12/2017 |
| KR | 10-2020-0052323 A | 5/2020 |
| KR | 10-2020-0144460 A | 12/2020 |
| KR | 10-2021-0033449 A | 3/2021 |
| SU | 251758 | 11/1970 |
| WO | 8603816 A1 | 7/1986 |
| WO | 0722782 A1 | 6/1997 |
| WO | 0004852 A1 | 2/2000 |
| WO | 2008129096 A1 | 10/2008 |
| WO | 2009081710 A1 | 7/2009 |
| WO | 2010124172 A2 | 10/2010 |
| WO | 2011007569 A1 | 1/2011 |
| WO | 2011043095 A1 | 4/2011 |
| WO | 2012044621 A1 | 4/2012 |
| WO | 2012086202 A1 | 6/2012 |
| WO | 2012124853 A1 | 9/2012 |
| WO | 2013142777 A1 | 9/2013 |
| WO | 2013152929 A1 | 10/2013 |
| WO | 2014109799 A1 | 7/2014 |
| WO | 2014194257 A1 | 12/2014 |
| WO | 2015080596 A1 | 6/2015 |
| WO | 2015104832 A1 | 7/2015 |
| WO | 2016147195 A1 | 9/2016 |
| WO | 2016166442 A1 | 10/2016 |
| WO | 2016166588 A1 | 10/2016 |
| WO | 2016171548 A1 | 10/2016 |
| WO | 2016207855 A1 | 12/2016 |
| WO | 2017110453 A1 | 6/2017 |
| WO | 2017218661 A1 | 12/2017 |
| WO | 2018144937 A1 | 8/2018 |
| WO | 2018191710 A1 | 10/2018 |
| WO | 2018218336 A1 | 12/2018 |
| WO | 2018222930 A1 | 12/2018 |
| WO | 2018236225 A1 | 12/2018 |
| WO | 2019046488 A1 | 3/2019 |
| WO | 2019046489 A1 | 3/2019 |
| WO | 2019109178 A1 | 6/2019 |
| WO | 2019122364 A1 | 6/2019 |
| WO | 2019131386 A1 | 7/2019 |
| WO | 2019183397 A1 | 9/2019 |
| WO | 2019187030 A1 | 10/2019 |
| WO | 2020049886 A1 | 3/2020 |
| WO | 2021096874 A1 | 5/2021 |
| WO | 2021119512 A1 | 6/2021 |
| WO | 2021242742 A1 | 12/2021 |

OTHER PUBLICATIONS

USPTO Non-Final Office Action in U.S. Appl. No. 17/327,121 dated Aug. 29, 2023, 8 pages.
Branham, "3 Advantages of Using an Oval Bore Compact Cylinder," W.C. Branham Blog—Solutions in Motion TM. Retrieved Feb. 9, 2023, from https://blog.wcbranham.com/oval-bore-compact-cylinder, Jan. 12, 2018, 7 pages.
Canadian IPO Office Action and Examination Search Report dated Mar. 21, 2023, Patent Application No. 3,051,105, 7 pages.
Chinese Patent Office Decision on Rejection dated Nov. 25, 2022; Application No. 201880024597; 11 pages.
Chinese Patent Office Decision on Rejection dated Oct. 10, 2022; Application No. 201880024597; 11 pages.
Chinese Patent Office Fourth Office Action dated Mar. 31, 2023, Application No. 201880023218.5; 7 pages.
Chinese Patent Office Notification to Grant Patent Right for Invention dated Nov. 4, 2022; Application No. 201880056518.3; 2 pages.
European Patent Office Communication under Rule 71(3) EPC dated Nov. 29, 2022, Application No. 18 783 814.9, 46 pages.
European Patent Office Notice of Intention to Grant, Application No. 18783814.9, Nov. 29, 2022, 8. pages.
International Search Report and Written Opinion mailed Dec. 5, 2022, Patent Application No. PCT/US2022/075097, 11 pages.
International Search Report and Written Opinion mailed Dec. 6, 2022, Patent Application No. PCT/US2022/075095, 10 pages.

(56) References Cited

OTHER PUBLICATIONS

Israel Notice of Acceptance for Patent Application No. 268306 dated Feb. 1, 2023, 3 pages.
Israel Notice of Acceptance for Patent Application No. 272621 dated Dec. 22, 2022, 4 pages.
Israel Notice of Deficiencies for Patent Application No. 272623 dated Dec. 7, 2022, 4 pages.
Israel Notice of Deficiencies for Patent Application No. 282165 dated Dec. 18, 2022, 4 pages.
Japan Decision to Grant Application No. 2020-512042 dated Jan. 13, 2023, 2 pages.
Japan Final Office Action and Decision to Reject Amendment of Application No. 2019-554877 dated Nov. 7, 2022, 4 pages.
Japan First Office Action, Application No. 2022-072995 dated Mar. 8, 2023, 2 pages.
Lamb, WO 2018191710 A1 Oct. 18, 2018 (full text). [online] [retrieved on Feb. 9, 2023]. Retrieved from Clarivate Analytics, 2018, 15 pages.
USPTO Office Action in U.S. Appl. No. 16/827,484 dated Mar. 15, 2023, 13 pages.
USPTO Office Action in U.S. Appl. No. 16/838,347 dated Jun. 8, 2023, 5 pages.
USPTO Office Action in U.S. Appl. No. 16/862,400 dated Mar. 22, 2023, 13 pages.
USPTO Office Action in U.S. Appl. No. 17/119,825 dated May 23, 2023, 19 pages.
USPTO Office Action in U.S. Appl. No. 17/119,830 dated Mar. 15, 2023, 23 pages.
USPTO Office Action in U.S. Appl. No. 17/329,632 dated Feb. 15, 2023, 16 pages.
USPTO Office Action in U.S. Appl. No. 17/558,481 dated Mar. 23, 2023, 49 pages.
Chinese Patent Office First Office Action dated Jun. 16, 2023; Application No. 202111540872.3; 14 pages.
Chinese Patent Office Notification to Grant Patent Right for Invention dated Jul. 10, 2023; Application No. 201880024597.X; 2 pages.
European Patent Office Notice of Intention to Grant, Application No. 18748599.0, Aug. 16, 2023, 52 pages.
Israel Notice before Acceptance for Patent Application No. 282165 dated May 24, 2023, 3 pages.
Israel Notice Notice before Acceptance for Patent Application No. 282165 dated Apr. 18, 2023, 3 pages.
Japan PTO Rejection of Application No. 2019-563328 dated Jul. 13, 2023, 3 pages.
USPTO Notice of Allowance of U.S. Appl. No. 17/729,934 dated Aug. 23, 2023, 22 pages.
Japanese IPO Notice of Decision to Grant Application No. 2022-072995, Nov. 6, 2023, 1 page.
Japanese IPO Notification of Reason for Rejection of Application No. 2022-176048, Nov. 26, 2023, 5 pages.
Yoshikawa, "Human Interface Using Hand Movement Recognition Method Based on Myoelectricity," Next Generation Human Interface Development Frontier, Jun. 11, 2013, 14 pages.
USPTO Notice of Allowance in U.S. Appl. No. 17/119,830 dated Nov. 8, 2023, 9 pages.
USPTO Office Action in U.S. Appl. No. 17/327,121 dated Aug. 29, 2023, 8 pages.
USPTO Office Action in U.S. Appl. No. 17/558,481 dated Nov. 29, 2023, 17 pages.
USPTO Office Action dated Mar. 7, 2024, U.S. Appl. No. 17/119,825, 18 pages.
European Patent Office Extended Search Report dated Jan. 29, 2024, Application No. 23196713.4, 7 pages.
European Patent Office Extended Search Report, Application No. 20899495.4 dated Jan. 18, 2024, 11 pages.
European Patent Office Extended Search Report, Application No. 21812810.6 dated Jan. 18, 2024, 8 pages.
European Patent Office Extended Search Report, Application No. 21813358.5 dated Jan. 24, 2024, 9 pages.
European Patent Office Supplementary Search Report dated Jan. 30, 2024, Application No. 21814414.5, 12 pages.
European Patent Office Supplementary Search Report, Application No. 21814414.5, 12 pages.
Israel Notice of Deficiencies for Patent Application 269860 dated Jan. 10, 2024, 4 pages.
Israel Notice of Deficiencies for Patent Application 269860 dated Nov. 14, 2023, 4 pages.
Japan First Office Action, Application No. 2022-535872 dated Feb. 15, 2024, 8 pages.
Japan IPO Office Action dated Feb. 13, 2024, Application No. 2022-573515, 5 pages.
Japan Office Action, Application No. 2022-573514 dated Dec. 27, 2023, 3 pages.
Japan Office Action, Application No. 2022-573520 dated Jan. 4, 2024, 4 pages.
Japan Office Action, Application No. 2023-017338 dated Dec. 12, 2023, 2 pages.
Japan Office Action, Application No. 2023-017338 dated Nov. 9, 2023, 4 pages.
Japan Office Action, Application No. 2023-034202 dated Jan. 9, 2024, 4 pages.
Japan PTO Rejection of Application No. 2022-573509 dated Dec. 4, 2023, 5 pages.
Japan PTO Rejection of Application No. 2022-573519 dated Jan. 9, 2024, 2 pages.
Japanese IPO Notification of Reason for Rejection of Application No. 2022-573516, Jan. 15, 2024, 3 pages.
Chinese Patent Office Second Office Action and Supplementary Search Report dated Apr. 25, 2022; Application No. 201880023218.5; 15 pages.
Chinese Patent Office Second Office Action and Supplementary Search Report dated Mar. 30, 2022; Application No. 201880024598; 15 pages.
Chinese Patent Office Second Office Action dated Jul. 13, 2022; Application No. 201880056518.3; 6 pages.
Chinese Patent Office Supplemental Search Report dated Jul. 4, 2022, Application No. 201880056518.3, 4 pages.
Chinese Patent Office Third Office Action dated Oct. 20, 2022; Application No. 201880023218.5; 8 pages.
European Patent Office Communication under Rule 71(3) EPC dated Apr. 19, 2022, Application No. 18 850 236.3, 46 pages.
European Patent Office Communication Under Rule 71(3) EPC, Application No. 18 783 814.9 dated Aug. 11, 2022, 44 pages.
European Patent Office Extended Search Report dated Oct. 18, 2022, Patent Application No. 22181044.3-1122, 7 pages.
Huang et al., "Interactive learning for sensitivity factors of a human-powered augmentation lower exoskeleton," 2015 IEEE/RSJ International Conference on Intelligent Robots and Systems (IROS), Sep. 28, 2015, 7 pages.
International Search Report and Written Opinion mailed Apr. 26, 2018, International Patent Application No. PCT/US2018/016729, filed Feb. 2, 2018, 7 pages.
International Search Report and Written Opinion mailed Aug. 26, 2021, Patent Application No. PCT/US2021/034444, 7 pages.
International Search Report and Written Opinion mailed Aug. 26, 2021, Patent Application No. PCT/US2021/034447, 7 pages.
International Search Report and Written Opinion mailed Aug. 26, 2021, Patent Application No. PCT/US2021/034593, 10 pages.
International Search Report and Written Opinion mailed Dec. 1, 2022 Patent Application No. PCT/US2022/075098, 12 pages.
International Search Report and Written Opinion mailed Dec. 1, 2022, Patent Application No. PCT/US2022/075099, 12 pages.
International Search Report and Written Opinion mailed Dec. 6, 2018, International Patent Application No. PCT/US2018/048638, filed Aug. 29, 2018, 8 pages.
International Search Report and Written Opinion mailed Dec. 6, 2018, Patent Application No. PCT/US2018/048639, 7 pages.
International Search Report and Written Opinion mailed Jul. 18, 2016, International Patent Application No. PCT/US2016/024366, filed Mar. 25, 2016, 7 pages.

(56) References Cited

OTHER PUBLICATIONS

International Search Report and Written Opinion mailed Jul. 19, 2018, International Patent Application No. PCT/US2018/027643, filed Apr. 13, 2018, 7 pages.
International Search Report and Written Opinion mailed Jun. 3, 2021, Patent Application No. PCT/US2021/019711, 12 pages.
International Search Report and Written Opinion mailed Mar. 30, 2021, Patent Application No. PCT/US2020/064647, 10 pages.
International Search Report and Written Opinion mailed Nov. 29, 2022, International Patent Application No. PCT/US2022/075094, filed Aug. 17, 2022, 11 pages.
International Search Report and Written Opinion mailed Nov. 29, 2022, International Patent Application No. PCT/US2022/075096, filed Aug. 17, 2022, 11 pages.
International Search Report and Written Opinion mailed Sep. 2, 2021, Patent Application No. PCT/US2021/034030, 9 pages.
International Search Report and Written Opinion mailed Sep. 2, 2021, Patent Application No. PCT/US2021/034450, 9 pages.
International Search Report and Written Opinion mailed Sep. 9, 2021, Patent Application No. PCT/US2021/034443, 8 pages.
International Search Report and Written Opinion mailed Sep. 9, 2021, Patent Application No. PCT/US2021/034579, 8 pages.
International Search Report and Writtent Opinion mailed Aug. 26, 2021, Patent Application No. PCT/US2021/034468, 8 pages.
Israel Notice of Deficiencies for Patent Application 269860 dated Jul. 25, 2022, 5 pages.
Israel Notice of Deficiencies for Patent Application No. 269860 dated Jul. 25, 2022, 5 pages.
Israel Office Action for Application No. 269860 dated Jul. 25, 2022, 5 pages.
Japan Final Rejection of Application No. 2019-563328 dated Jul. 6, 2022, 2 pages.
Japan Patent Office, "Final Rejection" in Applicaiton No. 2019-563328, Sep. 9, 2022, 4 pages.
Japanese IPO Final Rejection of Application No. 2019-563328, Aug. 9, 2022, 2 pages.
Japanese IPO Notification of Reason for Rejection of Application No. 2020-512042, Jun. 27, 2022, 2 pages.
National Intellectual Property Administration, P. R. China, "2nd Office Action" in Application No. 201880023218.5, Apr. 25, 2022, 15 pages.
Notification of Grant of Chinese Patent Application No. 201880056709 dated May 18, 2022, 2 pages.
Tamez-Duque et al., "Real-time strap pressure sensor system for powered exoskeletons," Sensors 15(2):4550-4563, Feb. 2015.
Taniguchi, "Flexible Artificial Muscle Actuator Using Coiled Shape 5 Memory Alloy Wires," APCBEE Procedia 7:54-59, Jan. 1, 2013.
Canadian Intellectual Property Office Office Action dated Dec. 6, 2024, Application No. 3,072,504, 6 pages.
Canadian IPO Notice of Allowance dated Mar. 19, 2024, Patent Application No. 3,051,105, 1 page.
Canadian IPO Office Action dated Dec. 5, 2024, Patent Application No. 3,072,622, 7 pages.
Canadian IPO Office Action dated Jun. 27, 2024 in Application No. 3,055,435, 5 pages.
Chinese Patent Office First Office Action dated Feb. 19, 2025; Application No. 202210922312.2; 43 pages.
Chinese Patent Office First Office Action dated Jan. 15, 2025; Application No. 202180040509.7; 3 pages.
Chinese Patent Office First Office Action dated Jan. 17, 2025, Application No. 202180045080.0; 10 pages.
Chinese Patent Office First Office Action dated Jan. 17, 2025; Application No. 202180045079.8; 10 pages.
Chinese Patent Office First Office Action dated Jan. 17, 2025; Application No. 202189945078.3; 13 pages.
Chinese Patent Office First Office Action dated Mar. 1, 2025; Application No. 202180045052.9; 74 pages.
Chinese Patent Office First Office Action dated Mar. 5, 2025; Application No. 2021180043414.0; 61 pages.
Chinese Patent Office Notification of Grant of Application No. 20211150872.3, Nov. 19, 2024, 2 pages.
Chinese Patent Office Notification to Grant Patent Right for Invention dated Jul. 4, 2024; Application No. 2022-573514; 1 page.
Chu, "Human-Expsystem Adaptation," MIT School of Engineering, Oct. 2018 [retrieved Apr. 25, 2024 from https://engineering.mit.edu/engage/engineering-in-action/human-exosystem-adaptation/,] 9 pages.
Dephy, "Build Faster a Safe Robotics Platform that Actually Works?" Retrieved Apr. 25, 2024 from https://web.archive.org/web/20221226232116/https://dephy.com/faster/, 11 pages.
Dephy, "Getting Started," retrieved May 28, 2024 from https://dephy.com/start/, 23 pages.
European Patent Office Exam Report dated Jan. 14, 2025, Application No. 22181044.3, 4 pages.
European Patent Office Exam Report dated May 14, 2025, Application No. 21 814 414.5, 5 pages.
European Patent Office Extended Search Report dated Apr. 4, 2025 for Application No. 22859359.6, 10 pages.
European Patent Office Extended Search Report dated Apr. 8, 2024, Application No. 20899495.4, 10 pages.
European Patent Office Extended Search Report dated Jun. 12, 2024, Application No. 21812817.1, 12 pages.
European Patent Office Extended Search Report dated Jun. 17, 2024, Application No. 21814117.4, 7 pages.
European Patent Office Extended Search Report dated Jun. 21, 2024, Patent Application No. 21812103.6, 12 pages.
European Patent Office Extended Search Report dated Mar. 27, 2025, Application No. 22859360.4, 11 pages.
European Patent Office Extended Search Report dated May 28, 2024, Application No. 21814414.5, 11 pages.
European Patent Office Extended Search Report, Application No. 21812695.1 dated Jun. 18, 2024, 10 pages.
European Patent Office Extended Search Report, Application No. 21812992.2 dated Jun. 21, 2024, 11 pages.
European Patent Office Extended Search Report, Application No. 22859361.2 dated Mar. 27, 2025, 11 pages.
European Patent Office Notice of Intention to Grant dated Mar. 27, 2025, Application No. 20899495.4, 71 pages.
European Patent Office Notice of Intention to Grant, Application No. 18851608.2, Mar. 25, 2025, 56 pages.
European Patent Office Notice of Intention to Grant, Application No. 20899495.4, dated Feb. 27, 2025, 73 pages.
European Patent Office Notice of Intention to Grant, Application No. 21814117.4, May 26, 2025, 123 pages.
Israel Notice of Acceptance dated Apr. 1, 2024, Patent Application No. 272623, 3 pages.
Israel Notice of Deficiencies for Patent Application 293829 dated Dec. 9, 2024, 5 pages.
Israel Notice of Deficiencies for Patent Application 298446 dated May 27, 2025, 5 pages.
Israel Notice of Deficiencies for Patent Application 298455 dated May 29, 2025, 3 pages.
Israel Notice of Deficiencies for Patent Application No. 295817 dated Juy 24, 2023, 4 pages.
Israel Notice of Deficiencies for Patent Application No. 298452 dated May 5, 2025, 4 pages.
Israel Notice of Deficiencies for Patent Application No. 298465 dated May 22, 2025, 4 pages.
Japan Decision to Grant Application No. 2022-176048 dated Nov. 14, 2024, 2 pages.
Japan Decision to Grant Application No. 2022-573509 dated Aug. 22, 2024, 2 pages.
Japan First Office Action, Application No. 2022-573518 dated Apr. 22, 2024, 2 pages.
Japan IPO Office Action dated Aug. 13, 2024, Application No. 2022-176048, 2 pages.
Japan IPO Trial Decision Allowing Application No. 2019-554877 dated Apr. 1, 2024, 2 pages.
Japan Notice of Patent Grant, Application No. 2022-573519 dated Aug. 8, 2024, 1 page.
Japan Office Action dated Feb. 3, 2025, Application No. 2023-017338, 2 pages.

(56) References Cited

OTHER PUBLICATIONS

Japan Office Action, Application No. 2023-017338 dated Aug. 26, 2024, 3 pages.
Japan Patent Office, "Decision to Grant" in application No. 2022-573515, Sep. 30, 2024, 1page.
Japan Patent Office, "Decision to Grant" in application No. 2022-573516, Sep. 19, 2024, 1page.
Japan Trial Decision Notice of Patentability of Application No. 2019-563328 dated Aug. 13, 2024, 2 pages.
Japanese IPO Notice of Decision to Grant Application No. 2023-017338, Aug. 4, 2025, 1 page.
Khalili, et al., "Studies on Practical Applications of Safe-Fall Control Strategies for Lower Limb Exoskeletons*," 2019 IEEE 16th INternational Conference on Rehabilitation Robotics, Jan. 24-28, 2019, 6 pages.
MIT School of Engineering, "Human-exosystem Adaptation," https://www.youtube.com/watch?v=GXGHi_n1uR0, Oct. 4, 2018, 2 pages.
University of Michigan, "Understanding Exoskeletons Use Motivation," 2020 [retrieved Apr. 25, 2024 from https://neurobionics.robotics.umich.edu/research/biomechanical-science/dephy-ankle-exoskeletons/,] 4 pages.
USPTO Final Office Action dated Apr. 9, 2025, U.S. Appl. No. 17/329,632, 25 pages.
USPTO Final Office Action dated Aug. 14, 2024, U.S. Appl. No. 17/332,507, 29 pages.
USPTO Final Office Action dated Sep. 25, 2024, U.S. Appl. No. 17/119,825, 24 pages.
USPTO Notice Of Allowance dated May 23, 2025, U.S. Appl. No. 17/890,070, 5 pages.
USPTO Notice of Allowance in U.S. Appl. No. 17/119,825 dated Feb. 10, 2025, 8 pages.
USPTO Notice of Allowance of U.S. Appl. No. 17/331,956 dated Jun. 25, 2025, 5 pages.
USPTO Notice of Allowance of U.S. Appl. No. 17/889,750 dated Jun. 11, 2024, 9 pages.
USPTO Office Action dated Apr. 4, 2024, U.S. Appl. No. 16/838,347, 7 pages.
USPTO Office Action dated Aug. 14, 2024, U.S. Appl. No. 17/332,818, 35 pages.
USPTO Office Action Dated Aug. 28, 2024, U.S. Appl. No. 17/331,956, 21 pages.
USPTO Office Action dated Jan. 23, 2025, U.S. Appl. No. 17/331,961, 25 pages.
USPTO Office Action dated Jul. 31, 2024, U.S. Appl. No. 17/331,961, 20 pages.
USPTO Office Action dated Jun. 14, 2024, U.S. Appl. No. 17/558,481, 15 pages.
USPTO Office Action in U.S. Appl. No. 16/862,400 dated My 22, 2024, 20 pages.
USPTO Office Action in U.S. Appl. No. 17/185,754 dated Jun. 10, 2025, 21 pages.
USPTO Office Action in U.S. Appl. No. 17/327,121 dated Feb. 11, 2025, 8 pages.
USPTO Office Action in U.S. Appl. No. 17/329,632 dated Aug. 19, 2024, 20 pages.
USPTO Office Action in U.S. Appl. No. 17/332,507 dated Feb. 11, 2025, 26 pages.
USPTO Office Action in U.S. Appl. No. 17/332,818 dated Feb. 14, 2025, 28 pages.
USPTO Office Action in U.S. Appl. No. 17/558,481 dated Dec. 20, 2024, 12 pages.
USPTO Office Action in U.S. Appl. No. 17/889,589 dated Aug. 12, 2025, 17 pages.
U.S. Appl. No. 17/332,818, filed May 27, 2021.
U.S. Appl. No. 17/331,956, filed May 27, 2021.
U.S. Appl. No. 17/331,203, filed May 27, 2021.
U.S. Appl. No. 17/331,961, filed May 27, 2021.
U.S. Appl. No. 17/332,507, filed May 27, 2021.
U.S. Appl. No. 17/332,860, filed May 27, 2021.
Chinese Patent Office First Office Action dated Aug. 28, 2025; Application No. 202311193851.8; 7 pages.
Chinese Patent Office Second Office Action dated Aug. 9, 2025; Application No. 202080091082.0; 6 pages.
Chinese Patent Office Second Office Action dated Sep. 1, 2025; Application No. 202180040509.7; 11 pages.
USPTO Final Office Action dated Nov. 7, 2025, U.S. Appl. No. 16/838,347, 7 pages.
USPTO Notice of Allowance in U.S. Appl. No. 17/332,172 dated Aug. 25, 2025, 21 pages.
USPTO Office Action dated Aug. 26, 2025, U.S. Appl. No. 17/332,203, 23 pages.

* cited by examiner

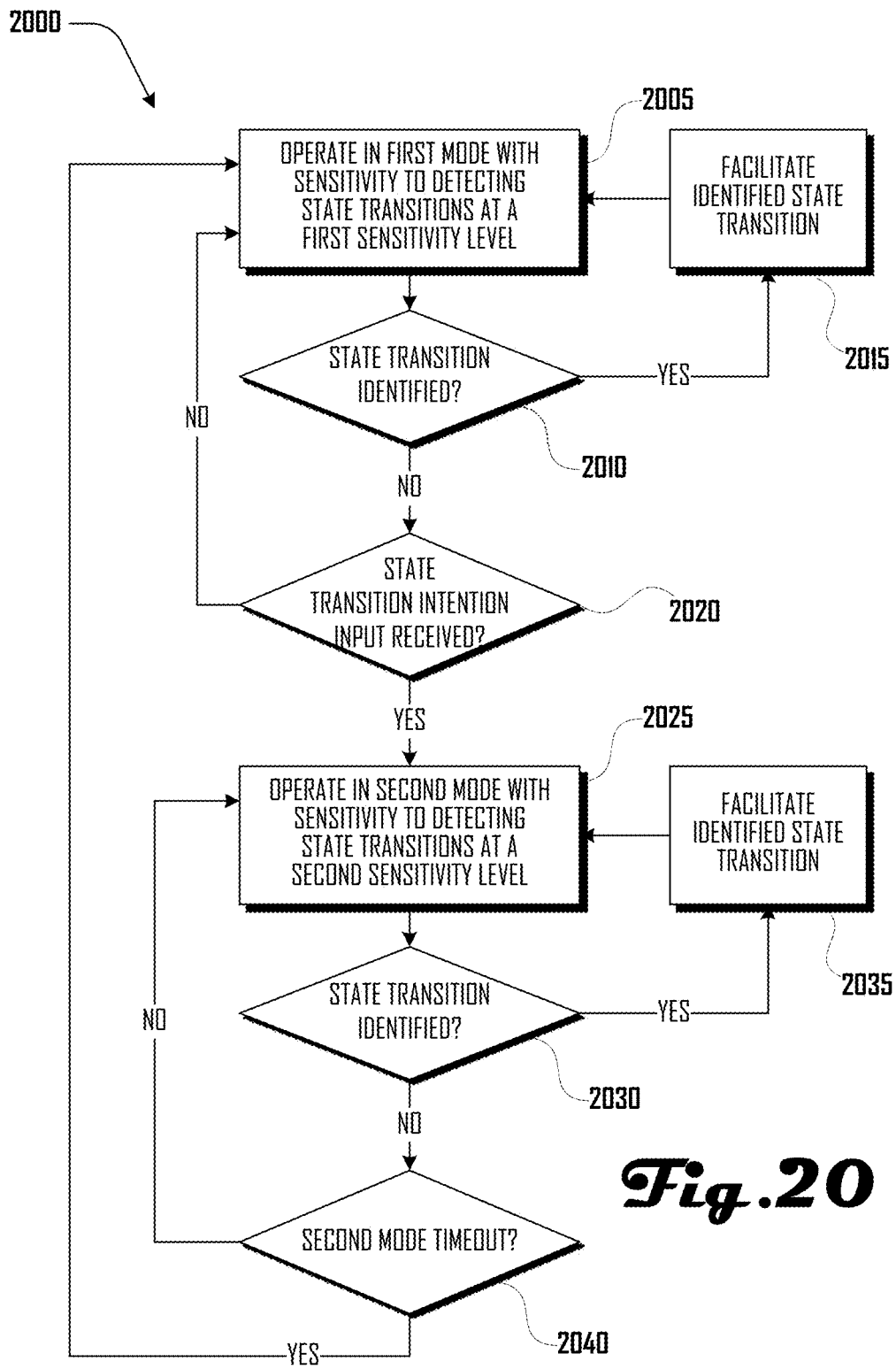

USER INTERFACE AND FEEDBACK SYSTEMS AND METHODS FOR A MOBILE ROBOT

CROSS-REFERENCE TO RELATED APPLICATIONS

This application is a non-provisional of and claims priority to U.S. Provisional Patent Application No. 63/030,586, filed May 27, 2020, entitled "POWERED DEVICE FOR IMPROVED USER MOBILITY AND MEDICAL TREATMENT,". This application is hereby incorporated herein by reference in its entirety and for all purposes.

This application is a non-provisional of and claims priority to U.S. Provisional Patent Application No. 63/058,825, filed Jul. 30, 2020, entitled "POWERED DEVICE TO BENEFIT A WEARER DURING TACTICAL APPLICATIONS,". This application is hereby incorporated herein by reference in its entirety and for all purposes.

This application is also related to U.S. Non-Provisional Applications filed the same day as these applications respectively entitled "POWERED MEDICAL DEVICE AND METHODS FOR IMPROVED USER MOBILITY AND TREATMENT", "FIT AND SUSPENSION SYSTEMS AND METHODS FOR A MOBILE ROBOT", "BATTERY SYSTEMS AND METHODS FOR A MOBILE ROBOT", "CONTROL SYSTEM AND METHOD FOR A MOBILE ROBOT", "DATA LOGGING AND THIRD-PARTY ADMINISTRATION OF A MOBILE ROBOT" and "MODULAR EXOSKELETON SYSTEMS AND METHODS" and having respective application numbers Ser. Nos. 17/332,818, 17/331,956, 17/331,961, 17/332,203, 17/332,507 and 17/332,860, These applications are hereby incorporated herein by reference in their entirety and for all purposes.

BRIEF DESCRIPTION OF THE DRAWINGS

FIG. 20 is a block diagram of a semi-supervised intent recognition method in accordance with one embodiment.

FIG. 25b illustrates a side view of the pneumatic actuator of FIG. 25a in an expanded configuration showing the cross section of FIG. 25a.

Figure 1:
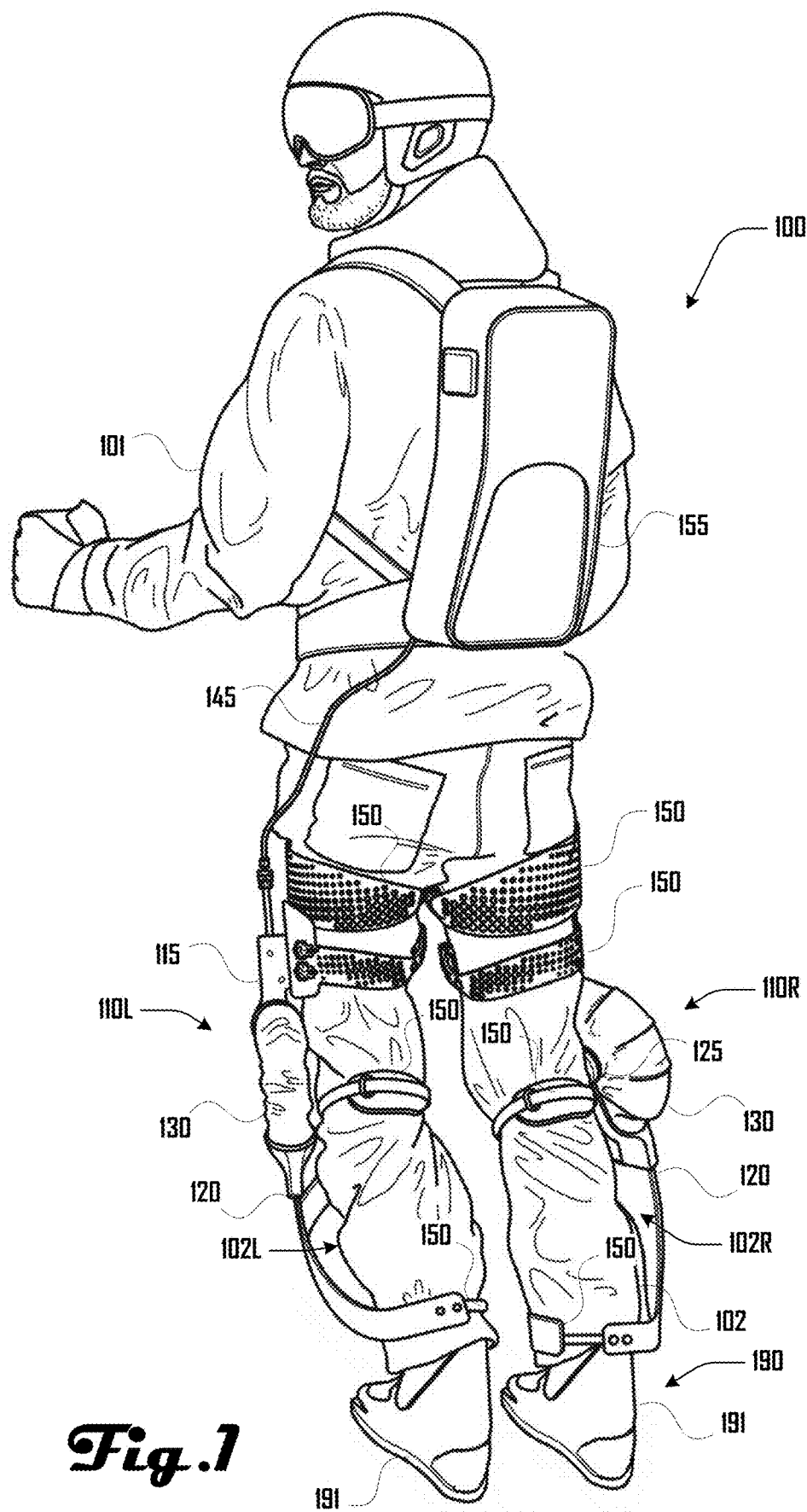
FIG. 1 is an example illustration of an embodiment of an exoskeleton system being worn by a user.

It should be noted that the figures are not drawn to scale and that elements of similar structures or functions are generally represented by like reference numerals for illustrative purposes throughout the figures. It also should be noted that the figures are only intended to facilitate the description of the preferred embodiments. The figures do not illustrate every aspect of the described embodiments and do not limit the scope of the present disclosure.

DETAILED DESCRIPTION

The following disclosure also includes example embodiments of the design of novel exoskeleton devices. Various preferred embodiments include: a leg brace with integrated actuation, a mobile power source and a control unit that determines the output behavior of the device in real-time.

A component of an exoskeleton system that is present in various embodiments is a body-worn, lower-extremity brace that incorporates the ability to introduce torque to the user. One preferred embodiment of this component is a leg brace that is configured to support the knee of the user and includes actuation across the knee joint to provide assistance torques in the extension direction. This embodiment can connect to the user through a series of attachments including one on the boot, below the knee, and along the user's thigh. This preferred embodiment can include this type of leg brace on both legs of the user.

The present disclosure teaches example embodiments of a fluidic exoskeleton system that includes one or more adjustable fluidic actuators. Some preferred embodiments include a fluidic actuator that can be operated at various pressure levels with a large stroke length in a configuration that can be oriented with a joint on a human body.

One aspect of the software that guides a mobile robot, robotic exoskeleton, and the like can be interactive software that configures a system to obtain input from a user or other person or device and to provide feedback to the user or other person or device. For example, some embodiments of such interactive software can have two responsibilities which can include allowing and accepting input (e.g., from a user, administrator, device or system) to the exoskeleton system, and allow the exoskeleton system to deliver feedback (e.g., to a user, administrator, device or system) to indicate status, changes in operation, communication, or the like. Further embodiments can include only one of these responsibilities or can comprise any additional suitable responsibilities.

In some embodiments, an input aspect of interaction software can be dedicated to the intake of information into the exoskeleton system which can be used by the exoskeleton system and/or user to make better informed decisions. This can be accomplished in various embodiments through a variety of input devices or methods as discussed herein, to indicate the need for various actions, and can be provided by various users.

An input function of interaction software can be accomplished in various embodiments through a variety of input devices that are either integrated directly with a component of the system or external and connected electronically with the system. The input responsibility of the interaction software in some examples can be dedicated to gathering intent from the user. In one embodiment, the input responsibility is accounted for through a button that is integrated directly into one or more actuation units of an exoskeleton system. Such a single button can allow a user to indicate a variety of inputs as discussed herein. In another embodiment, input is configured to be provided through an input device that is integrated with a power supply, pneumatic system, or exoskeleton device portion of an exoskeleton system. Such an input element can provide a single button that in some examples has a dedicated enable and disable functionality, a selection indicator dedicated to the user's desired power level, a selector switch dedicated to the amount of predictive intent to integrate into control software, and the like. Such an embodiment can use one or more functionally-locked buttons to provide the user with a set of indicators that correspond to functions of operation of the exoskeleton system. Further embodiments can include various suitable input elements in various suitable locations on an exoskeleton device as discussed herein.

Figure 2:
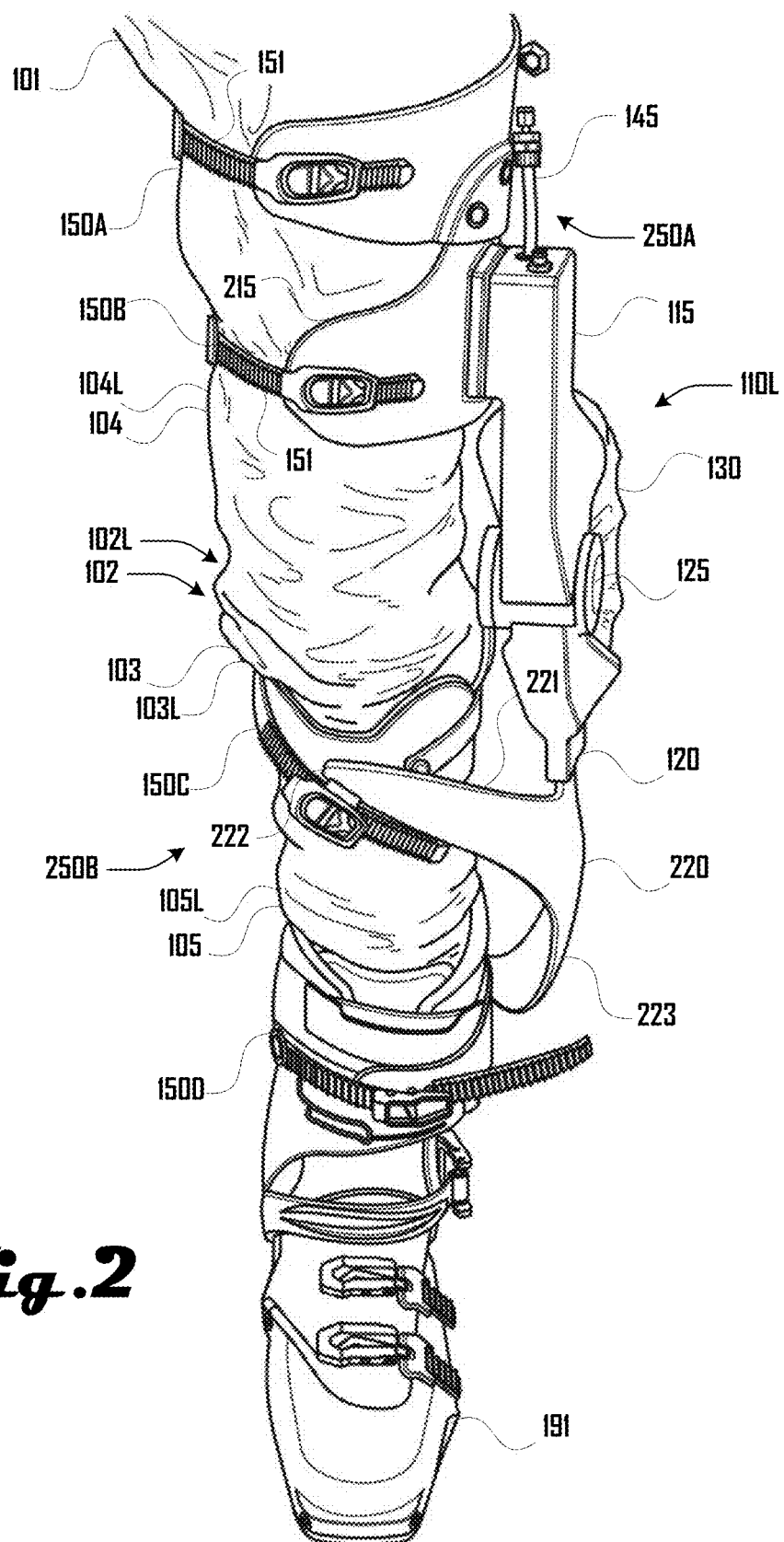
FIG. 2 is a front view of an embodiment of a leg actuation unit coupled to one leg of a user.
Figure 3:
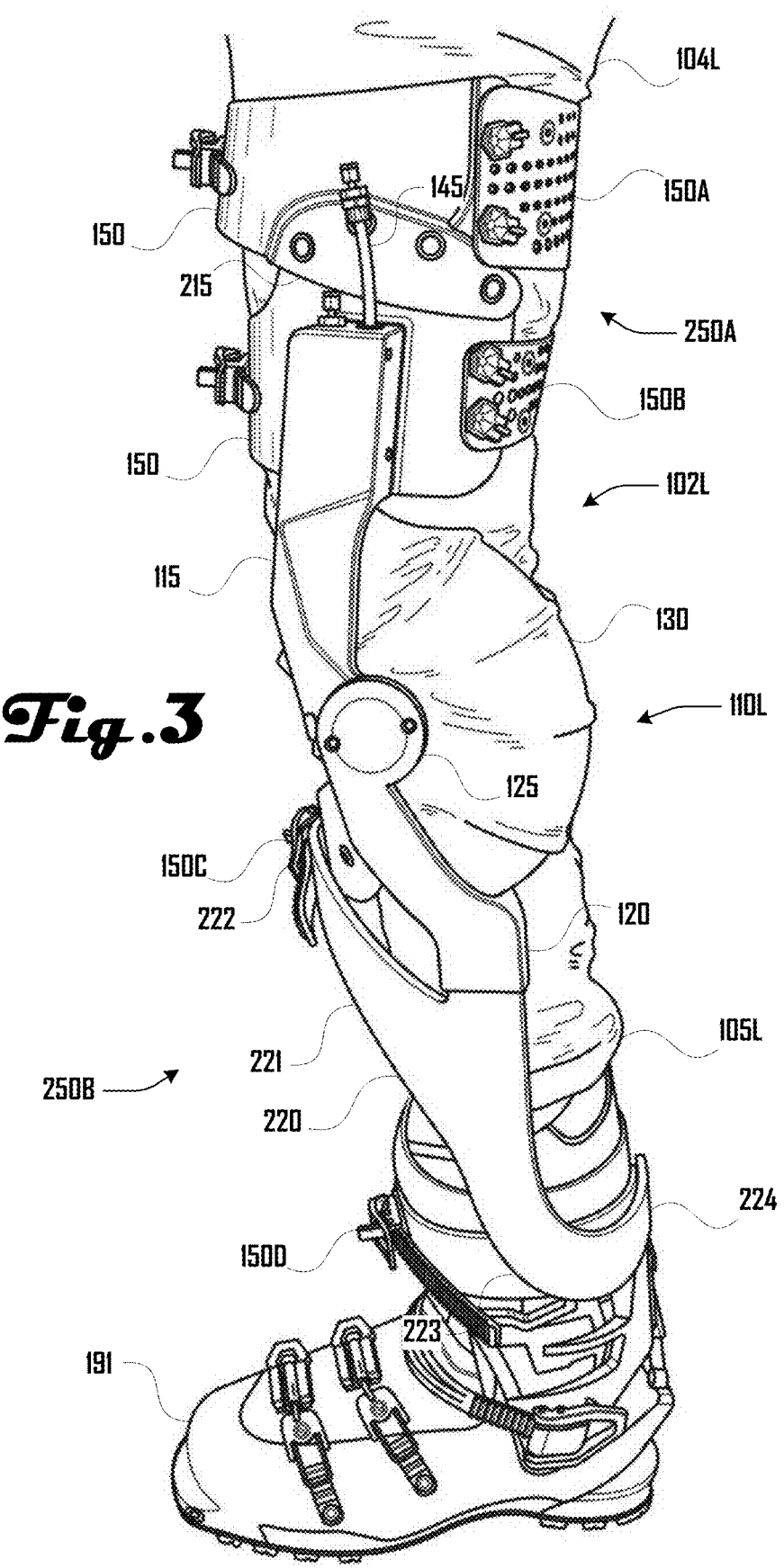
FIG. 3 is a side view of the leg actuation unit of FIG. 3 coupled to the leg of the user.
Figure 4:
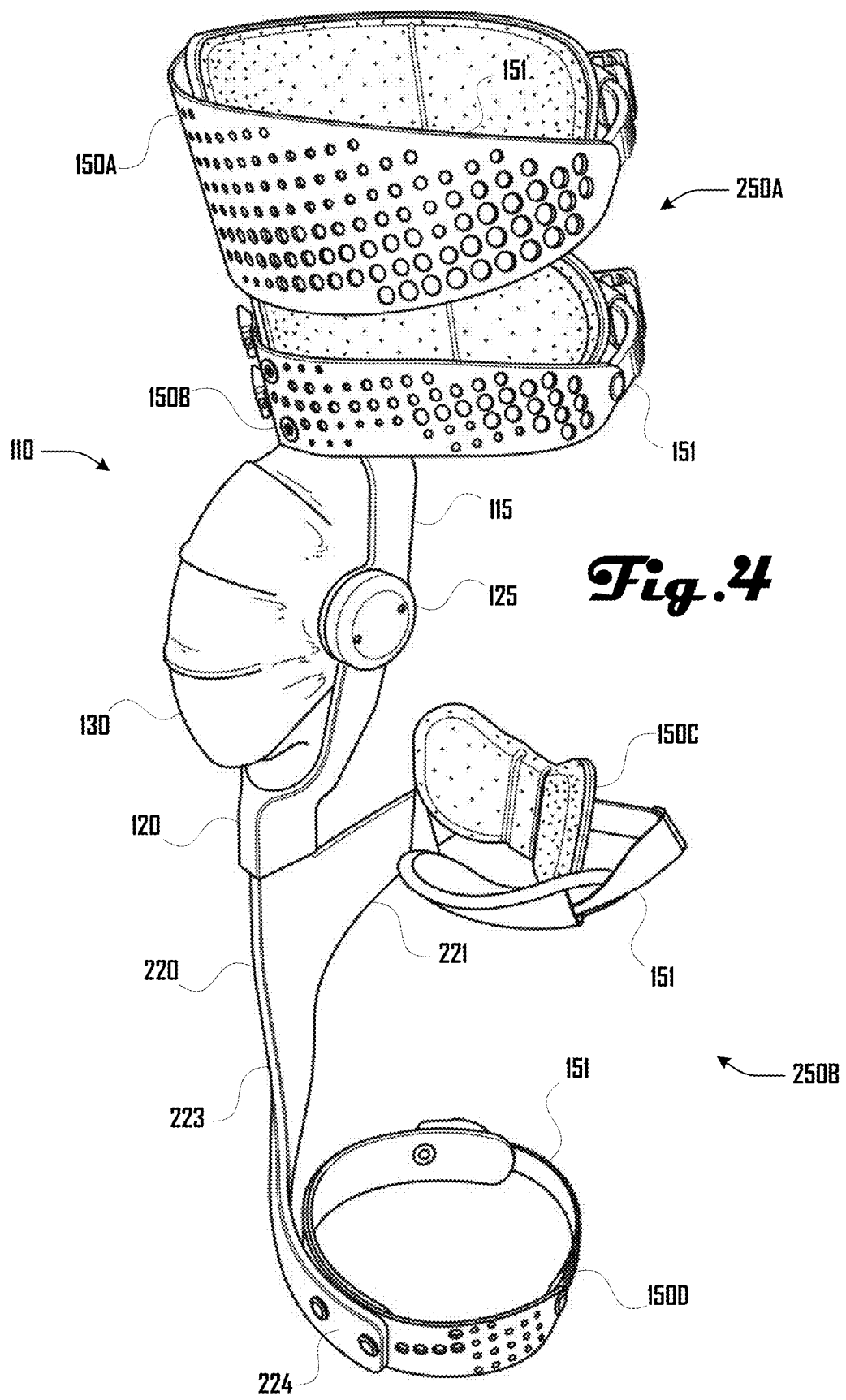
FIG. 4 is a perspective view of the leg actuation unit of FIGS. 3 and 4.

As discussed herein, an exoskeleton system 100 can be configured for various suitable uses. For example, FIGS. 1-3 illustrate an exoskeleton system 100 being used by a user. As shown in FIG. 1 the user 101 can wear the exoskeleton system 100 on both legs 102. FIGS. 2 and 3 illustrate a front and side view of an actuator unit 110 coupled to a leg 102 of a user 101 and FIG. 4 illustrates a side view of an actuator unit 110 not being worn by a user 101.

As shown in the example of FIG. 1, the exoskeleton system 100 can comprise a left and right leg actuator unit 110L, 110R that are respectively coupled to a left and right leg 102L, 102R of the user. In various embodiments, the left and right leg actuator units 110L, 110R can be substantially mirror images of each other.

As shown in FIGS. 1-4, leg actuator units 110 can include an upper arm 115 and a lower arm 120 that are rotatably coupled via a joint 125. A bellows actuator 130 extends between the upper arm 115 and lower arm 120. One or more sets of pneumatic lines 145 can be coupled to the bellows actuator 130 to introduce and/or remove fluid from the bellows actuator 130 to cause the bellows actuator 130 to expand and contract and to stiffen and soften, as discussed herein. A backpack 155 can be worn by the user 101 and can hold various components of the exoskeleton system 100 such as a fluid source, control system, a power source, and the like.

As shown in FIGS. 1-3, the leg actuator units 110L, 110R can be respectively coupled about the legs 102L, 102R of the user 101 with the joints 125 positioned at the knees 103L, 103R of the user 101 with the upper arms 115 of the leg actuator units 110L, 110R being coupled about the upper legs portions 104L, 104R of the user 101 via one or more couplers 150 (e.g., straps that surround the legs 102). The lower arms 120 of the leg actuator units 110L, 110R can be coupled about the lower leg portions 105L, 105R of the user 101 via one or more couplers 150.

The upper and lower arms 115, 120 of a leg actuator unit 110 can be coupled about the leg 102 of a user 101 in various suitable ways. For example, FIGS. 1-3 illustrates an example where the upper and lower arms 115, 120 and joint 125 of the leg actuator unit 110 are coupled along lateral faces (sides) of the top and bottom portions 104, 105 of the leg 102. As shown in the example of FIGS. 1-3, the upper arm 115 can be coupled to the upper leg portion 104 of a leg 102 above the knee 103 via two couplers 150 and the lower arm 120 can be coupled to the lower leg portion 105 of a leg 102 below the knee 103 via two couplers 150.

Specifically, upper arm 115 can be coupled to the upper leg portion 104 of the leg 102 above the knee 103 via a first set of couplers 250A that includes a first and second coupler 150A, 150B. The first and second couplers 150A, 150B can be joined by a rigid plate assembly 215 disposed on a lateral side of the upper leg portion 104 of the leg 102, with straps 151 of the first and second couplers 150A, 150B extending around the upper leg portion 104 of the leg 102. The upper arm 115 can be coupled to the plate assembly 215 on a lateral side of the upper leg portion 104 of the leg 102, which can transfer force generated by the upper arm 115 to the upper leg portion 104 of the leg 102.

The lower arm 120 can be coupled to the lower leg portion 105 of a leg 102 below the knee 103 via second set of couplers 250B that includes a third and fourth coupler 150C,150D. A coupling branch unit 220 can extend from a distal end of, or be defined by a distal end of the lower arm 120. The coupling branch unit 220 can comprise a first branch 221 that extends from a lateral position on the lower leg portion 105 of the leg 102, curving upward and toward the anterior (front) of the lower leg portion 105 to a first attachment 222 on the anterior of the lower leg portion 105 below the knee 103, with the first attachment 222 joining the third coupler 150C and the first branch 221 of the coupling branch unit 220. The coupling branch unit 220 can comprise a second branch 223 that extends from a lateral position on the lower leg portion 105 of the leg 102, curving downward and toward the posterior (back) of the lower leg portion 105 to a second attachment 224 on the posterior of the lower leg portion 105 below the knee 103, with the second attachment 224 joining the fourth coupler 150D and the second branch 223 of the coupling branch unit 220.

As shown in the example of FIGS. 1-3, the fourth coupler 150D can be configured to surround and engage the boot 191 of a user. For example, the strap 151 of the fourth coupler 150D can be of a size that allows the fourth coupler 150D to surround the larger diameter of a boot 191 compared to the lower portion 105 of the leg 102 alone. Also, the length of the lower arm 120 and/or coupling branch unit 220 can be of a length sufficient for the fourth coupler 150D to be positioned over a boot 191 instead of being of a shorter length such that the fourth coupler 150D would surround a section of the lower portion 105 of the leg 102 above the boot 191 when the leg actuator unit 110 is worn by a user.

Attaching to the boot 191 can vary across various embodiments. In one embodiment, this attachment can be accomplished through a flexible strap that wraps around the circumference of boot 191 to affix the leg actuator unit 110 to the boot 191 with the desired amount of relative motion between the leg actuator unit 110 and the strap. Other embodiments can work to restrict various degrees of freedom while allowing the desired amount of relative motion between the leg actuator unit 110 and the boot 191 in other degrees of freedom. One such embodiment can include the use of a mechanical clip that connects to the back of the boot 191 that can provide a specific mechanical connection between the device and the boot 191. Various embodiments can include but are not limited to the designs listed previously, a mechanical bolted connection, a rigid strap, a magnetic connection, an electro-magnetic connection, an electromechanical connection, an insert into the user's boot, a rigid or flexible cable, or a connection directly to a 192.

Another aspect of the exoskeleton system 100 can be fit components used to secure the exoskeleton system 100 to the user 101. Since the function of the exoskeleton system 100 in various embodiments can rely heavily on the fit of the exoskeleton system 100 efficiently transmitting forces between the user 101 and the exoskeleton system 100 without the exoskeleton system 100 significantly drifting on the body 101 or creating discomfort, improving the fit of the exoskeleton system 100 and monitoring the fit of the exoskeleton system 100 to the user over time can be desirable for the overall function of the exoskeleton system 100 in some embodiments.

In various examples, different couplers 150 can be configured for different purposes, with some couplers 150 being primarily for the transmission of forces, with others being configured for secure attachment of the exoskeleton system 100 to the body 101. In one preferred embodiment for a single knee system, a coupler 150 that sits on the lower leg 105 of the user 101 (e.g., one or both of couplers 150C, 150D) can be intended to target body fit, and as a result, can remain flexible and compliant to conform to the body of the user 101. Alternatively, in this embodiment a coupler 150 that affixes to the front of the user's thigh on an upper portion 104 of the leg 102 (e.g., one or both of couplers 150A, 150B) can be intended to target power transmission needs and can have a stiffer attachment to the body than other couplers 150 (e.g., one or both of couplers 150C, 150D). Various embodiments can employ a variety of strapping or coupling configurations, and these embodiments can extend to include any variety of suitable straps, couplings, or the like, where two parallel sets of coupling configurations are meant to fill these different needs.

In some cases the design of the joint 125 can improve the fit of the exoskeleton system 100 on the user. In one embodiment, the joint 125 of a single knee leg actuator unit 110 can be designed to use a single pivot joint that has some deviations with the physiology of the knee joint. Another embodiment, uses a polycentric knee joint to better fit the motion of the human knee joint, which in some examples can be desirably paired with a very well fit leg actuator unit 110. Various embodiments of a joint 125 can include but are not limited to the example elements listed above, a ball and socket joint, a four bar linkage, and the like.

Some embodiments can include fit adjustments for anatomical variations in *varus* or valgus angles in the lower leg 105. One preferred embodiment includes an adjustment incorporated into a leg actuator unit 110 in the form of a cross strap that spans the joint of the knee 103 of the user 101, which can be tightened to provide a moment across the knee joint in the frontal plane which varies the nominal resting angle. Various embodiments can include but are not limited to the following: a strap that spans the joint 125 to vary the operating angle of the joint 125; a mechanical assembly including a screw that can be adjusted to vary the angle of the joint 125; mechanical inserts that can be added to the leg actuator unit 110 to discreetly change the default angle of the joint 125 for the user 101, and the like.

In various embodiments, the leg actuator unit 110 can be configured to remain suspended vertically on the leg 102 and remain appropriately positioned with the joint of the knee 103. In one embodiment, coupler 150 associated with a boot 191 (e.g., coupler 150D) can provide a vertical retention force for a leg actuator unit 110. Another embodiment uses a coupler 150 positioned on the lower leg 105 of the user 101 (e.g., one or both of couplers 150C, 150D) that exerts a vertical force on the leg actuator unit 110 by reacting on the calf of the user 101. Various embodiments can include but are not limited to the following: suspension forces transmitted through a coupler 150 on the boot (e.g., coupler 150D) or another embodiment of the boot attachment discussed previously; suspension forces transmitted through an electronic and/or fluidic cable assembly; suspension forces transmitted through a connection to a waist belt; suspension forces transmitted through a mechanical connection to a backpack 155 or other housing for the exoskeleton device 510 and/or pneumatic system 520 (see FIG. 5); suspension forces transmitted through straps or a harness to the shoulders of the user 101, and the like.

In various embodiments, a leg actuator unit 110 can be spaced apart from the leg 102 of the user with a limited number of attachments to the leg 102. For example, in some embodiments, the leg actuator unit 110 can consist or consist essentially of three attachments to the leg 102 of the user 101, namely via the first and second attachments 222, 224 and 215. In various embodiments, the couplings of the leg actuator unit 110 to the lower leg portion 105 can consist or consist essentially of a first and second attachment on the anterior and posterior of the lower leg portion 105. In various embodiments, the coupling of the leg actuator unit 110 to the upper leg portion 104 can consist or consist essentially of a single lateral coupling, which can be associated with one or more couplers 150 (e.g., two couplers 150A, 150B as shown in FIGS. 1-4). In various embodiments, such a configuration can be desirable based on the specific force-transfer for use during a subject activity. Accordingly, the number and positions of attachments or coupling to the leg 102 of the user 101 in various embodiments is not a simple design choice and can be specifically selected for one or more selected target user activities.

While specific embodiments of couplers 150 are illustrated herein, in further embodiments, such components discussed herein can be operably replaced by an alternative structure to produce the same functionality. For example, while straps, buckles, padding and the like are shown in various examples, further embodiments can include couplers 150 of various suitable types and with various suitable elements. For example, some embodiments can include Velcro hook-and-loop straps, or the like.

FIGS. 1-3 illustrate an example of an exoskeleton system 100 where the joint 125 is disposed laterally and adjacent to the knee 103 with a rotational axis of the joint 125 being disposed parallel to a rotational axis of the knee 103. In some embodiments, the rotational axis of the joint 125 can be coincident with the rotational axis of the knee 103. In some embodiments, a joint can be disposed on the anterior of the knee 103, posterior of the knee 103, inside of the knee 103, or the like.

In various embodiments, the joint structure 125 can constrain the bellows actuator 130 such that force created by actuator fluid pressure within the bellows actuator 130 can be directed about an instantaneous center (which may or may not be fixed in space). In some cases of a revolute or rotary joint, or a body sliding on a curved surface, this instantaneous center can coincide with the instantaneous center of rotation of the joint 125 or a curved surface. Forces created by a leg actuator unit 110 about a rotary joint 125 can be used to apply a moment about an instantaneous center as well as still be used to apply a directed force. In some cases of a prismatic or linear joint (e.g., a slide on a rail, or the like), the instantaneous center can be kinematically considered to be located at infinity, in which case the force directed about this infinite instantaneous center can be considered as a force directed along the axis of motion of the prismatic joint. In various embodiments, it can be sufficient for a rotary joint 125 to be constructed from a mechanical pivot mechanism. In such an embodiment, the joint 125 can have a fixed center of rotation that can be easy to define, and the bellows actuator 130 can move relative to the joint 125. In a further embodiment, it can be beneficial for the joint 125 to comprise a complex linkage that does not have a single fixed center of rotation. In yet another embodiment, the joint 125 can comprise a flexure design that does not have a fixed joint pivot. In still further embodiments, the joint 125 can comprise a structure, such as a human joint, robotic joint, or the like.

In various embodiments, leg actuator unit 110 (e.g., comprising bellows actuator 130, joint structure 125, and the like) can be integrated into a system to use the generated directed force of the leg actuator unit 110 to accomplish various tasks. In some examples, a leg actuator unit 110 can have one or more unique benefits when the leg actuator unit 110 is configured to assist the human body or is included into a powered exoskeleton system 100. In an example embodiment, the leg actuator unit 110 can be configured to assist the motion of a human user about the user's knee joint 103. To do so, in some examples, the instantaneous center of the leg actuator unit 110 can be designed to coincide or nearly coincide with the instantaneous center of rotation of the knee 103 of a user 101. In one example configuration, the leg actuator unit 110 can be positioned lateral to the knee joint 103 as shown in FIGS. 1-3. In various examples, the human knee joint 103 can function as (e.g., in addition to or in place of) the joint 125 of the leg actuator unit 110.

For clarity, example embodiments discussed herein should not be viewed as a limitation of the potential applications of the leg actuator unit 110 described within this disclosure. The leg actuator unit 110 can be used on other joints of the body including but not limited to one or more elbow, one or more hip, one or more finger, one or more ankle, spine, or neck. In some embodiments, the leg actuator unit 110 can be used in applications that are not on the human body such as in robotics, for general purpose actuation, animal exoskeletons, or the like.

Also, embodiments can be used for or adapted for various suitable applications such as tactical, medical, or labor applications, and the like. Examples of such applications can be found in U.S. patent application Ser. No. 15/823,523, filed Nov. 27, 2017 entitled "PNEUMATIC EXOMUSCLE SYSTEM AND METHOD" and U.S. patent application Ser. No. 15/953,296, filed Apr. 13, 2018 entitled "LEG EXOSKELETON SYSTEM AND METHOD", which are incorporated herein by reference.

Some embodiments can apply a configuration of a leg actuator unit 110 as described herein for linear actuation applications. In an example embodiment, the bellows actuator 130 can comprise a two-layer impermeable/inextensible construction, and one end of one or more constraining ribs can be fixed to the bellows actuator 130 at predetermined positions. The joint structure 125 in various embodiments can be configured as a series of slides on a pair of linear guide rails, where the remaining end of one or more constraining ribs is connected to a slide. The motion and force of the fluidic actuator can therefore be constrained and directed along the linear rail.

Figure 5:
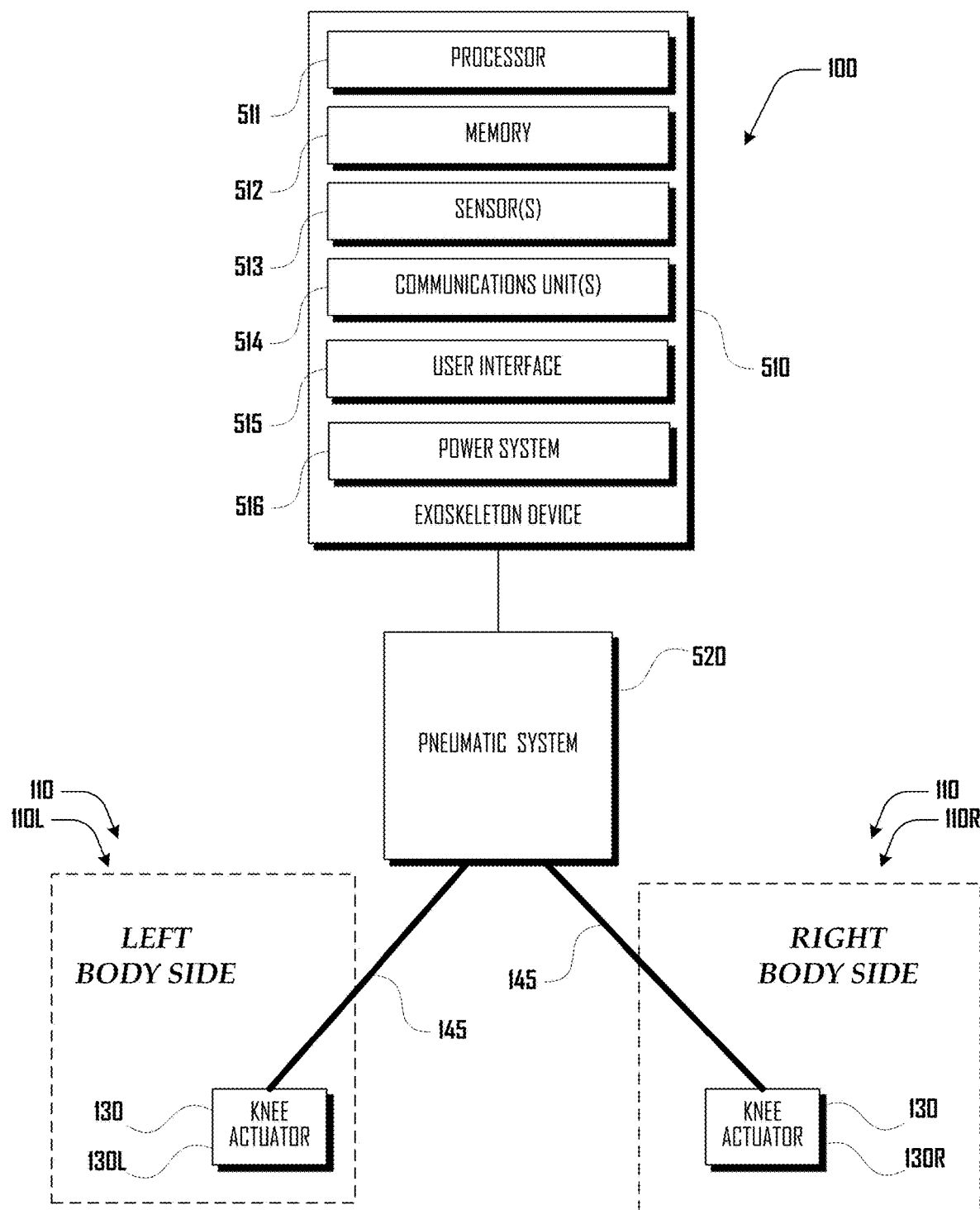
FIG. 5 is a block diagram illustrating an example embodiment of an exoskeleton system.

FIG. 5 is a block diagram of an example embodiment of an exoskeleton system 100 that includes an exoskeleton device 510 that is operably connected to a pneumatic system 520. While a pneumatic system 520 is used in the example of FIG. 5, further embodiments can include any suitable fluidic system or a pneumatic system 520 can be absent in some embodiments, such as where an exoskeleton system 100 is actuated by electric motors, or the like.

The exoskeleton device 510 in this example comprises a processor 511, a memory 512, one or more sensors 513 a communication unit 514, a user interface 515 and a power source 516. A plurality of actuators 130 are operably coupled to the pneumatic system 520 via respective pneumatic lines 145. The plurality of actuators 130 include a pair of knee-actuators 130L and 130R that are positioned on the right and left side of a body 100. For example, as discussed above, the example exoskeleton system 100 shown in FIG. 5 can comprise a left and right leg actuator unit 110L, 110R on respective sides of the body 101 as shown in FIGS. 1 and 2 with one or both of the exoskeleton device 510 and pneumatic system 520, or one or more components thereof, stored within or about a backpack 155 (see FIG. 1) or otherwise mounted, worn or held by a user 101.

Accordingly, in various embodiments, the exoskeleton system 100 can be a completely mobile and self-contained system that is configured to be powered and operate for an extended period of time without an external power source during various user activities. The size, weight and configuration of the actuator unit(s) 110, exoskeleton device 510 and pneumatic system 520 can therefore be configured in various embodiments for such mobile and self-contained operation.

In various embodiments, the example system 100 can be configured to move and/or enhance movement of the user 101 wearing the exoskeleton system 100. For example, the exoskeleton device 510 can provide instructions to the pneumatic system 520, which can selectively inflate and/or deflate the bellows actuators 130 via pneumatic lines 145. Such selective inflation and/or deflation of the bellows actuators 130 can move and/or support one or both legs 102 to generate and/or augment body motions such as walking, running, jumping, climbing, lifting, throwing, squatting, skiing or the like.

In some cases, the exoskeleton system 100 can be designed to support multiple configurations in a modular configuration. For example, one embodiment is a modular configuration that is designed to operate in either a single knee configuration or in a double knee configuration as a function of how many of the actuator units 110 are donned by the user 101. For example, the exoskeleton device 510 can determine how many actuator units 110 are coupled to the pneumatic system 520 and/or exoskeleton device 510 (e.g., on or two actuator units 110) and the exoskeleton device 510 can change operating capabilities based on the number of actuator units 110 detected.

In further embodiments, the pneumatic system 520 can be manually controlled, configured to apply a constant pressure, or operated in any other suitable manner. In some embodiments, such movements can be controlled and/or programmed by the user 101 that is wearing the exoskeleton system 100 or by another person. In some embodiments, the exoskeleton system 100 can be controlled by movement of the user 101. For example, the exoskeleton device 510 can sense that the user is walking and carrying a load and can provide a powered assist to the user via the actuators 130 to reduce the exertion associated with the load and walking. Similarly, where a user 101 wears the exoskeleton system 100, the exoskeleton system 100 can sense movements of the user 101 and can provide a powered assist to the user via the actuators 130 to enhance or provide an assist to the user while skiing.

Accordingly, in various embodiments, the exoskeleton system 130 can react automatically without direct user interaction. In further embodiments, movements can be controlled in real-time by user interface 515 such as a controller, joystick, voice control or thought control. Additionally, some movements can be pre-preprogrammed and selectively triggered (e.g., walk forward, sit, crouch) instead of being completely controlled. In some embodiments, movements can be controlled by generalized instructions (e.g. walk from point A to point B, pick up box from shelf A and move to shelf B).

The user interface 515 can allow the user 101 to control various aspects of the exoskeleton system 100 including powering the exoskeleton system 100 on and off; controlling movements of the exoskeleton system 100; configuring settings of the exoskeleton system 100, and the like. The user interface 515 can include various suitable input elements such as a touch screen, one or more buttons, audio input, and the like. The user interface 515 can be located in various suitable locations about the exoskeleton system 100. For example, in one embodiment, the user interface 515 can be disposed on a strap of a backpack 155 (see e.g., FIG. 7), or the like. In some embodiments, the user interface can be defined by a user device such as smartphone, smart-watch, wearable device, or the like.

In various embodiments, the power source 516 can be a mobile power source that provides the operational power for the exoskeleton system 100. In one preferred embodiment, the power pack unit contains some or all of the pneumatic system 520 (e.g., a compressor) and/or power source (e.g., batteries) required for the continued operation of pneumatic actuation of the leg actuator units 110. The contents of such a power pack unit can be correlated to the specific actuation approach configured to be used in the specific embodiment. In some embodiments, the power pack unit will only contain batteries which can be the case in an electromechanically actuated system or a system where the pneumatic system 520 and power source 516 are separate. Various embodiments of a power pack unit can include but are not limited to a combination of the one or more of the following items: pneumatic compressor, batteries, stored high-pressure pneumatic chamber, hydraulic pump, pneumatic safety components, electric motor, electric motor drivers, microprocessor, and the like. Accordingly, various embodiments of a power pack unit can include one or more of elements of the exoskeleton device 510 and/or pneumatic system 520.

Such components can be configured on the body of a user 101 in a variety of suitable ways. One preferred embodiment is the inclusion of a power pack unit in a torso-worn pack that is not operably coupled to the leg actuator units 110 in any manner that transmits substantial mechanical forces to the leg actuator units 110. Another embodiment includes the integration of the power pack unit, or components thereof, into the leg actuator units 110 themselves. Various embodiments can include but are not limited to the following configurations: torso-mounted in a backpack, torso-mounted in a messenger bag, hip-mounted bag, mounted to the leg, integrated into the brace component, and the like. Further embodiments can separate the components of the power pack unit and disperse them into various configurations on the user 101. Such an embodiment may configure a pneumatic compressor on the torso of the user 101 and then integrate the batteries into the leg actuator units 110 of the exoskeleton system 100.

One aspect of the power supply 516 in various embodiments is that it must be connected to the brace component in such a manner as to pass the operable system power to the brace for operation. One preferred embodiment is the use of electrical cables to connect the power supply 516 and the leg actuator units 110. Other embodiments can use electrical cables and a pneumatic line 145 to deliver electrical power and pneumatic power to the leg actuator units 110. Various embodiments can include but are not limited to any configuration of the following connections: pneumatic hosing, hydraulic hosing, electrical cables, wireless communication, wireless power transfer, and the like.

In some embodiments, it can be desirable to include secondary features that extend the capabilities of a cable connection (e.g., pneumatic lines 145 and/or power lines) between the leg actuator units 110 and the power supply 516 and/or pneumatic system 520. One preferred embodiment includes retractable cables that are configured to have a small mechanical retention force to maintain cables that are pulled tight against the user with reduced slack remaining in the cable. Various embodiments can include, but are not limited to a combination of the following secondary features: retractable cables, a single cable including both fluidic and electrical power, magnetically-connected electrical cables, mechanical quick releases, breakaway connections designed to release at a specified pull force, integration into mechanical retention features on the user's clothing, and the like. Yet another embodiment can include routing the cables in such a way as to minimize geometric differences between the user 101 and the cable lengths. One such embodiment in a dual knee configuration with a torso power supply can be routing the cables along the user's lower torso to connect the right side of a power supply bag with the left knee of the user. Such a routing can allow the geometric differences in length throughout the user's normal range of motion.

One specific additional feature that can be a concern in some embodiments is the need for proper heat management of the exoskeleton system 100. As a result, there are a variety of features that can be integrated specifically for the benefit of controlling heat. One preferred embodiment integrates exposed heat sinks to the environment that allow elements of the exoskeleton device 510 and/or pneumatic system 520 to dispel heat directly to the environment through unforced cooling using ambient airflow. Another embodiment directs the ambient air through internal air channels in a backpack 155 or other housing to allow for internal cooling. Yet another embodiment can extend upon this capability by introducing scoops on a backpack 155 or other housing in an effort to allow air flow through the internal channels. Various embodiments can include but are not limited to the following: exposed heat sinks that are directly connected to a high heat component; a water-cooled or fluid-cooled heat management system; forced air cooling through the introduction of a powered fan or blower; external shielded heat sinks to protect them from direct contact by a user, and the like.

In some cases, it may be beneficial to integrate additional features into the structure of the backpack 155 or other housing to provide additional features to the exoskeleton system 100. One preferred embodiment is the integration of mechanical attachments to support storage of the leg actuator units 110 along with the exoskeleton device 510 and/or pneumatic system 520 in a small package. Such an embodiment can include a deployable pouch that can secure the leg actuator units 110 against the backpack 155 along with mechanical clasps that hold the upper or lower arms 115, 120 of the actuator units 110 to the backpack 155. Another embodiment is the inclusion of storage capacity into the backpack 155 so the user 101 can hold additional items such as a water bottle, food, personal electronics, and other personal items. Various embodiments can include but are not limited to other additional features such as the following: a warming pocket which is heated by hot airflow from the exoskeleton device 510 and/or pneumatic system 520; air scoops to encourage additional airflow internal to the backpack 155; strapping to provide a closer fit of the backpack 155 on the user, waterproof storage, temperature-regulated storage, and the like.

In a modular configuration, it may be required in some embodiments that the exoskeleton device 510 and/or pneumatic system 520 can be configured to support the power, fluidic, sensing and control requirements and capabilities of various potential configurations of the exoskeleton system. One preferred embodiment can include an exoskeleton device 510 and/or pneumatic system 520 that can be tasked with powering a dual knee configuration or a single knee configuration (i.e., with one or two leg actuator units 110 on the user 101). Such an exoskeleton system 100 can support the requirements of both configurations and then appropriately configure power, fluidic, sensing and control based on a determination or indication of a desired operating configuration. Various embodiments exist to support an array of potential modular system configurations, such as multiple batteries, and the like.

In various embodiments, the exoskeleton device 100 can be operable to perform methods or portions of methods described in more detail below or in related applications incorporated herein by reference. For example, the memory 512 can include non-transitory computer readable instructions (e.g., software), which if executed by the processor 511, can cause the exoskeleton system 100 to perform methods or portions of methods described herein or in related applications incorporated herein by reference.

This software can embody various methods that interpret signals from the sensors 513 or other sources to determine how to best operate the exoskeleton system 100 to provide the desired benefit to the user. The specific embodiments described below should not be used to imply a limit on the sensors 513 that can be applied to such an exoskeleton system 100 or the source of sensor data. While some example embodiments can require specific information to guide decisions, it does not create an explicit set of sensors 513 that an exoskeleton system 100 will require and further embodiments can include various suitable sets of sensors 513. Additionally, sensors 513 can be located at various suitable locations on an exoskeleton system 100 including as part of an exoskeleton device 510, pneumatic system 520, one or more fluidic actuator 130, or the like. Accordingly, the example illustration of FIG. 5 should not be construed to imply that sensors 513 are exclusively disposed at or part of an exoskeleton device 510 and such an illustration is merely provided for purposes of simplicity and clarity.

One aspect of control software can be the operational control of leg actuator units 110, exoskeleton device 510 and pneumatic system 520 to provide the desired response. There can be various suitable responsibilities of the operational control software. For example, as discussed in more detail below, one can be low-level control which can be responsible for developing baseline feedback for operation of the leg actuator units 110, exoskeleton device 510 and pneumatic system 520. Another can be intent recognition which can be responsible for identifying the intended maneuvers of the user 101 based on data from the sensors 513 and causing the exoskeleton system 100 to operate based on one or more identified intended maneuvers. A further example can include reference generation, which can include selecting the desired torques the exoskeleton system 100 should generate to best assist the user 101. It should be noted that this example architecture for delineating the responsibilities of the operational control software is merely for descriptive purposes and in no way limits the wide variety of software approaches that can be deployed on further embodiments of an exoskeleton system 100.

One method implemented by control software can be for the low-level control and communication of the exoskeleton system 100. This can be accomplished via a variety of methods as required by the specific joint and need of the user. In a preferred embodiment, the operational control is configured to provide a desired torque by the leg actuator unit 110 at the user's joint. In such a case, the exoskeleton system 100 can create low-level feedback to achieve a desired joint torque by the leg actuator units 110 as a function of feedback from the sensors 513 of the exoskeleton system 100. For example, such a method can include obtaining sensor data from one or more sensors 513, determining whether a change in torque by the leg actuator unit 110 is necessary, and if so, causing the pneumatic system 520 to change the fluid state of the leg actuator unit 110 to achieve a target joint torque by the leg actuator unit 110. Various embodiments can include, but are not limited to, the following: current feedback; recorded behavior playback; position-based feedback; velocity-based feedback; feedforward responses; volume feedback which controls a fluidic system 520 to inject a desired volume of fluid into an actuator 130, and the like.

Another method implemented by operational control software can be for intent recognition of the user's intended behaviors. This portion of the operational control software, in some embodiments, can indicate any array of allowable behaviors that the system 100 is configured to account for. In one preferred embodiment, the operational control software is configured to identify two specific states: Walking, and Not Walking. In such an embodiment, to complete intent recognition, the exoskeleton system 100 can use user input and/or sensor readings to identify when it is safe, desirable or appropriate to provide assistive actions for walking. For example, in some embodiments, intent recognition can be based on input received via the user interface 515, which can include an input for Walking, and Not Walking. Accordingly, in some examples, the use interface can be configured for a binary input consisting of Walking, and Not Walking.

In some embodiments, a method of intent recognition can include the exoskeleton device 510 obtaining data from the sensors 513 and determining, based at least in part of the obtained data, whether the data corresponds to a user state of Walking, and Not Walking. Where a change in state has been identified, the exoskeleton system 100 can be re-configured to operate in the current state. For example, the exoskeleton device 510 can determine that the user 101 is in a Not Walking state such as sitting and can configure the exoskeleton system 100 to operate in a Not Walking configuration. For example, such a Not Walking configuration can, compared to a Walking configuration, provide for a wider range of motion; provide no torque or minimal torque to the leg actuation units 110; save power and fluid by minimizing processing and fluidic operations; cause the system to be alert for supporting a wider variety of non-skiing motion, and the like.

The exoskeleton device 510 can monitor the activity of the user 101 and can determine that the user is walking or is about to walk (e.g., based on sensor data and/or user input), and can then configure the exoskeleton system 100 to operate in a Walking configuration. For example, such a Walking configuration, compared to a Not Walking configuration, can allow for a more limited range of motion that would be present during skiing (as opposed to motions during non-walking); provide for high or maximum performance by increasing the processing and fluidic response of the exoskeleton system 100 to support skiing; and the like. When the user 101 finishes a walking session, is identified as resting, or the like, the exoskeleton system 100 can determine that the user is no longer walking (e.g., based on sensor data and/or user input) and can then configure the exoskeleton system 100 to operate in the Not Walking configuration.

In some embodiments, there can be a plurality of Walking states, or Walking sub-states that can be determined by the exoskeleton system 100, including hard walking, moderate walking, light walking, downhill, uphill, jumping, recreational, sport, running, and the like (e.g., based on sensor data and/or user input). Such states can be based on the difficulty of the walking, ability of the user, terrain, weather conditions, elevation, angle of the walking surface, desired performance level, power-saving, and the like. Accordingly, in various embodiments, the exoskeleton system 100 can adapt for various specific types of walking or movement based on a wide variety of factors.

Another method implemented by operational control software can be the development of desired referenced behaviors for the specific joints providing assistance. This portion of the control software can tie together identified maneuvers with the level control. For example, when the exoskeleton system 100 identifies an intended user maneuver, the software can generate reference behaviors that define the torques, or positions desired by the actuators 130 in the leg actuation units 110. In one embodiment, the operational control software generates references to make the leg actuation units 110 simulate a mechanical spring at the knee 103 via the configuration actuator 130. The operational control software can generate torque references at the knee joints that are a linear function of the knee joint angle. In another embodiment, the operational control software generates a volume reference to provide a constant standard volume of air into a pneumatic actuator 130. This can allow the pneumatic actuator 130 to operate like a mechanical spring by maintaining the constant volume of air in the actuator 130 regardless of the knee angle, which can be identified through feedback from one or more sensors 513.

In another embodiment, a method implemented by the operational control software can include evaluating the balance of the user 101 while walking, moving, standing, or running and directing torque in such a way to encourage the user 101 to remain balanced by directing knee assistance to the leg 102 that is on the outside of the user's current balance profile. Accordingly, a method of operating an exoskeleton system 100 can include the exoskeleton device 510 obtaining sensor data from the sensors 510 indicating a balance profile of a user 101 based on the configuration of left and right leg actuation units 110L, 110R and/or environmental sensors such as position sensors, accelerometers, and the like. The method can further include determining a balance profile based on the obtained data, including an outside and inside leg, and then increasing torque to the actuation unit 110 associated with the leg 102 identified as the outside leg.

Various embodiments can use but are not limited to kinematic estimates of posture, joint kinetic profile estimates, as well as observed estimates of body pose. Various other embodiments exist for methods of coordinating two legs 102 to generate torques including but not limited to guiding torque to the most bent leg; guiding torque based on the mean amount of knee angle across both legs; scaling the torque as a function of speed or acceleration; and the like. It should also be noted that yet another embodiment can include a combination of various individual reference generation methods in a variety of matters which include but are not limited to a linear combination, a maneuver specific combination, or a non-linear combination.

In another embodiment, an operational control method can blend two primary reference generation techniques: one reference focused on static assistance and one reference focused on leading the user 101 into their upcoming behavior. In some examples, the user 101 can select how much predictive assistance is desired while using the exoskeleton system 100. For example, by a user 101 indicating a large amount of predictive assistance, the exoskeleton system 100 can be configured to be very responsive and may be well configured for a skilled operator on a challenging terrain. The user 101 could also indicate a desire for a very low amount of predictive assistance, which can result in slower system performance, which may be better tailored towards a learning user or less challenging terrain.

Various embodiments can incorporate user intent in a variety of manners and the example embodiments presented above should not be interpreted as limiting in any way. For example, method of determining and operating an exoskeleton system 100 can include systems and method of U.S. patent application Ser. No. 15/887,866, filed Feb. 2, 2018 entitled "SYSTEM AND METHOD FOR USER INTENT RECOGNITION,", which is incorporated herein by reference. Also, various embodiments can use user intent in a variety of manners including as a continuous unit, or as a discrete setting with only a few indicated values.

At times it can be beneficial for operational control software to manipulate its control to account for a secondary or additional objective in order to maximize device performance or user experience. In one embodiment, the exoskeleton system 100 can provide an elevation-aware control over a central compressor or other components of a pneumatic system 520 to account for the changing density of air at different elevations. For example, operational control software can identify that the system is operating at a higher elevation based on data from sensors 513, or the like, and provide more current to the compressor in order to maintain electrical power consumed by the compressor. Accordingly, a method of operating a pneumatic exoskeleton system 100 can include obtaining data indicating air density where the pneumatic exoskeleton system 100 is operating (e.g., elevation data), determining optimal operating parameters of the pneumatic system 520 based on the obtained data, and configuring operation based on the determined optimal operating parameters. In further embodiments, operation of a pneumatic exoskeleton system 100 such as operating volumes can be tuned based on environmental temperature, which may affect air volumes.

In another embodiment, the exoskeleton system 100 can monitor the ambient audible noise levels and vary the control behavior of the exoskeleton system 100 to reduce the noise profile of the system. For example, when a user 101 is in a quiet public place or quietly enjoying a location alone or with others, noise associated with actuation of the leg actuation units 110 can be undesirable (e.g., noise of running a compressor or inflating or deflating actuators 130). Accordingly, in some embodiments, the sensors 513 can include a microphone that detects ambient noise levels and can configure the exoskeleton system 100 to operate in a quiet mode when ambient noise volume is below a certain threshold. Such a quiet mode can configure elements of a pneumatic system 520 or actuators 130 to operate more quietly, or can delay or reduce frequency of noise made by such elements.

In the case of a modular system, it can be desirable in various embodiments for operational control software to operate differently based on the number of leg actuation units 110 operational within the exoskeleton system 100. For example, in some embodiments, a modular dual-knee exoskeleton system 100 (see e.g., FIGS. 1 and 2) can also operate in a single knee configuration where only one of two leg actuation units 110 are being worn by a user 101 (see e.g., FIGS. 3 and 4) and the exoskeleton system 100 can generate references differently when in a two-leg configuration compared to a single leg configuration. Such an embodiment can use a coordinated control approach to generate references where the exoskeleton system 100 is using inputs from both leg actuation units 110 to determine the desired operation. However in a single-leg configuration, the available sensor information may have changed, so in various embodiments the exoskeleton system 100 can implement a different control method. In various embodiments this can be done to maximize the performance of the exoskeleton system 100 for the given configuration or account for differences in available sensor information based on there being one or two leg actuation units 110 operating in the exoskeleton system 100.

Accordingly, a method of operating an exoskeleton system 100 can include a startup sequence where a determination is made by the exoskeleton device 510 whether one or two leg actuation units 110 are operating in the exoskeleton system 100; determining a control method based on the number of actuation units 110 that are operating in the exoskeleton system 100; and implementing and operating the exoskeleton system 100 with the selected control method. A further method operating an exoskeleton system 100 can include monitoring by the exoskeleton device 510 of actuation units 110 that are operating in the exoskeleton system 100, determining a change in the number of actuation units 110 operating in the exoskeleton system 100, and then determining and changing the control method based on the new number of actuation units 110 that are operating in the exoskeleton system 100.

For example, the exoskeleton system 100 can be operating with two actuation units 110 and with a first control method. The user 101 can disengage one of the actuation units 110, and the exoskeleton device 510 can identify the loss of one of the actuation units 110 and the exoskeleton device 510 can determine and implement a new second control method to accommodate loss of one of the actuation units 110. In some examples, adapting to the number of active actuation units 110 can be beneficial where one of the actuation units 110 is damaged or disconnected during use and the exoskeleton system 100 is able to adapt automatically so the user 101 can still continue working or moving uninterrupted despite the exoskeleton system 100 only having a single active actuation unit 110.

In various embodiments, operational control software can adapt a control method where user needs are different between individual actuation units 110 or legs 102. In such an embodiment, it can be beneficial for the exoskeleton system 100 to change the torque references generated in each actuation unit 110 to tailor the experience for the user 101. One example is of a dual knee exoskeleton system 100 (see e.g., FIG. 1) where a user 101 has significant weakness issues in a single leg 102, but only minor weakness issues in the other leg 102. In this example, the exoskeleton system 100 can be configured to scale down the output torques on the less-affected limb compared to the more-affected limb to best meet the needs of the user 101.

Such a configuration based on differential limb strength can be done automatically by the exoskeleton system 100 and/or can be configured via a user interface 516, or the like. For example, in some embodiments, the user 101 can perform a calibration test while using the exoskeleton system 100, which can test relative strength or weakness in the legs 102 of the user 101 and configure the exoskeleton system 100 based on identified strength or weakness in the legs 102. Such a test can identify general strength or weakness of legs 102 or can identify strength or weakness of specific muscles or muscle groups such as the quadriceps, calves, hamstrings, gluteus, gastrocnemius; femoris, sartorius, soleus, and the like.

Another aspect of a method for operating an exoskeleton system 100 can include control software that monitors the exoskeleton system 100. A monitoring aspect of such software can, in some examples, focus on monitoring the state of the exoskeleton system 100 and the user 101 throughout normal operation in an effort to provide the exoskeleton system 100 with situational awareness and understanding of sensor information in order to drive user understanding and device performance. One aspect of such monitoring software can be to monitor the state of the exoskeleton system 100 in order to provide device understanding to achieve a desired performance capability. A portion of this can be the development of a system body pose estimate. In one embodiment, the exoskeleton device 510 uses the onboard sensors 513 to develop a real-time understanding of the user's pose. In other words, data from sensors 513 can be used to determine the configuration of the actuation units 110, which along with other sensor data can in turn be used to infer a user pose or body configuration estimate of the user 101 wearing the actuation units 110.

At times, and in some embodiments, it can be unrealistic or impossible for the exoskeleton system 100 to directly sense all important aspects of the system pose due to the sensing modalities not existing or their inability to be practically integrated into the hardware. As a result, the exoskeleton system 100 in some examples can rely on a fused understanding of the sensor information around an underlying model of the user's body and the exoskeleton system 100 the user is wearing. In one embodiment of a dual leg knee assistance exoskeleton system 100, the exoskeleton device 510 can use an underlying model of the user's lower extremity and torso body segments to enforce a relational constraint between the otherwise disconnected sensors 513. Such a model can allow the exoskeleton system 100 to understand the constrained motion of the two legs 102 in that they are mechanically connected through the user's kinematic chain created by the body. This approach can be used to ensure that the estimates for knee orientation are properly constrained and biomechanically valid. In various embodiments, the exoskeleton system 100 can include sensors 513 embedded in the exoskeleton device 510 and/or pneumatic system 520 to provide a fuller picture of the system posture. In yet another embodiment, the exoskeleton system 100 can include logical constraints that are unique to the application in an effort to provide additional constraints on the operation of the pose estimation. This can be desirable, in some embodiments, in conditions where ground truth information is unavailable such as highly dynamic actions, where the exoskeleton system 100 is denied an external GPS signal, or the earth's magnetic field is distorted.

In some embodiments, changes in configuration of the exoskeleton system 100 based location and/or location attributes can be performed automatically and/or with input from the user 101. For example, in some embodiments, the exoskeleton system 100 can provide one or more suggestions for a change in configuration based on location and/or location attributes and the user 101 can choose to accept such suggestions. In further embodiments, some or all configurations of the exoskeleton system 100 based location and/or location attributes can occur automatically without user interaction.

Various embodiments can include the collection and storage of data from the exoskeleton system 100 throughout operation. In one embodiment, this can include the live streaming of the data collected on the exoskeleton device 510 to a cloud storage location via the communication unit(s) 514 through an available wireless communication protocol or storage of such data on the memory 512 of the exoskeleton device 510, which may then be uploaded to another location via the communication unit(s) 514. For example, when the exoskeleton system 100 obtains a network connection, recorded data can be uploaded to the cloud at a communication rate that is supported by the available data connection. Various embodiments can include variations of this, but the use of monitoring software to collect and store data about the exoskeleton system 100 locally and/or remotely for retrieval at a later time for an exoskeleton system 100 such as this can be included in various embodiments.

In some embodiments, once such data has been recorded, it can be desirable to use the data for a variety of different applications. One such application can be the use of the data to develop further oversight functions on the exoskeleton system 100 in an effort to identify device system issues that are of note. One embodiment can be the use of the data to identify a specific exoskeleton system 100 or leg actuator unit 110 among a plurality, whose performance has varied significantly over a variety of uses. Another use of the data can be to provide it back to the user 101 to gain a better understanding of how they ski. One embodiment of this can be providing the data back to the user 101 through a mobile application that can allow the user 101 to review their use on a mobile device. Yet another use of such device data can be to synchronize playback of data with an external data stream to provide additional context. One embodiment is a system that incorporates the GPS data from a companion smartphone with the data stored natively on the device. Another embodiment can include the time synchronization of recorded video with the data stored that was obtained from the device 100. Various embodiments can use these methods for immediate use of data by the user to evaluate their own performance, for later retrieval by the user to understand behavior from the past, for users to compare with other users in-person or through an online profile, by developers to further the development of the system, and the like.

Another aspect of a method of operating an exoskeleton system 100 can include monitoring software configured for identifying user-specific traits. For example, the exoskeleton system 100 can provide an awareness of how a specific skier 101 operates in the exoskeleton system 100 and over time can develop a profile of the user's specific traits in an effort to maximize device performance for that user. One embodiment can include the exoskeleton system 100 identifying a user-specific use type in an effort to identify the use style or skill level of the specific user. Through an evaluation of the user form and stability during various actions (e.g., via analysis of data obtained from the sensors 513 or the like), the exoskeleton device 510 in some examples can identify if the user is highly skilled, novice, or beginner. This understanding of skill level or style can allow the exoskeleton system 100 to better tailor control references to the specific user.

In further embodiments, the exoskeleton system 100 can also use individualized information about a given user to build a profile of the user's biomechanic response to the exoskeleton system 100. One embodiment can include the exoskeleton system 100 collecting data regarding the user to develop an estimate of the individual user's knee strain in an effort to assist the user with understanding the burden the user has placed on his legs 102 throughout use. This can allow the exoskeleton system 100 to alert a user if the user has reached a historically significant amount of knee strain to alert the user that he may want to stop to spare himself potential pain or discomfort.

Another embodiment of individualized biomechanic response can be the system collecting data regarding the user to develop an individualized system model for the specific user. In such an embodiment the individualized model can be developed through a system ID (identification) method that evaluates the system performance with an underlying system model and can identify the best model parameters to fit the specific user. The system ID in such an embodiment can operate to estimate segment lengths and masses (e.g., of legs 102 or portions of the legs 102) to better define a dynamic user model. In another embodiment, these individualized model parameters can be used to deliver user specific control responses as a function of the user's specific masses and segment lengths. In some examples of a dynamic model, this can help significantly with the device's ability to account for dynamic forces during highly challenging activities.

The communication unit 514 can include hardware and/or software that allows the exoskeleton system 100 to communicate with other devices, including a user device, a classification server, other exoskeleton systems 100, or the like, directly or via a network. For example, the exoskeleton system 100 can be configured to connect with a user device, which can be used to control the exoskeleton system 100, receive performance data from the exoskeleton system 100, facilitate updates to the exoskeleton system, and the like. Such communication can be wired and/or wireless communication.

In some embodiments, the sensors 513 can include any suitable type of sensor, and the sensors 513 can be located at a central location or can be distributed about the exoskeleton system 100. For example, in some embodiments, the exoskeleton system 100 can comprise a plurality of accelerometers, force sensors, position sensors, and the like, at various suitable positions, including at the arms 115, 120, joint 125, actuators 130 or any other location. Accordingly, in some examples, sensor data can correspond to a physical state of one or more actuators 130, a physical state of a portion of the exoskeleton system 100, a physical state of the exoskeleton system 100 generally, and the like. In some embodiments, the exoskeleton system 100 can include a global positioning system (GPS), camera, range sensing system, environmental sensors, elevation sensor, microphone, thermometer, or the like. In some embodiments, the exoskeleton system 100 can obtain sensor data from a user device such as a smartphone, or the like.

In some cases, it can be beneficial for the exoskeleton system 100 to generate or augment an understanding of a user 101 wearing the exoskeleton device 100, of the environment and/or operation of the exoskeleton system 100 through integrating various suitable sensors 515 into the exoskeleton system 100. One embodiment can include sensors 515 to measure and track biological indicators to observe various suitable aspects of user 101 (e.g., corresponding to fatigue and/or body vital functions) such as, body temperature, heart rate, respiratory rate, blood pressure, blood oxygenation saturation, expired $CO_2$, blood glucose level, gait speed, sweat rate, and the like.

In some embodiments, the exoskeleton system 100 can take advantage of the relatively close and reliable connectivity of such sensors 515 to the body of the user 101 to record system vitals and store them in an accessible format (e.g., at the exoskeleton device, a remote device, a remote server, or the like). Another embodiment can include environmental sensors 515 that can continuously or periodically measure the environment around the exoskeleton system 100 for various environmental conditions such as temperature, humidity, light level, barometric pressure, radioactivity, sound level, toxins, contaminants, or the like. In some examples, various sensors 515 may not be required for operation of the exoskeleton system 100 or directly used by operational control software, but can be stored for reporting to the user 101 (e.g., via an interface 515) or sending to a remote device, a remote server, or the like.

The pneumatic system 520 can comprise any suitable device or system that is operable to inflate and/or deflate the actuators 130 individually or as a group. For example, in one embodiment, the pneumatic system can comprise a diaphragm compressor as disclosed in related patent application Ser. No. 14/577,817 filed Dec. 19, 2014 or a pneumatic power transmission as discussed herein.

In various embodiments, the exoskeleton system 100 can provide for various types of user interaction, external interaction and feedback to the user 101 and/or other persons or devices, which may be local or remote from the exoskeleton system 100. For example, such interaction can include input from the user 101 as needed into the exoskeleton system 100 and the exoskeleton system 100 providing feedback to the user 101 to indicate changes in operation of the exoskeleton system 100, status of the exoskeleton system 100, and the like. As discussed herein, user input and/or feedback to the user 101 can be provided via one or more user interface 515 of the exoskeleton device 510 or can include various other interfaces or devices such as a smartphone user device, and/or interfaces 515 disposed on any suitable locations of the exoskeleton device 100. For example, one or more user interfaces 515 or devices can be located in various suitable locations such as an external device (see e.g., FIG. 6), a backpack 155 (see e.g., FIGS. 1 and 7), leg actuation units 110 (see e.g., FIG. 8), the pneumatic system 520, or the like.

Figure 6:
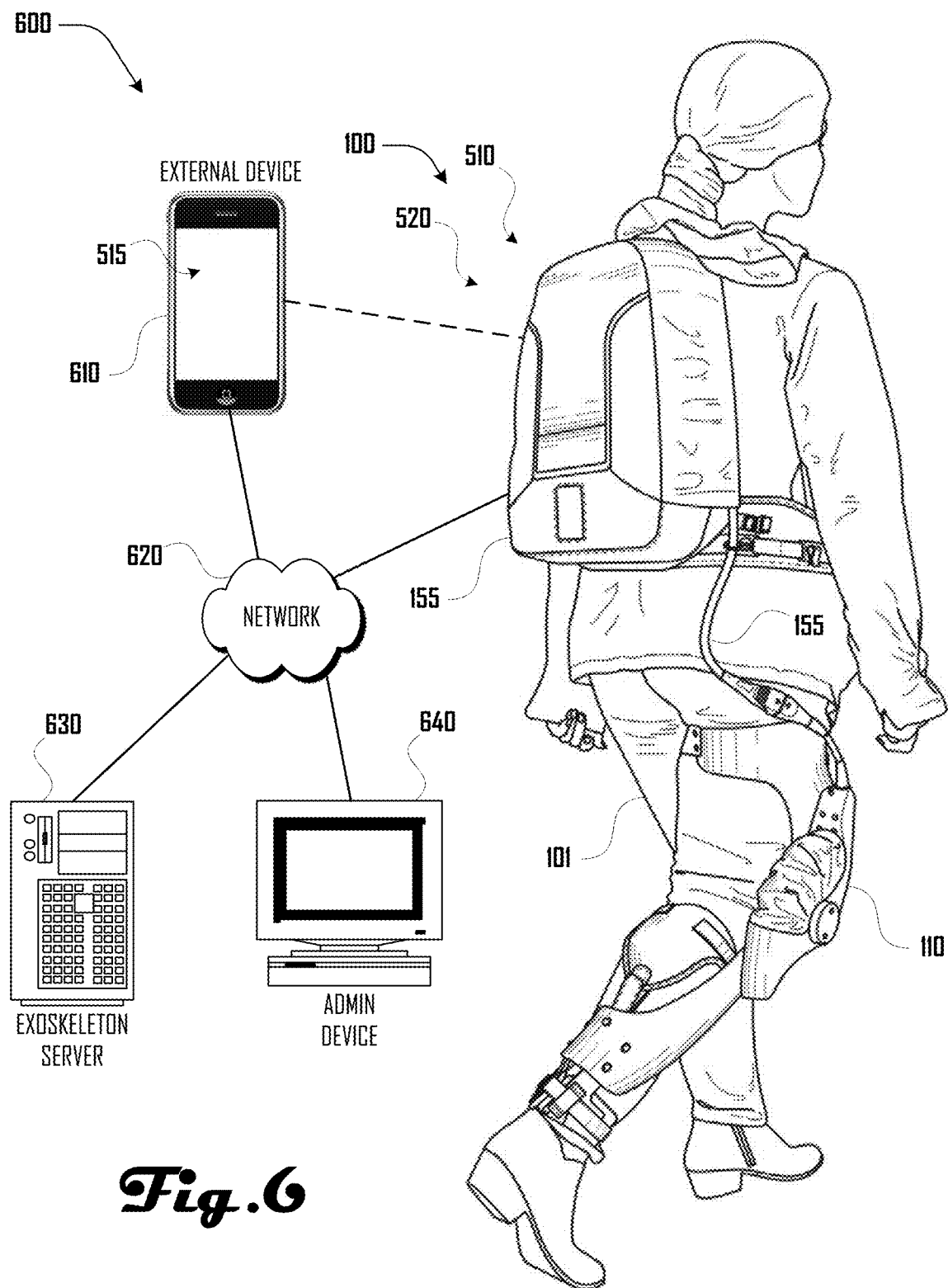
FIG. 6 illustrates an embodiment of an exoskeleton network that includes an exoskeleton system that is operably coupled to an external device via a direct connection and/or via a network and operably coupled to an exoskeleton server and an admin device via the network.

Turning to FIG. 6, an embodiment of an exoskeleton network 600 is illustrated that includes an exoskeleton system 100 that is operably coupled to an external device 610 via a direct connection and/or via a network 620. The exoskeleton system 100 can also be operably coupled to an exoskeleton server 630 and an admin device 640 as illustrated in the example of FIG. 6. For example, in some embodiments some or all of the exoskeleton device 510 and/or pneumatic system 520 (see also FIG. 5) can be disposed within a backpack 155 configured to be worn by the user 101, and the exoskeleton device can be operably connected to an external device 610 and/or network via a communication unit 514 of the exoskeleton device 510 (see FIG. 5). Such one or more connections can be wireless and/or wired connections of various suitable types, such as Bluetooth, RFID, Wi-Fi, a cellular connection, a radio connection, a microwave connection, a satellite connection, or the like.

In some embodiments, the exoskeleton system 100 can be operably connected to the network (and the server 630 and/or admin device 640) via the external device 610. For example, the exoskeleton device 510 may not have a direct operable connection to the network 620 and instead, can have a direct connection to the external device 610 and the external device 610 has an operable connection to the network 620, which allows the exoskeleton system 100 to communicate with the network (and the server 630 and/or admin device 640) via the external device 610.

The network 620 can comprise any suitable wired and/or wireless network such as the Internet, a satellite network, a cellular network, a military network, a microwave network, a Wi-Fi network, a Large Area network (LAN), a Wide Area Network (WAN), or the like. Additionally, the example of FIG. 6 should not be construed as being limiting and any of the illustrated elements can be specifically absent or present in any suitable plurality in further embodiments. For example, in some embodiments, a plurality of exoskeleton systems 100 can be connected to the network 620, which can allow for communication between or among the plurality of exoskeleton systems 100.

The external device 610 in the example of FIG. 6 is show as comprising a smartphone, but various other suitable external devices can be used in further embodiments, including a tablet computer, a headset device, a smartwatch, an embedded system, or the like. In various examples, the external device 610 can present a user interface 515 that allows input and/or feedback as discussed herein. However, it should be noted that the presence of a user interface 515 of an external device 610 does not mean that one or more additional user interfaces 515 is not present on or in the exoskeleton network 600 or exoskeleton system 100. For example, as discussed herein, one or more user interfaces 515 can be located in various suitable locations such as on, in or about a backpack 155 (see e.g., FIGS. 1 and 7), at one or more leg actuation units 110 (see e.g., FIG. 8), at a pneumatic line 145, or the like.

For example, the exoskeleton system 100 can be configured to obtain intent or other input from the user 101 or other person(s) in various suitable ways. This can be accomplished through a variety of input devices that are either integrated directly with components of the exoskeleton system 100 (e.g., one or more user interfaces 515), or external and operably connected with the exoskeleton system 100 (e.g., a smartphone 610, remote server 630, admin device 640, or the like).

Figure 7:
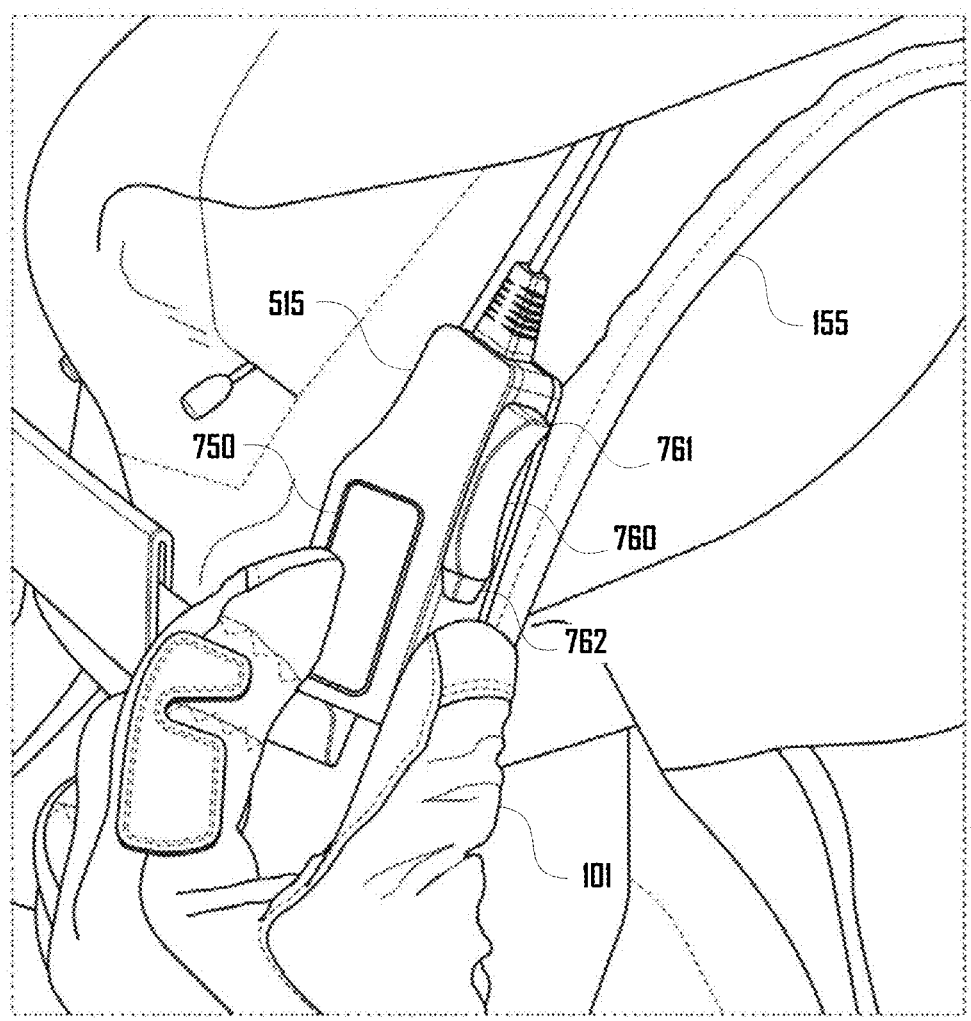
FIG. 7 illustrates an example of a user interface disposed on a strap of a backpack that includes a unitary function button and a selection indicator button.
Figure 8:
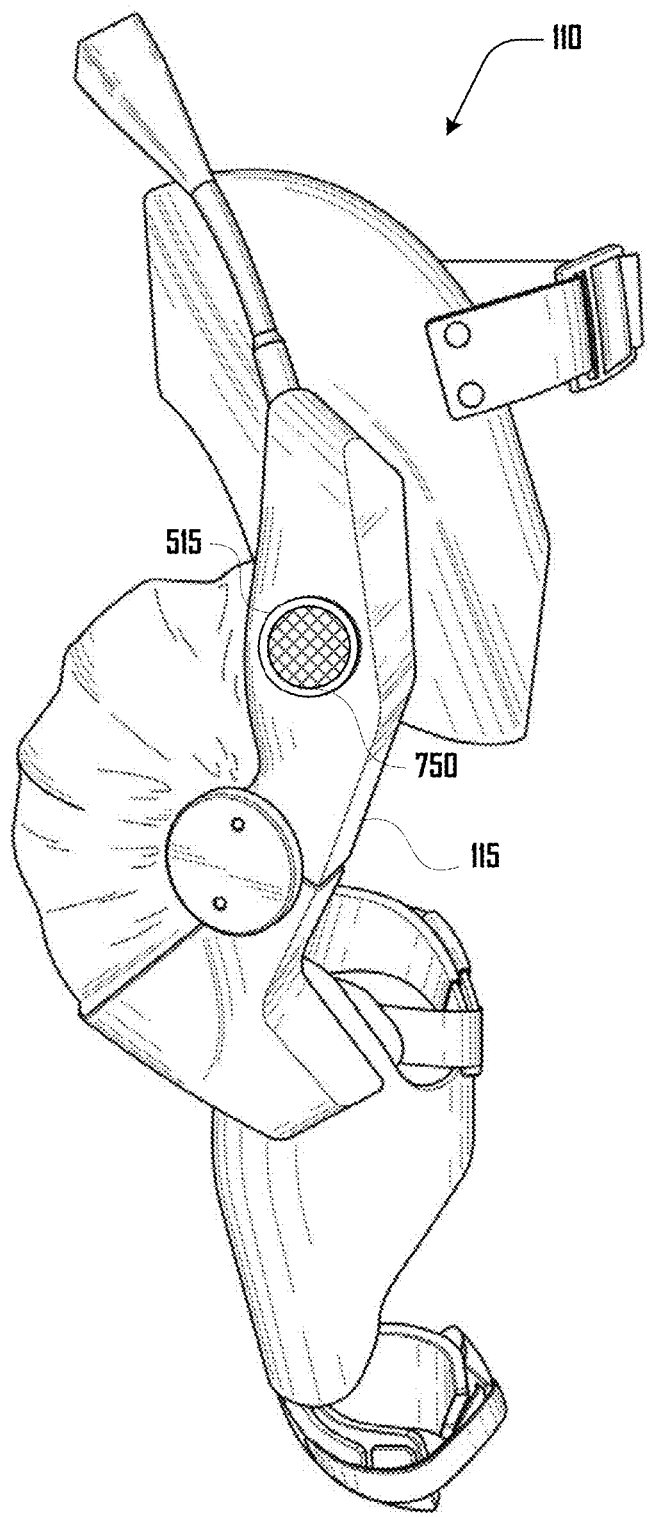
FIG. 8 illustrates a leg actuator unit that includes a unitary function button disposed on a housing of an upper arm of the leg actuation unit.

In one embodiment, a user interface 515 can comprise, consist of, or consist essentially of a single function button that is integrated directly into a lapel-input device and/or one or both of the leg actuation units 110 of the exoskeleton system 100. For example, FIG. 7 illustrates an example of a user interface 515 disposed on a strap of a backpack 155 that includes a unitary function button 750 and FIG. 8 illustrates a leg actuator unit 110 that includes a unitary function button 750 disposed on a housing of an upper arm 115 of the leg actuation unit 110. In various embodiments, such single function buttons can allow the user 101 to indicate a variety of inputs, including inputs for unsupervised, supervised or semi-supervised intent recognition, for enabling and/or disabling a functionality, and the like. For example, some embodiments can include systems and method described and shown in U.S. patent application Ser. No. 16/116,246, filed Aug. 29, 2018, entitled "SEMI-SUPERVISED INTENT RECOGNITION SYSTEM AND METHOD". This application is hereby incorporated herein by reference in its entirely and for all purposes.

In various examples, a user interface 515 can comprise a selection indicator button to indicate a section within a range for various functionalities such as the user's desired power level (e.g., a maximum amount or range of force applied by the leg actuator units 110); an amount of predictive intent to integrate into the control of the exoskeleton system 100; an output level for system components such as the pneumatic system 520; an output volume for audio or haptic feedback, and the like. For example, FIG. 7 illustrates and example of a user interface 515 that includes a selection indicator button 760 that allows the user 101 in increase or decrease one or more settings, or cycle through a group of settings (linearly or circularly) such as by pushing a top end 761 of the selection indicator button 760 to increase a setting or pushing a bottom end 762 of the selection indicator button 760 to decrease a setting or cycling up or down through a group of setting by pushing the top or bottom end 761, 762.

Various embodiments can include one or more user interfaces 515 having any suitable interface, input or feedback elements such as capacitive buttons, toggle buttons or switches, momentary buttons, non-momentary buttons, dials, levers, sliders, touch screens, voice inputs to the device, voice inputs to an intermediate device, cameras, close-range wireless communication element, and the like. Also, the term "button" as used herein should be construed to cover a broad variety of input elements such as a slider, rocker switch, toggle, dial, lever, touch screen, and the like.

The user interfaces 515 are in no way limited to be single function interfaces, and in some embodiments may control one or more functions and/or provide one or more methods of feedback to the user. In various embodiments, the user interface 515 may have one interface that controls one set of functions and then changes to have a different interface and/or control a different set of functions, and/or provides one set of feedback and then changes to provide a different set of feedback, as with a touchscreen and multiple graphical user interfaces or a group of buttons whose functions and haptic feedback change after a sequence of those same buttons are depressed. In some embodiments, a first user interface 515 itself may be rendered capable or incapable by a second user interface 515 or other input, such as with a lock button that prevents accidental activation, either physically and/or through software, of unitary function button 750. In some embodiments, the user interface 515 can be in the form of lights on any internal electronics of the exoskeleton system 100 that provide status or error feedback to the user or a repair technician and the like. In some embodiments, the user interface 515 can be in the form of other user inputs to the internal electronics, such as potentiometers, jumpers, adding or subtracting resistors, internal switches and buttons, that may change the system software or hardware configuration.

In some embodiments, input can be obtained based on data from one or more sensors 513 and can include identification of input from a user 101 based on deliberate input motions by the user 101 (e.g., a toe tap), vibration sensing of tapping on a location of the exoskeleton system 100, algorithmically interpreted intent from an external device 610, or the like. For example, in some embodiments, a user can control, configure or otherwise provide input to the exoskeleton device 110 by one or more body motion, body gesture, or the like, which can be identified and interpreted by the exoskeleton system 100 as an input (e.g., by an exoskeleton device 510 obtaining data from one or more sensors 513 that indicates motion of one or more actuation units 110, which can correspond to a body motion, body gesture, or the like). In some examples, the exoskeleton system 100 can continuously monitor for one or more body motion or body gesture corresponding to a user input, or can monitor for one or more body motion or body gesture corresponding to a user input based on a user input via an interface 515 (e.g., a button used to indicate that such input is about to occur). While such body motion or body gesture input can relate to one or more legs of a user 101, further examples can relate to any other part of the body, such as the arms, hands, fingers, wrists, feet, head, or the like, and, in any combination, such as a toe tap in combination with a head nod to represent an input, or the like.

Some embodiments can include input sensors 513 or a user interface 515 to identify intent at a discrete point in the system operations. In one such embodiment, an exoskeleton system 100 can include a fingerprint reader to create a discrete startup identification process to identify the user 101 who is intending to use the exoskeleton system 100. For example, in various embodiments, one or more user identifiers (e.g., a fingerprint, username, passcode, or the like) can be input by a user 101, which can be used to lock or unlock the exoskeleton system 100 for use, configure the exoskeleton system 100 with one or more settings defined by or associated with the specific user 101, and the like.

In some embodiments, one or more user identifiers associated with a user, administrator, responder, commander, or the like, that is not a user wearing one or more actuator units 110 of the exoskeleton, can be used as an input. For example, such a user identifier can allow such a non-wearer to configure the exoskeleton system 100, gain administrator control over the exoskeleton system 100, or the like.

Also, while various user interfaces 515 can be configured or disposed on the exoskeleton system 100 such that a user 101 wearing the exoskeleton system 100 can interact with such user interfaces 515, in some embodiments, an exoskeleton system 100 can include one or more user interfaces 515 that is configured or disposed on the exoskeleton system 100 such that a user 101 wearing the exoskeleton system 100 cannot interact with or cannot easily interact with such user interfaces 515, but that can be readily interacted with by another user, administrator, responder, commander, or the like. For example, one embodiment can include a touch-sensing interface 515 on the backpack 155 of an exoskeleton system 100 that a user is unable to reach or not easily able to reach, but that can be easily accessed by another person, such as being used in a tactical application to allow a team member to provide input to the system and/or user without speaking, which can be desirable in tactical applications.

In various embodiments, it can be desirable for an input element to be fixed to a specific behavior, function, response, or the like. For example, in some embodiments, and referring to the example of FIG. 7, a button 750 can be included on an interface 515 disposed on a user's lapel that can be fixed to a deactivate response. In one embodiment, regardless of the state of the exoskeleton device 100 and the current configuration of operational control software being executed by the exoskeleton device 510, pressing this dedicated button 750 deactivates the exoskeleton system 100, immediately stopping any positive torque transmission and shutting off all visible lights. This example feature can be desirable during a tactical mission scenario with direct engagement in a hostile environment, where sound or light generated by the exoskeleton device 100 could put a user in danger by giving away the user's position. Various potential configurations of this feature exist that can be centered around a dedicated input that overrides some or all other inputs and such examples are not limited to just the example presented above.

In some examples, (e.g., in a tactical scenario) it can be desirable for the user of an exoskeleton system 100 to be able to quickly doff the exoskeleton system 100 (e.g., to quickly remove one or both leg actuator units 110L, 110R if such actuators become damaged, run out of power, are no longer needed on a mission, malfunction, or otherwise impact the safety or comfort of the user). Some embodiments can comprise a quick-doff feature which can allow the user to quickly remove one or more portions of, or the entire exoskeleton system 100, in an effort to quickly evacuate the exoskeleton system 100 or portions thereof.

For example, one embodiment can include a quick-doff feature on a leg actuator unit 110 of the exoskeleton system 100 that, with the pull of a single lever or push of a button (e.g., button 750 of FIG. 8), all the straps, connectors, or the like that couple the leg actuator unit 110 to the leg 102 are disengaged and the leg actuator unit 110 can fall to the ground or otherwise be quickly removed by the user. Another embodiment can include a quick-doff feature on or about a power pack portion of an exoskeleton system 100 (e.g., a button 750 of an interface 515 on or about a backpack 155) that allows the user to drop a torso- or back-mounted power pack and keep one or more actuator units 110 affixed to the body of the user.

In some embodiments, a quick-doff feature can be a purely mechanical element that physically disengages one or more couplings without electronic or computer elements. However, in some embodiments, a quick-doff feature can be electronically and/or computer operated such as via one or more user interfaces 515. For example, in one embodiment, the exoskeleton device 510 can trigger one or more couplings of some or all portions of the exoskeleton system 100 to disengage (e.g., coupling of one or more leg actuation units 110, backpack 115, or the like). Various suitable couplings can be configured to be disengaged via one or more quick-doff features, such as one or more couplings 150 of a leg actuator unit 110, a line coupling, or the like.

One or more quick-doff features can be configured to allow the entire exoskeleton system 100 to be disengaged from the user, or allow one or more portions of the exoskeleton system 100 to be disengaged from the user. For example, in one embodiment a left leg actuator unit 110L can include a first quick-doff feature that allows the left leg actuator unit 110L to be disengaged from the user; a right leg actuator unit 110R can include a second quick-doff feature that allows the right leg actuator unit 110R to be disengaged from the user; and a backpack 155 can include a third quick-doff feature that allows the backpack 155 to be disengaged from the user. Some embodiments can include a fourth quick-doff feature (in addition to the first, second and third) that allows the left and right leg actuators 110L, 110R and backpack 155 to be disengaged all at once.

Various embodiments can include the examples listed above or combinations thereof. A variety of systems and methods for quick-doff mechanisms are within the scope and spirit of the present disclosure, so the examples herein should not be construed to be limiting. These can include but are not limited to a cable mechanism that is woven through straps of a leg actuator unit 110 that can be removed; a series of buckles that all engage on a single lever; a cable assembly that when pulled exerts force on the system in a variety of locations to disengage couplings or break apart the structure; an electrical button or switch that actuates a mechatronic or mechanical release, such as pulling apart magnets or disengaging electromagnets, and the like. Such a release can cause a plurality of couplings to physically disengage substantially simultaneously, or in quick succession to allow one or more leg actuation units 110 to physically disengage from the user.

In some embodiments, input can be provided to the exoskeleton system 100 from external sources as opposed to just directly from a user 101 wearing the exoskeleton system 100. Such a configuration can be desirable, for example, in a situation in which the user 101 operates with a subset or different set of information than is available to an external party, and it is desirable for an external party to provide input to the exoskeleton system 100 to enforce or guide a desired response or configuration of the exoskeleton system 100, or the like. This can be accomplished in various embodiments through a variety of external input devices or methods (e.g., via an external device 610, exoskeleton server 130, admin device 640, or the like) to provide input to an exoskeleton system 100 to indicate the need for various actions, generate a configuration, provide an alert, or the like.

Input to an exoskeleton system 100 may come from a variety of sources that are external, not located in the immediate vicinity of the exoskeleton system 100, or are operated by another party. For example, in one embodiment, the input data can be sent to the exoskeleton system from an external device such as a car sending information to the exoskeleton system 100 via a vehicle API. In another embodiment, the exoskeleton system 100 can receive GPS data, such as elevation, terrain, or location with specific input data associated with a given location, area, or the like. In another embodiment, the user of an exoskeleton system 100 may have an oversight team that is overseeing the operation of the exoskeleton system 100 and the user during use of the exoskeleton system 100 (e.g., via one or more remote admin devices 640, or the like). For example, the oversight team may observe physical and environmental aspects not observable by the user 101 wearing the exoskeleton system 100 and provide those inputs to the exoskeleton system 100 and/or the user 101. The oversight team may also access and configure the exoskeleton system 100 even when the user is incapable of access to the exoskeleton system 100 due to becoming separated from the exoskeleton system 100, physical incapacity, or the like. In a further embodiment, data can be obtained by a remote device (e.g., exoskeleton server 630, admin device 640, or the like) and such data can be used in various suitable ways, such as being used to send help or assistance to the location of the user wearing the exoskeleton system 100, or the like.

One or more user interfaces 515 can provide information to the user 101 to allow the user to appropriately use and operate the exoskeleton system 100. Such feedback can be via one or more of visual, haptic and/or audio feedback which can include: feedback mechanisms integrated directly on one or both of the actuation units 110; feedback through operation or actuation of the actuation units 110; feedback through external devices or systems not integrated with the exoskeleton system 100 (e.g., a mobile device); and the like. In various embodiments, one or more user interfaces 515 can present various types of information, including battery level, performance level, weather information, environment information, advertisements, operational errors, power status, fluid storage state, system startup, system power-down, proper fit, improper fit, connection of an external device 610, disconnection of an external device 610, receipt of a message, system malfunction, and the like.

Figure 9:
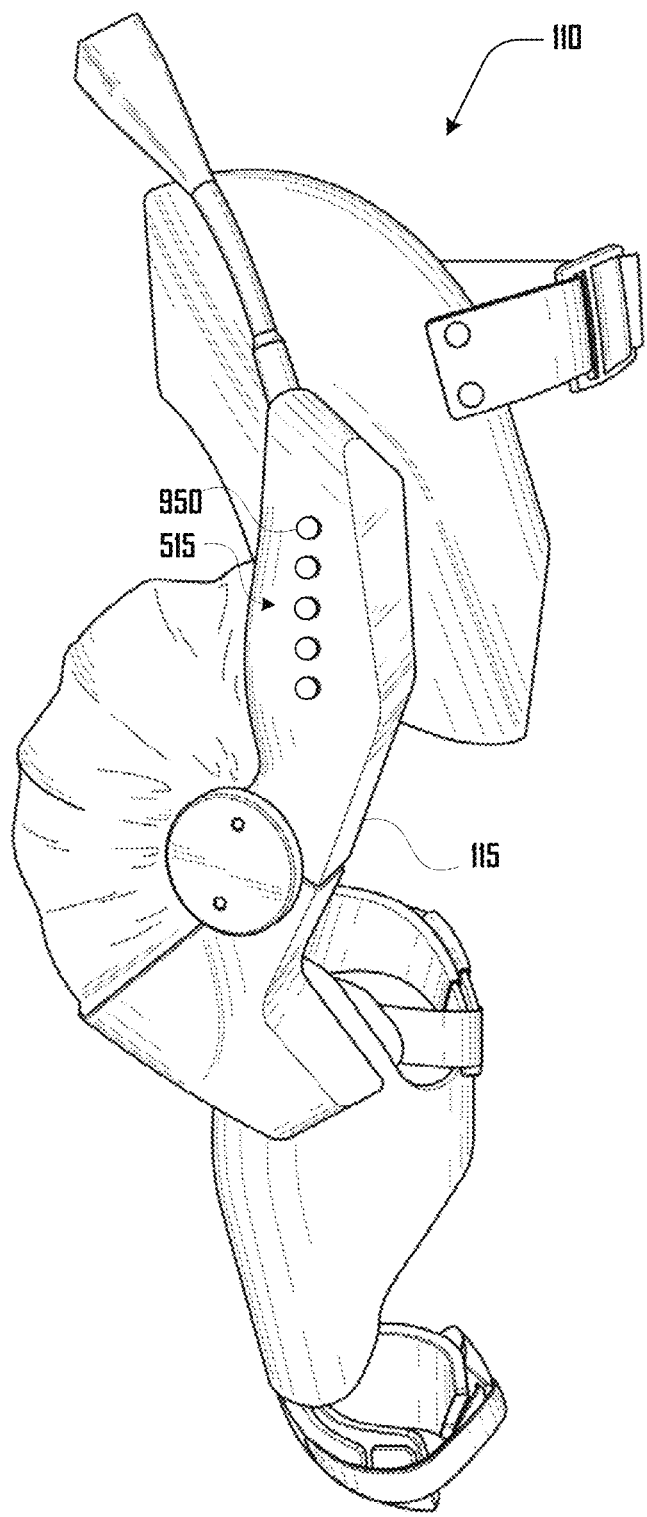
FIG. 9 illustrates and example of a user interface consisting of five lights that are integrated into an upper arm of a leg actuation unit.

Some embodiments can include integration of feedback lights in the actuation units 110, on or about a backpack 155, on an external device, and the like. In one such embodiment, such as shown in the example of FIG. 9, a user interface 515 can comprise five lights 950 that integrate into an upper arm 115 of a leg actuation unit 110 or other suitable location on an exoskeleton device 100 such that the user 101 can see the lights 950. Such lights 950 can be mono- or multi-colored and can be used to indicate various types of information such as feedback of system errors, device power, successful operation of the device, and the like.

In one embodiment, the number of lit lights 950 can indicate the battery level, the color of the lit lights 950 can indicate a currently set mode of operation of the exoskeleton system 100 and the lights 950 can turn red when an error or fault is detected. The specific embodiment of FIG. 9 should not be construed as being limiting and a wide variety of other configurations of lights 950 or other visual indicators can be present, including an OLED screen, flashing lights, or the like. In various embodiments, such lights 950, a screen, or the like, can be configured to allow interaction such as via touch, pressing, or the like.

In various embodiments, the exoskeleton system 100 can provide controlled feedback to the user to indicate specific pieces of information. For example, in some embodiments, the exoskeleton system 100 can generate haptic feedback to the user 101 in various suitable ways, including by pulsing, actuating, vibrating, or otherwise configuring one or more actuation units 110 in a way that conveys information to the user 101 wearing the exoskeleton system 101. One specific example can include pulsing joint torques on one or more leg actuation units 110 to a maximum allowed torque when the user changes the maximum allowable user-desired torque (e.g., via selection indicator button 760) which can provide a haptic indicator of the torque settings to the use such that the user can physically feel the current setting of the maximum allowable torque.

In another embodiment, a user 101 can cycle through a group of settings and an indication of the present setting can be generated by haptic feedback generated by one or more leg actuation units 110, such as a unique haptic identifier that can indicate to the user what the current setting is. For example, where a group of settings includes a first, second and third setting, the one or more leg actuation units 110 can pulse one time to indicate the first setting, pulse two times to indicate the second setting, and pulse three times to indicate the third setting. Various suitable unique haptic indicators can be used, which can be based on a duration of a pulse, a number of pulses, frequency of pulses, magnitude of pulses, pulses of a left or right actuator unit 110, a code such as Morse code, and the like.

In some embodiments, haptic feedback can provide alert or status notifications regarding exoskeleton system information such as operational errors, power status, fluid storage state, system startup, system power-down, proper fit, improper fit, connection of an external device 610, disconnection of an external device 610, receipt of a message, and the like. In another embodiment, a third party person or team observing the exoskeleton system 100 (e.g., via a remote admin device 640) may send alert notifications to the exoskeleton system 100, which can be presented via one or more user interfaces 515, via haptic feedback associated with actuation of the exoskeleton system 100, or the like. Yet another embodiment incorporates a display screen into one or more leg actuation units 110 that is configured to provide audible and tactile feedback.

In some embodiments, haptic feedback can be used for communication to a user. For example, in a tactical application with a plurality of operators wearing respective exoskeleton systems 100, a local squad leader or remote commander (e.g., via an admin device 640) can issue orders that can be received by one or more of the exoskeleton devices 100, such as breach door, advance, retreat, stop, meet at extraction point, regroup, fire, cease fire, man down, or the like.

In various examples, such communications can be tailored to a given user based on various factors. For example, a plurality of users wearing respective exoskeleton devices 100 moving to a specific location can be directed based on haptic feedback such as a pulse or other indicator on a left exoskeleton device 110L indicating to move left and a pulse or other indicator on a right exoskeleton device 110L indicating to move right.

Audio feedback generated by the exoskeleton system 100 or an external device 510 can be used similarly. For example, in addition to audio feedback being generated by a speaker, in some embodiments, sound can be selectively generated by a pneumatic system 520, actuator unit 110, fluidic actuator 130, or the like that can be used in providing an alert or communicating to a user. In some embodiments, sound can be selectively generated by a compressor, introducing fluid to an actuator 130, releasing of fluid, configuring an actuator unit 110, opening or closing a valve, or the like, which can be used in providing an alert or communicating to a user.

Also, while some examples can include generating haptic and/or audio feedback by one or more portions of an exoskeleton system 100, further embodiments can include haptic, audio, or visual feedback via an external device 610, such as via a web interface, SMS text or email, vibration, sound via a speaker, or the like.

Figure 10:
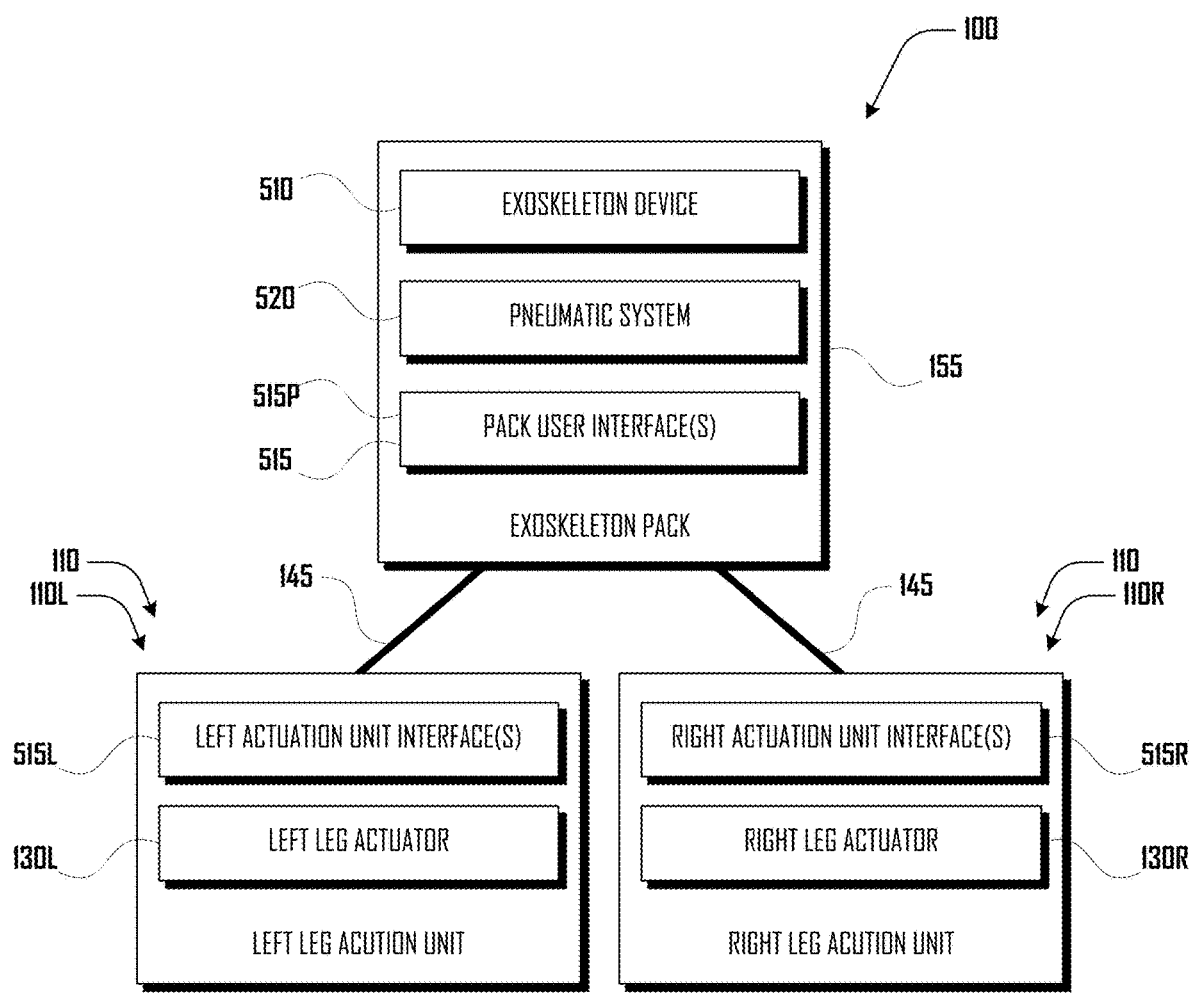
FIG. 10 is a block diagram of an example embodiment of an exoskeleton system that includes an exoskeleton pack having an exoskeleton device and pneumatic system, which is operably coupled to a left and right leg actuation unit via respective lines.

Turning to FIG. 10, a block diagram of an example embodiment of an exoskeleton system 100 is illustrated that includes an exoskeleton pack 155 having an exoskeleton device 510 and pneumatic system 520, which is operably coupled to a left and right leg actuation unit 110L, 110R via respective lines 145. The left and right leg actuator units 110L, 110R include respective left and right leg actuators 130L, 130R. The exoskeleton system 100 further comprises a first, second and third user interface 515. Specifically, the exoskeleton pack 155 further comprises one or more pack user interfaces 515P, the left actuation unit 110L further comprises a left actuation unit interface 515L and the right actuation unit 110R further comprises a right actuation unit interface 515R.

In various embodiments, any of the first, second and third user interfaces 515 can be the same or different. Additionally, in some embodiments, one or more of the first, second and third user interfaces 515 can have input elements (e.g., buttons) or feedback elements (e.g., lights or screen) that are the same and redundant. For example, in some embodiments, the left and right leg actuators units 110L, 110R can have the same user interfaces 515 with redundant input and/or output elements.

In one specific embodiment, for example, both the left and right leg actuators units 110L, 110R can have the same user interface 515L, 515R that includes a single input button 750 as shown in FIG. 8 and a set of feedback lights 950 as shown in FIG. 9. The button 750 of these same user interfaces 515L, 515R can be associated with the same functionality such that pushing either would trigger the same functionality. Similarly, the feedback lights 950 can present the same feedback output.

Such an embodiment, where user interfaces 515L, 515R of the left and right leg actuators units 110L, 110R are the same and redundant can be desirable so that a user 101 has access to an interface 515 on both the left and right side in case one of the user's hands is unavailable to actuate the button 750 on one side, or if the user 101 is in a position where only one of the sets of lights 950 is visible to the user 101. Such an embodiment, where user interfaces 515L, 515R of the left and right leg actuators units 110L, 110R are the same and redundant can also be desirable where the exoskeleton system 100 is modular such that the exoskeleton system 100 can operate in a dual- or single-leg configuration. For example, having the user interfaces 515L, 515R of the left and right leg actuators units 110L, 110R be the same can allow for user to operate the exoskeleton system 100 when only one of the actuator units 110L, 110R is operably coupled to the exoskeleton system 100. These example embodiments in no way limit the various combinations and number of user interfaces that may exist on the various components of the exoskeleton system 100, nor do they limit the combination and number of redundant and unique user interfaces.

In various embodiments, one or more exoskeleton systems 100 can be directly controlled by an external third party (e.g., via an admin device 640 as shown in FIG. 6). In one example of such an embodiment, the user 101 may be forced to drop and leave the exoskeleton system 100, thereby losing control of the exoskeleton system 100, and the oversight team can issue an input to the exoskeleton system 100 to disable or configure the exoskeleton system 100, even if someone attempts to pick it up and use it.

In another embodiment, the exoskeleton system 100 can automatically prepare for an action being performed based on an increased probability that such action will be performed by the user. Determining such a probability of a given action being performed (e.g., by an exoskeleton device 510) may be based on past user action, previously known terrain, behavior under similar situations, GPS location, weather and the like. In one specific embodiment, the exoskeleton system 100 receives GPS information through a wireless connection (e.g., via a network 620) and the received GPS information can indicate that the exoskeleton system 100 is operating on a mountain path that has lots of elevation changes. In such an embodiment, the exoskeleton system 100 can configure itself to be more likely to identify that a user 101 is ascending or descending a slope based on that being a more likely event than would normally be the case.

In a further embodiment, a second exoskeleton system 100 in the same area that has already experienced the environment and terrain may send information directly or indirectly to a first exoskeleton system 100 that has not yet entered the terrain, and the first exoskeleton system 100 can use the information to prepare for the coming features such as by changing a configuration of the exoskeleton system 100. One specific embodiment of this involves an exoskeleton system 100 used for downhill skiing. For example, if a first exoskeleton system 100 encounters a section of snow that creates a high risk for fall or injury, it can send an alert to one or more nearby exoskeleton systems 100 to notify them of the location and conditions. The one or more receiving exoskeleton systems 100 can use that information to notify the user of a warning area, (e.g., via one or more user interfaces 515) attempt to guide the user away from the warning area (e.g., via one or more user interfaces 515 or configuring the exoskeleton systems 100), and then protect the user through the warning area when the warning area is encountered. In some examples, a plurality of exoskeleton systems 100 can communicate directly, communicate via a network 620, communicate via an exoskeleton server 630, or the like. Various embodiments can use the options listed above or combinations and variants thereof, but are in no way limited to the explicitly stated combinations of actions and items.

As discussed herein, various embodiments relate to a method of semi-supervised intent recognition for wearable devices such as an exoskeleton system 100. Semi-supervised intent recognition methods of various embodiments can be distinguished from fully-supervised intent recognition methods and unsupervised intent recognition methods as described in more detail below.

Figure 11:
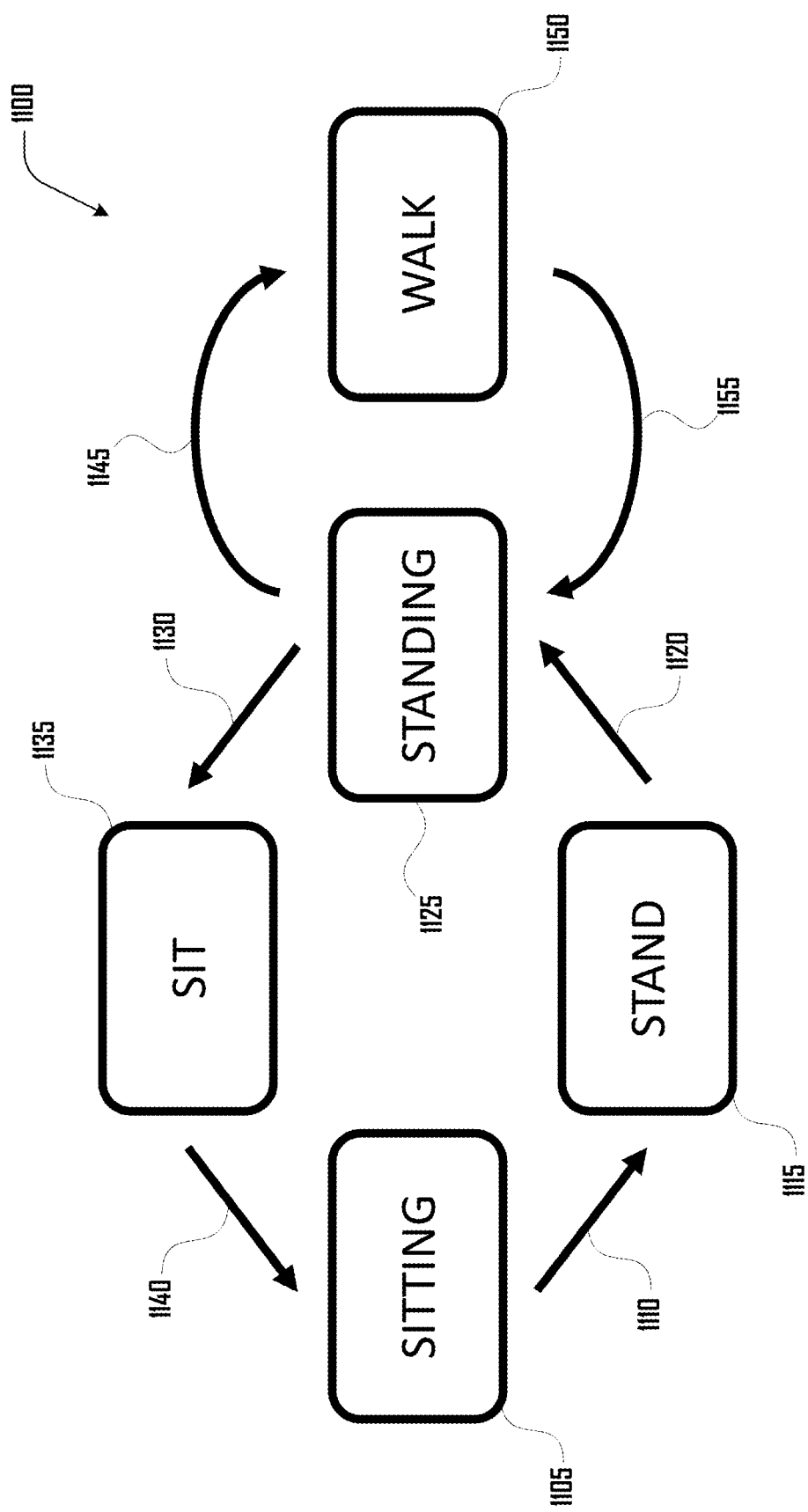
FIG. 11 illustrates an example state machine for an exoskeleton system that includes a plurality of system states and transitions between the system states.

Turning to FIG. 11, an example state machine 1100 for an exoskeleton system 100 is illustrated, which includes a plurality of system states and transitions between the system states. More specifically, the state machine 1100 is shown comprising a sitting state 1105, from which the exoskeleton system 100 can transition to a stand state 1115 via a sitting-stand transition 1110. The exoskeleton system 100 can transition from the stand state 1115 to a standing state 1125 via a stand-standing transition 1120. The exoskeleton system 100 can transition from the standing state 1125 to a sit state 1135 via a standing-sit transition 1130. The exoskeleton system 100 can transition from the sit state 1135 to a sitting state 1105 via a sit-sitting transition 1140.

For example, where a user 101 is sitting in a chair, the exoskeleton system 100 can be in a sitting state 1105 and when the user 101 wants to stand up, the exoskeleton system 100 can move from sitting 1105 to standing 1120 via the stand state 1115, which moves the user 101 from a sitting position to a standing position. Where the user 101 is standing by a chair, the exoskeleton system 100 can be in a standing state 1125 and when the user 101 wants to sit in the chair, the exoskeleton system 100 can move from standing 1125 to sitting 1105 via the sit state 1135, which moves the user 101 from a standing position to a sitting position.

Also, as shown in the state machine 1100, the exoskeleton system 100 can move from the standing-state 1125 to a walking state 1150 via a standing-walk transition 1145. The exoskeleton system 100 can move from the walking state 1150 to the standing state 1125 via a walk-standing transition 1155. For example, where a user 101 is standing 1125, the user 101 can choose to walk 1150 and can choose to stop walking 1150 and return to standing 1120.

The example state machine 1100 is used herein for purposes of illustration only and should not be construed to be limiting on the wide variety of state machines for an exoskeleton system 200 that are within the scope and sprit of the present disclosure. For example, some embodiments can include a simpler state machine having only standing and walking states 1125, 1150. Further embodiments can include additional states such as a running state from the walking state 1150, or the like.

Figure 12:
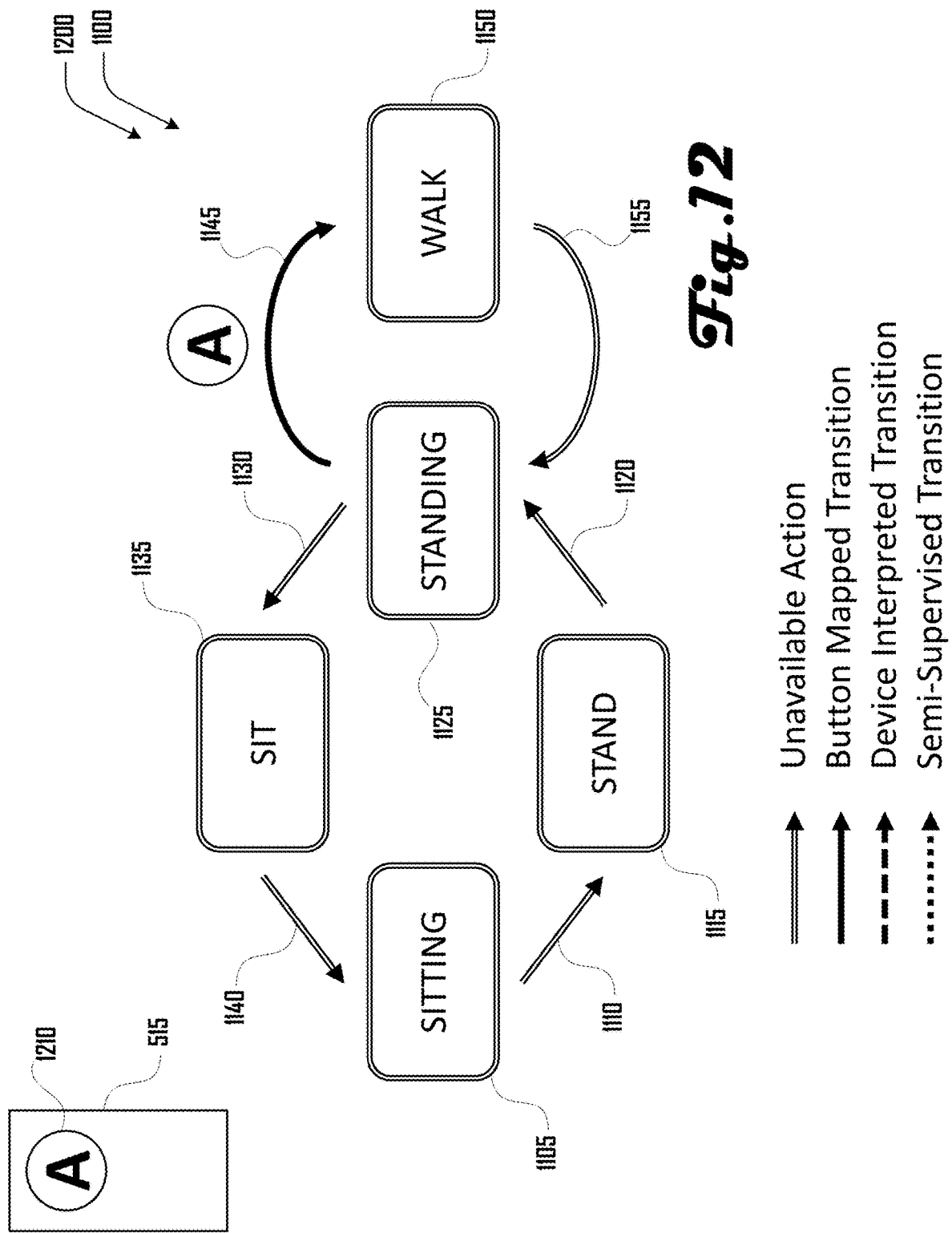
FIG. 12 is an example of a fully supervised intent recognition method illustrated in the context of the state machine of FIG. 11 and a user interface having a first button.

Turning to FIG. 12, an example of a fully-supervised intent recognition method 1200 is illustrated in the context of the state machine 1100 of FIG. 11 and a user interface 515 (see FIG. 5) having an A-button 1210. In a fully-supervised state machine of various examples, the user 101 provides a direct manual input to an interface 525 to dictate the initiation of a single unique transition from one state to another, upon which the exoskeleton system 100 is slaved to initiate that transition. In this example, that manual input is represented by a button press of the A-button 1210. The A-Button 1210 is shown mapped to a single transition (i.e., standing-walk transition 1145) from a standing state 1125 to a walk state 1150. If button A is pressed and the exoskeleton system 100 detects that the user 101 is in a safe configuration to initiate a transition to walking 1150, the exoskeleton system 100 will initiate a transition 1145 to the walk state 1150 from the standing state 1125. In other words, in this example, Button A can only trigger the standing-walk transition 1145 from the standing state 1125 to the walking state 1150, with all other transitions (i.e., 1110, 1120, 1130, 1140, 1155) being unavailable via a button press of the A-Button 1210.

Figure 13:
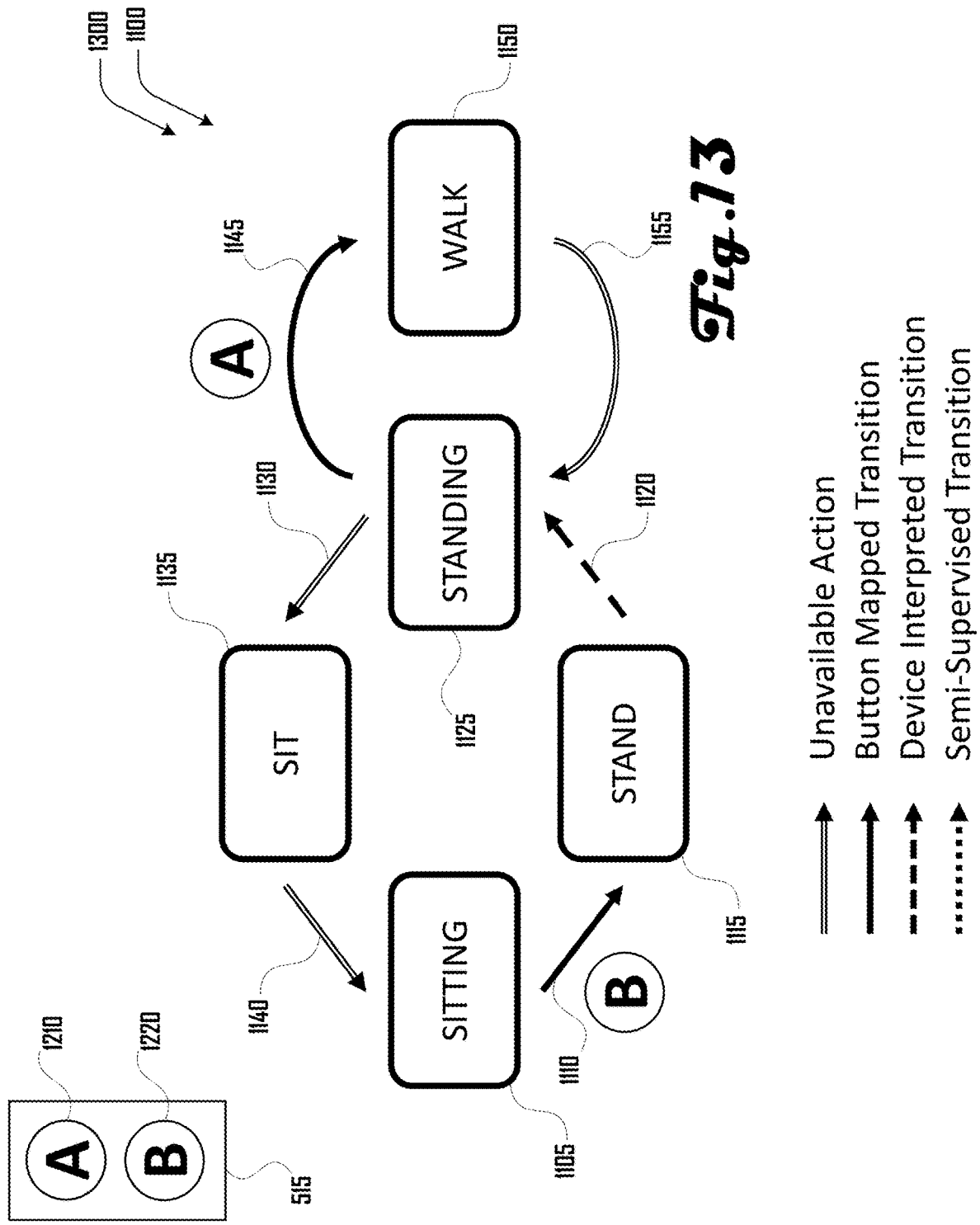
FIG. 13 is another example of a fully-supervised intent recognition method illustrated in the context of the state machine of FIG. 11 and a user interface having a first and second button.

Turning to FIG. 13, an example of a fully supervised intent recognition method 1300 is illustrated in the context of the state machine 1100 of FIG. 11 and a user interface 515 having a first and second button 1210, 1220. More specifically, expanding on the example of FIG. 12, to deal with multiple transitions in a fully supervised intent recognition system, Button A is mapped to a single transition 1145 from standing state 1125 to walk state 1150 as discussed above. Additionally, the B-button 1220 is shown mapped to a single transition (i.e., sitting-stand transition 1110) from sitting state 1105 to stand state 1115.

As discussed herein, if the A-Button 1210 is pressed and the user 101 is safe, the exoskeleton system 100 initiates a transition from standing 1125 to walk 1150. If the B-button 1220 is pressed, the exoskeleton system 100 initiates a transition 1110 (i.e., sitting-stand transition 1110 from sitting 1105 to stand 1110, causing the user 101 to stand up from sitting). From there, the exoskeleton system can then interpret whether the user 101 has made it fully into the standing state 1110, and, if not, can abort the sit-stand transition 1110 as a safety measure. In other words, pressing the B-button 1220 on the interface 515 can trigger the sitting-stand transition 1110 from sitting 1105 to a standing maneuver state 1115, and the exoskeleton device 100 will then transition 1120 to the standing state 1125 unless an error occurs.

Accordingly, the A-Button 1210 can only trigger the standing-walk transition 1145 from the standing state 1125 to the walking state 1150 and the B-button 1220 can only trigger the sitting-stand transition 1110 from the sitting state 1105 to the standing state 1115, with all other transitions (i.e., 1120, 1130, 1140, 1155) being unavailable via a button press of the A-button 1210 or B-button 1220.

Figure 14:
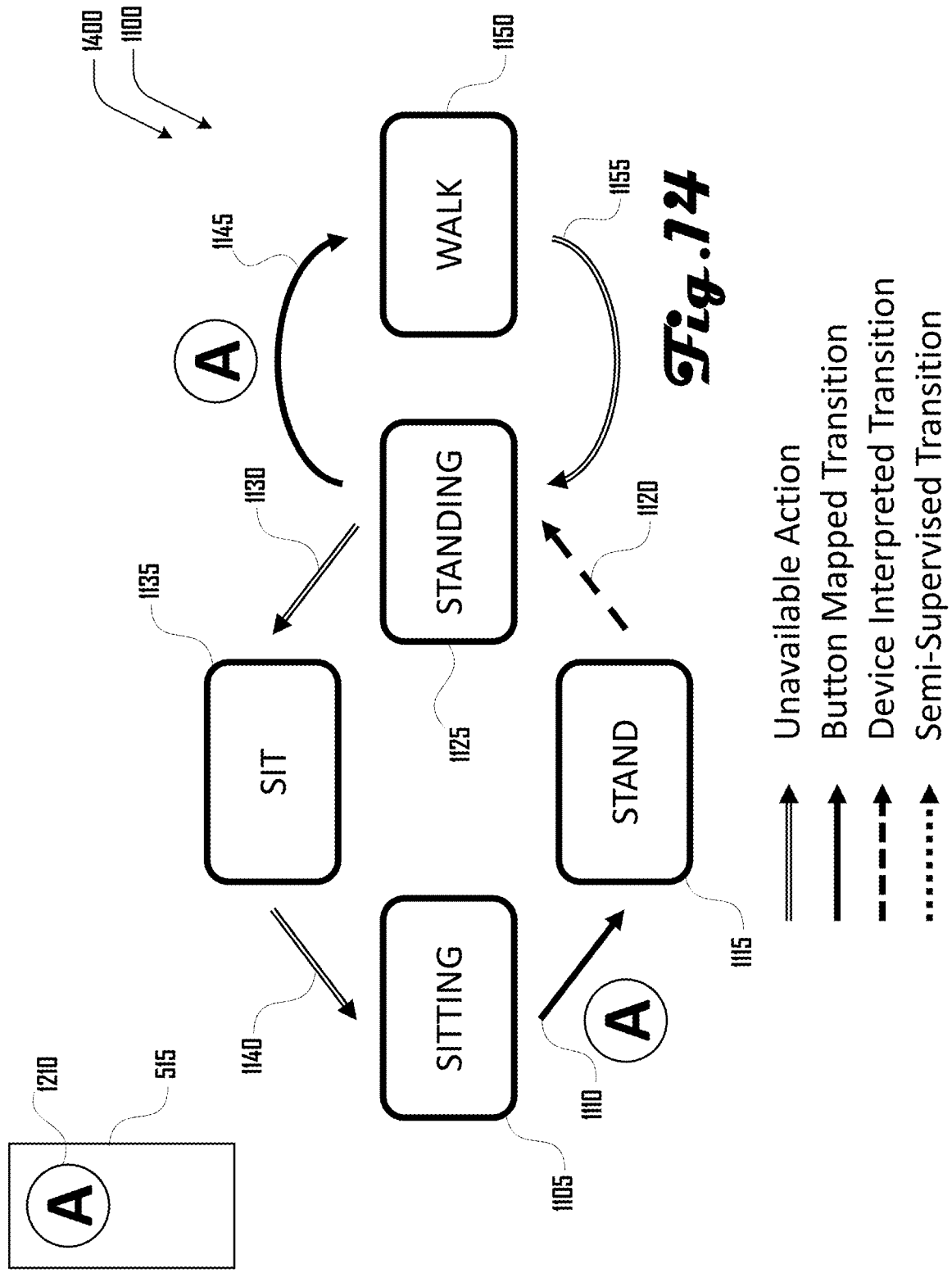
FIG. 14 is a further example of a fully-supervised intent recognition method illustrated in the context of the state machine of FIG. 11 and a user interface having a first button.

Turning to FIG. 14, another example of a fully supervised intent recognition method 1400 is illustrated in the context of the state machine 1100 of FIG. 11 and a user interface 515 (see FIG. 5) having an A-button 1210. Specifically, FIG. 13 illustrates another variation of a fully-supervised state machine 1400 where the A-Button 1210 is mapped such that if the exoskeleton system 100 is in a standing state 1125 and the user 101 is safe, pressing the A-Button 1210 will cause the exoskeleton system 100 to initiate the standing-walk transition 1145 to the walk state 1150, and if the exoskeleton system 100 is in a sitting state 1105 and the user 101 is safe, the exoskeleton system 100 will initiate the sitting-stand transition 1110 to the stand state 1115, after which the exoskeleton system 100 will then interpret whether there has been a successful transition 1120 to the standing state 1125 and behave accordingly. This example button configuration is similar to the previous example of FIG. 8 having dual buttons A and B 1210, 1220 except that the same button 1210 is mapped to two specific transitions 1110, 1145 instead of one transition respectively.

Figure 15:
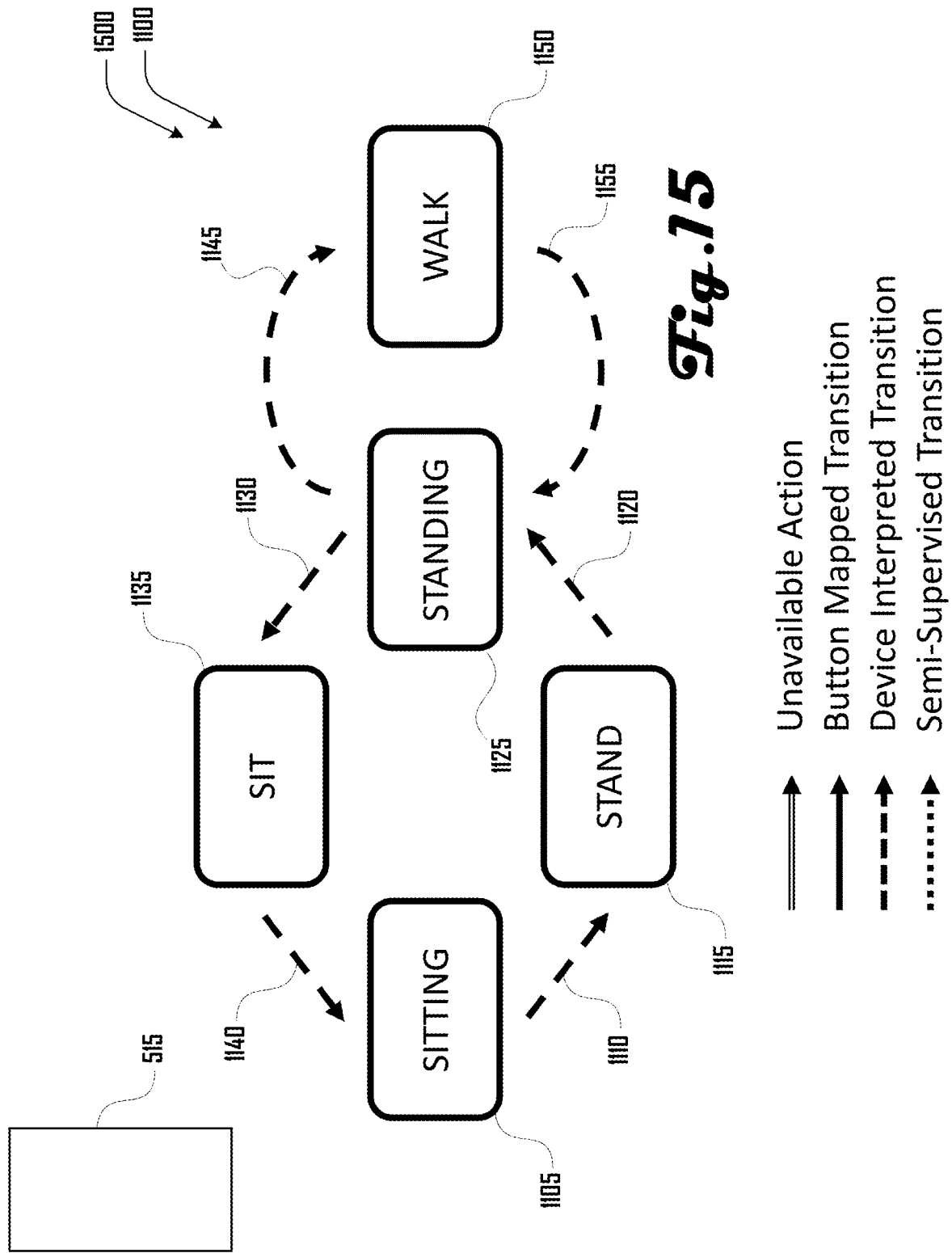
FIG. 15 illustrates an example of an unsupervised intent recognition method in accordance with one embodiment.

Fully-supervised intent recognition methods as discussed above can be distinguished from unsupervised intent recognition methods. For example, FIG. 15 illustrates an example of an un-supervised intent recognition method. More specifically, FIG. 15 illustrates an unsupervised state machine 1500 where the user 101 provides no direct manual input to the intent recognition of the exoskeleton system 100. Instead, the exoskeleton system 100 is continuously monitoring sensor inputs and interpreting what state the exoskeleton system 100 is currently in and what transition the user 101 is attempting to initiate. Once the threshold for a possible transition from the currently detected state is reached based on sensor data (e.g., from sensors 513) and the user 101 is interpreted as being in a safe configuration, the exoskeleton system 100 can then initiate the interpreted transition.

In contrast to the fully supervised intent recognition methods discussed in FIGS. 12-14, each of the transitions 1110, 1120, 1130, 1140, 1145, 1155 shown in FIG. 15 are device-interpreted transitions where the exoskeleton system 100 determines the current state (i.e., sitting 1105, stand 1115, standing 1125, sit 1135 and walk 1150) and determines what transition, if any, the user is attempting to initiate. Accordingly, the example user interface 515 of FIG. 15 is without a button or other element or mechanism that allows the user 101 to initiate one or more specific transitions (although the user interface 515 can have other suitable functionalities). In other words, the unsupervised method of FIG. 15 does not allow the user 101 to provide input to indicate a desire to make a transition or to initiate a transition, whereas the supervised intent recognition methods discussed in FIGS. 12-14 do allow the user 101 to initiate a transition to some or all states.

Figure 16:
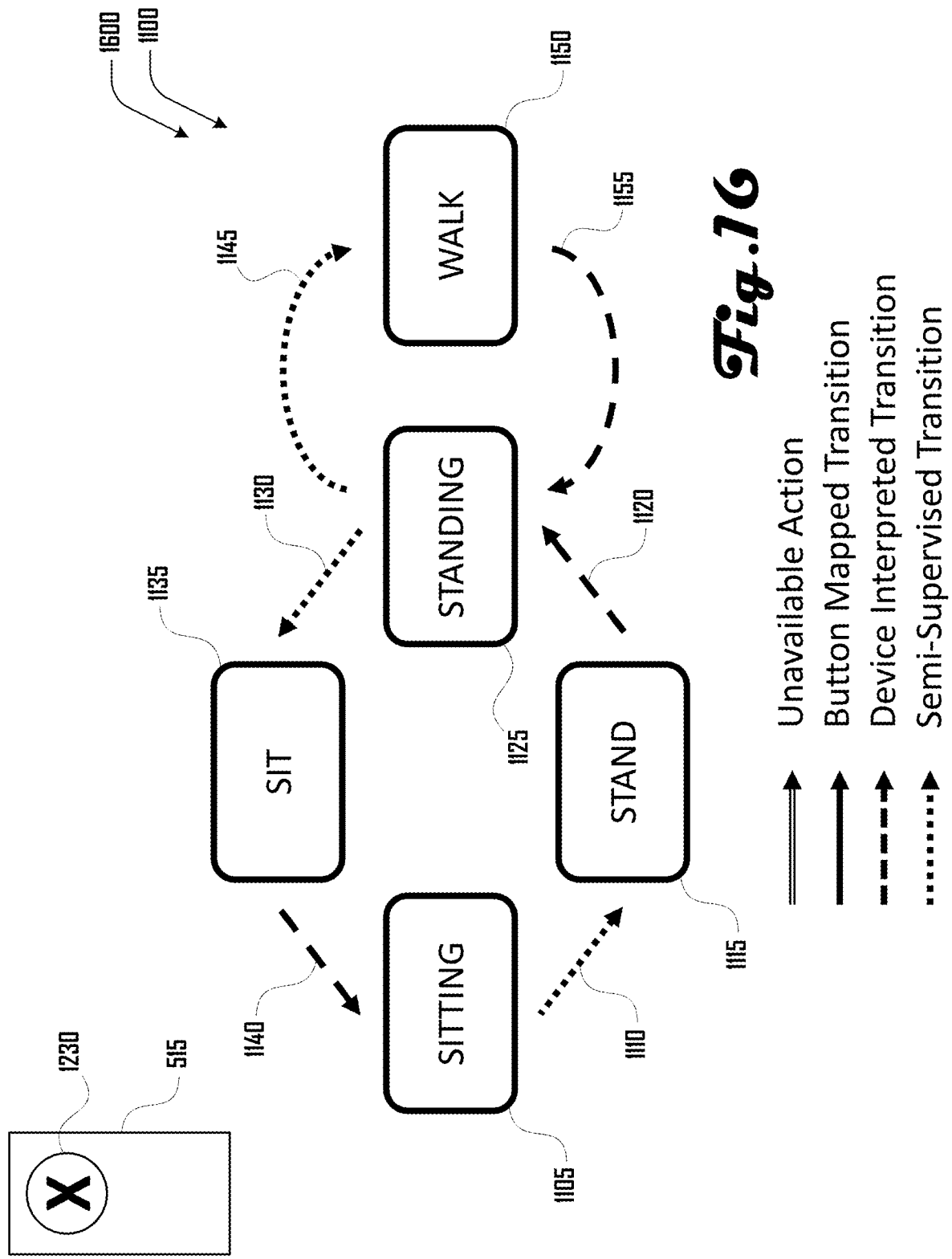
FIG. 16 illustrates an example embodiment of a semi-supervised intent recognition method.

As discussed herein, fully supervised intent recognition methods and unsupervised intent recognition methods can be distinguished from semi-supervised intent recognition methods as described in more detail below. For example, FIG. 16 illustrates an example embodiment of a semi-supervised intent recognition method. Specifically, FIG. 16 illustrates a semi-supervised state machine 1600 where user 101 provides direct manual input to the intent recognition of the exoskeleton system 100 indicating that the exoskeleton system 100 should look for a state transition from the current state, where the current state is known to or determined by the exoskeleton system 100 at the time of the manual input by the user 101.

Such an increased observance of a state transition can be accomplished in various suitable ways such as by lowering one or more thresholds for interpreting whether a transition is occurring, which can increase the chance that a transition is observed from the sensor inputs (e.g., from sensor data received from sensors 513).

After the manual input (e.g., the button X 1230 being pressed in this example) if a state transition is detected, the exoskeleton system 100 then proceeds to initiate the detected state transition. However, if no state transition is detected, the exoskeleton system 100 takes no action, and after a predefined timeout, the exoskeleton system 100 stops looking for transitions, returning the exoskeleton system 100 into a normal state of readiness for the next manual input.

In other words, in various embodiments, the exoskeleton system 100 can monitor and respond to the movements of a user 101 in a normal operation state including identifying and initiating various state transitions (e.g., any possible state transition as shown in the example of FIG. 11) with the identifying of the state transitions being associated with a first set of one or more thresholds, criteria, or the like. In response to an input from a user (e.g., pressing single button X 1230), the exoskeleton system 100 can still monitor and respond to the movements of the user 101, but according to a second set of one or more thresholds, criteria, or the like, such that identifying state transitions is easier compared to normal operation under the first set.

More specifically, for some sets of sensor data, a given state transition would not be identified as being present when the exoskeleton system 100 is operating under the first set but would be identified as being present under the second set of one or more thresholds, criteria, or the like. Accordingly, in various embodiments, by the user 101 providing a given input (e.g., pressing single button X 1230), the exoskeleton system 100 can become more sensitive to identifying state transitions.

In various embodiments, sensitivity to state transitions initiated by the user 101 can be based on possible state transitions given the state that the user 101 and exoskeleton system 100 are currently in. Accordingly, in various embodiments, after an indication of an intention to make a state change is received (e.g., via the user 101 pushing the X-button 1230) a determination can be made as to what state the user 101 and exoskeleton system 100 are currently in and sensitivity to potential state changes by the user 101 can be tuned based on the determined current state.

For example, referring to FIG. 16, where a determination is made that the user is in the sitting state 1105, sensitivity to identifying a transition to a stand state 1115 can be tuned to be more sensitive, whereas other states that are not directly reachable from the sitting state (e.g., walk state 1150 or sit state 1135) can be excluded as potential states that may be detected or identified. Additionally, where multiple state transitions are possible from a given state, sensitivity can be tuned for these multiple potential state transitions. For example, referring to FIG. 16, where a determination is made that the user is in the standing state 1125 sensitivity to identifying a transition to a sit or walk state 1135, 1150 can be tuned to be more sensitive, whereas other states that are not directly reachable from the sitting state (e.g., stand 1115) can be excluded as potential states that may be detected or identified.

Having the exoskeleton system 100 become more sensitive to state transitions in response to an input from the user 101 can be desirable for improving the experience of the user wearing the exoskeleton system 100. For example, during normal operation, the threshold for identifying and responding to state transitions can be high to prevent false-positives of state transitions while also allowing the exoskeleton system 100 to respond if necessary where a state transition occurs.

However, where the user intends to initiate a state transition (e.g., moving from sitting to a standing position; moving from a standing position to a sitting position; moving from a standing position to walking; or the like), the user 101 can provide an input to indicate the intention to initiate a state transition and the exoskeleton system 100 can become more sensitive to state transitions in anticipation of the user 101 making the intended state transition. Such increased sensitivity can be desirable for preventing false negatives or failures to identify a state transition being initiated by the user 101.

Also, providing the user 101 with a single input to indicate an intention to make a state transition can be desirable because it makes operation of such an exoskeleton system 100 much simpler and user-friendly compared to fully supervised systems having multiple buttons mapped to different specific state transitions or systems where a single button that is mapped to fewer than all state transitions (e.g., as shown in FIGS. 12-14). Providing the user 101 with a single input to indicate an intention to make a state transition can be desirable over unsupervised methods because providing the user 101 with the ability to indicate an intention to make state transitions helps to prevent false positives and false negatives for state transitions by providing variable sensitivity to state transitions based on user intent or desire to make state transitions, which can be associated with an increased likelihood of a state transition occurring.

To further illustrate the difference between the fully supervised intent recognition methods of FIGS. 7-9 and semi-supervised method of FIG. 16, it can be useful to focus on examples where a user has multiple options for making a state transition from a given state. For example, as shown in the state diagram 1600 of FIG. 16, a user in a standing state 1125 has the option of transitioning to a sitting state 1105 via a sit maneuver state 1135 or the option of transitioning to a walk state 1150. As shown in the example of FIG. 16, where a user 101 presses the button 1230, the user 101 has the option initiating a standing-sit transition 1130 or a standing walk-transition 1145, and the exoskeleton system 100 can be become more sensitive to both potential transitions 1130, 1145 and can respond to the user 101 initiating either potential transition 1130, 1145.

In contrast, as shown in the examples of FIGS. 12-14, where the A-button 1210 is pressed, the user 101 will be forced into the standing-walk transition 1145 or at the very least will not have the option of a standing-sit transition 1130, with the standing-sit transition 1130 being an unavailable action. Accordingly, while fully-supervised methods can limit the options of the movements of the user 101, semi-supervised methods (e.g., as shown in FIG. 16) can allow for a user to indicate an intent to make a state transition without explicitly or implicitly specifying one or more specific state transitions. Stated another way, fully-supervised methods can limit the options of the movements of the user 101, whereas semi-supervised methods of various embodiments do not limit the options of the movements of the user 101 and allows the exoskeleton system 100 to adapt to the movements of the user 101 without limitation.

The difference between fully supervised intent recognition and semi-supervised intent recognition can also be illustrated when examining a state machine where one state has a larger number of possible state transitions. For example, FIG. 17 illustrates an example state machine 1700 in a supervised intent recognition method 1701 where a standing state 1125 has eight possible transitions 1130, 1145, 1705, 1715, 1725, 1735, 1745, 1755 to eight different system states 1135, 1150, 1710, 1720, 1730, 1740, 1750, 1760.

More specifically, a user 101 of an exoskeleton system 100 has the option of transitioning from a standing state 1125 to a sit state 1135 via a standing-sit transition 1130; to a walk state 1150 via a standing-walk transition 1145; to a jump state 1710 via a standing-jump transition 1705; to a lunge state 1720 via a standing-lunge transition 1715; to a crouch state 1730 via a standing-crouch transition 1725; to a dive state 1740 via a standing-dive transition 1735; to a sprint state 1750 via a standing-sprint transition 1745; and to a jog state 1750 via a standing-jog transition 1755.

Figure 17:
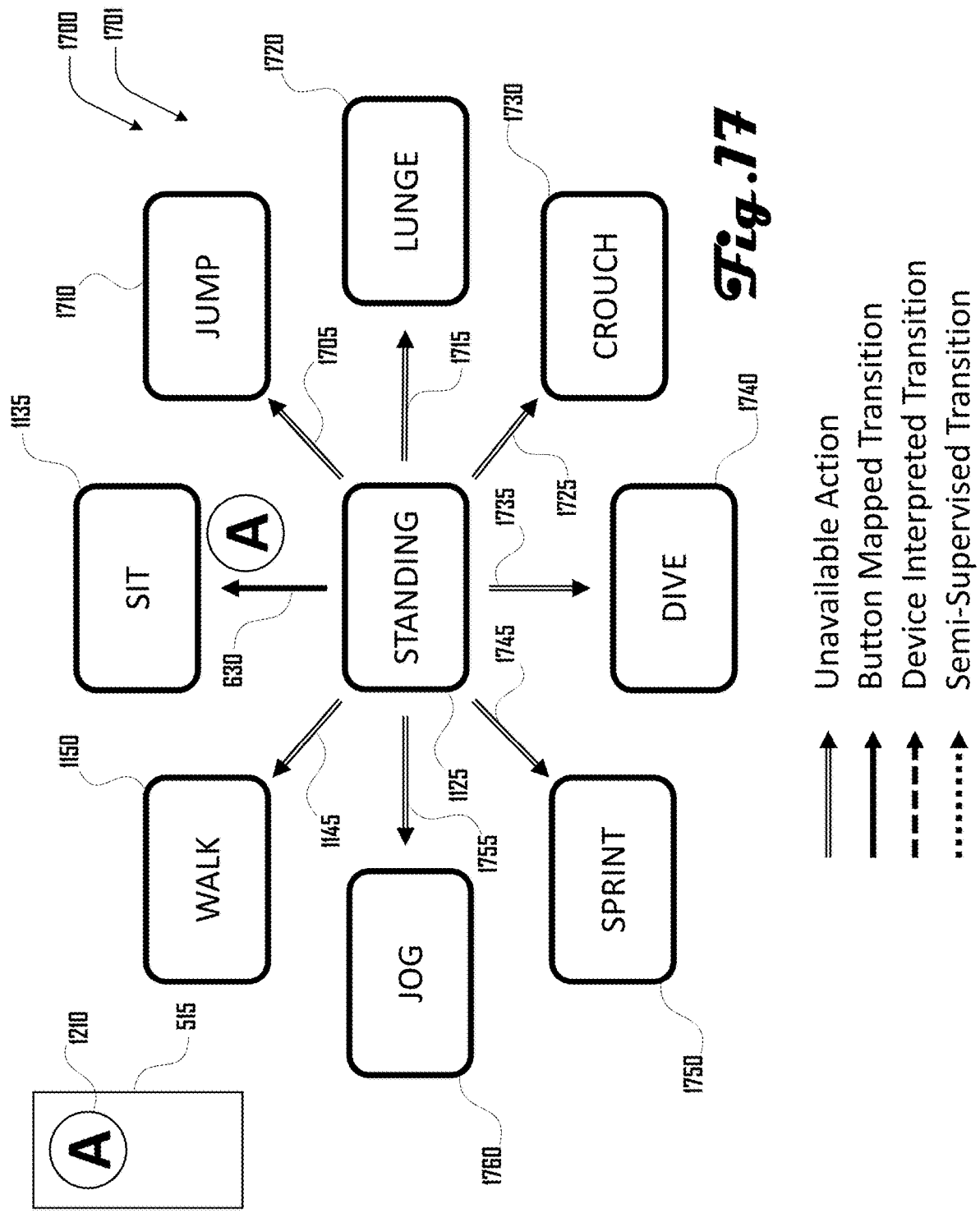
FIG. 17 illustrates an example state machine in a supervised intent recognition method where a standing state has eight possible transitions to eight respective states and a button mapped to a single transition and state pair.

As shown in the example of FIG. 17, a user interface 515 can have an A-button 1210 that is mapped to the standing-sit transition 1130 and/or the sit state 1135. When the A-button 1210 is pressed in this example, the exoskeleton system 100 can initiate transitioning to the sit state 1135 via the standing-sit transition 1130, with the other states and transitions being unavailable when the A-button is pushed.

Figure 18:
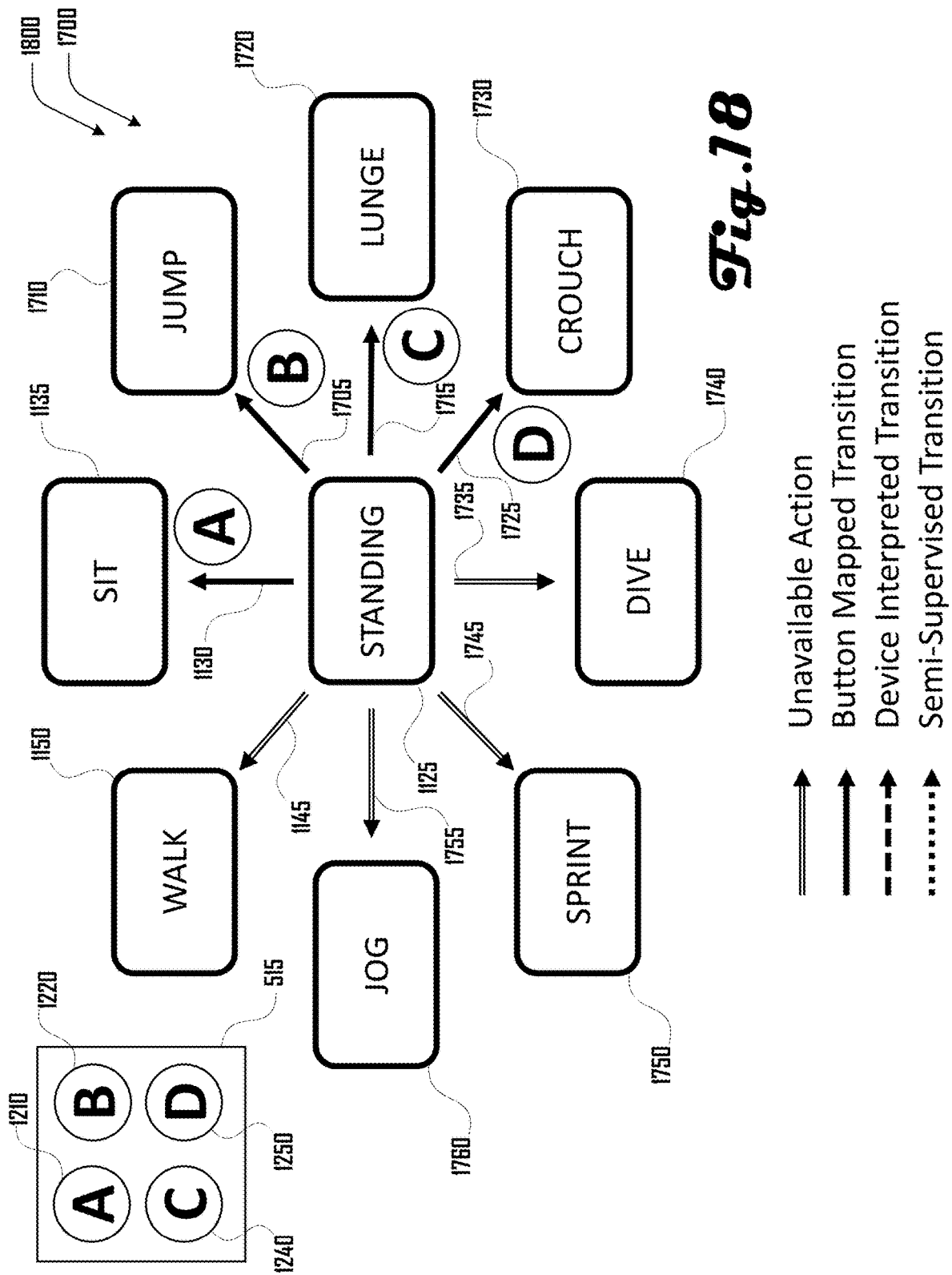
FIG. 18 illustrates an example state machine in a supervised intent recognition method where a standing state has eight possible transitions to eight respective states and four buttons are respectively mapped to single transition and state pairs.

In a similar example, FIG. 18 illustrates a state machine 1700 in a supervised intent recognition method 1800 where a standing state 1125 has eight possible transitions to eight respective states and four buttons 1210, 1220, 1240, 1250 are respectively mapped to single transition and state pairs. More specifically, the A-button 1210 is mapped to the sit state 1135 and the standing-sit transition 1130; the B-button 1220 is mapped to the jump state 1710 and the standing-jump transition 1705; the C-button 1240 is mapped to the lunge state 1720 and the standing-lunge transition 1715; and the D-button 1250 is mapped to the crouch state 1730 and the standing-crouch transition 1725.

Similar, to the example of FIG. 17, the method 1800 of FIG. 18 illustrates that each of the buttons 1210, 1220, 1240, 1250, when pressed, triggers a transition to the state that the given button is mapped while making the other transitions and states unavailable unless another button is pressed. Although the example of FIG. 18 illustrates only four buttons mapped to four respective state and transition pairs, in further embodiments, each of the states can be mapped to a respective button. In other words, for the example state machine 1700 of FIGS. 17 and 18 in further embodiments each of the eight state-transition pairs can be mapped to a respective button. Accordingly, where a user 101 wants to transition from the standing state 1125 to another state, the user 101 must press a specific button associated with the given state or state transition to initiate the transition to the desired state.

Figure 19:
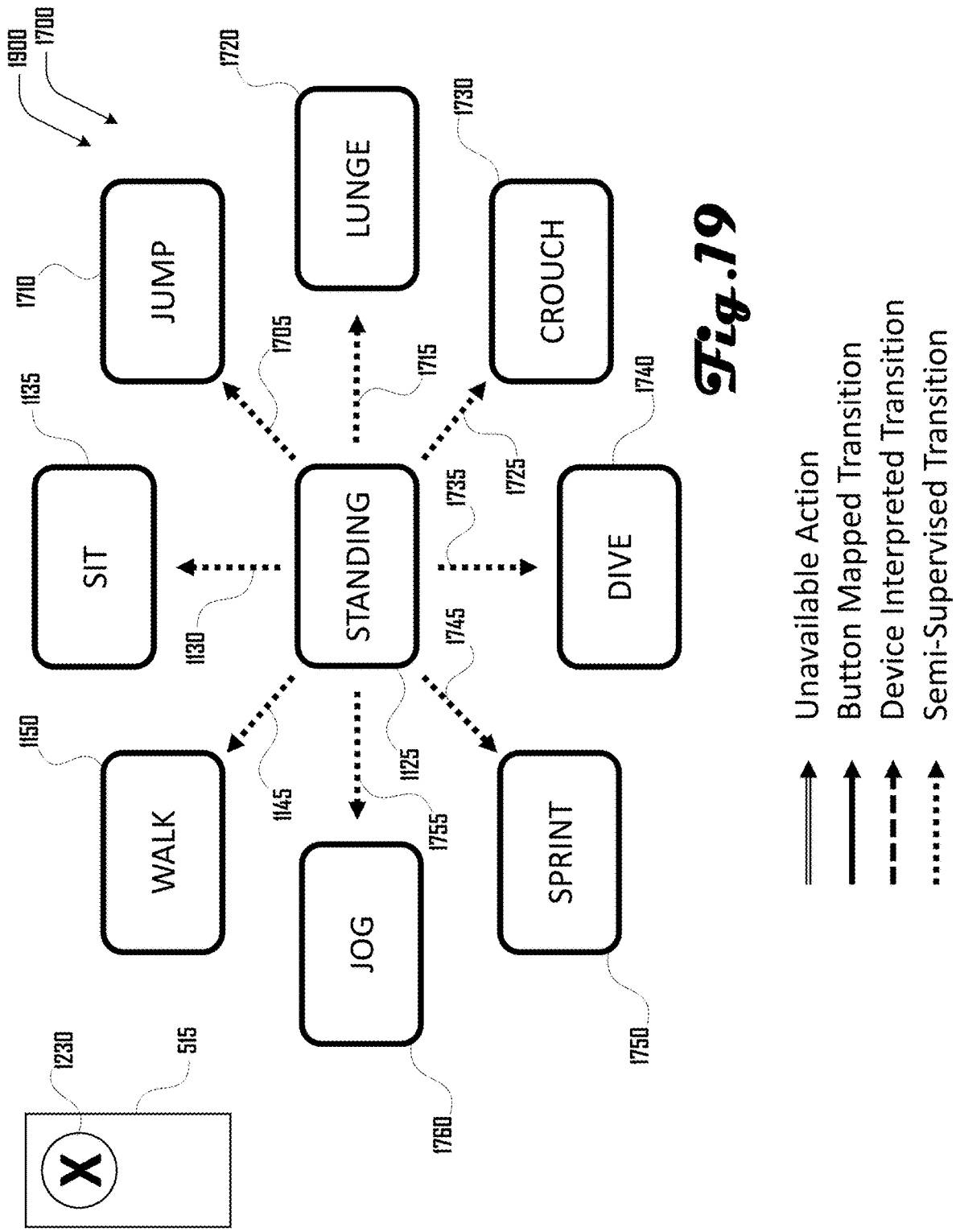
FIG. 19 illustrates an example of a semi-supervised intent recognition method having the state machine as shown in FIGS. 17 and 18 and a user interface having a single button for indicating an intention to make a state transition.

In contrast, FIG. 19 illustrates an example of a semi-supervised intent recognition method 1900 having the state machine 1700 as shown in FIGS. 17 and 18 and a user interface 515 having a single button 1230 for indicating an intention to make a state transition. As shown in FIG. 14, the user 101 can be in a standing state 1125 and can press the X-button 1230 to indicate the intention or desire to make a state transition, and the exoskeleton system 100 can become more sensitive to identifying a state transition while allowing the user 101 to initiate any of the eight possible state transitions shown in the example of FIG. 19 or choose to not initiate a state transition.

In other words, in the semi-supervised intent recognition method 1900 of FIG. 19, because the manual input (X-button 1230) only indicates for the exoskeleton system 100 to become more sensitive to detecting any possible transition (e.g., by lowering the transition thresholds to possible behaviors) from the current state, all possible state transitions remain possible.

Also, no transition is also possible and the user 101 is not forced or required to make a state transition. However, in the fully supervised example of FIG. 18, if the B-button 1220 is pressed and the current standing configuration state 1125 is deemed safe to the user 101 to transition, the exoskeleton system 100 will initiate a standing to jump transition 1705. Whereas in the example of FIG. 19, if X-button 1230 is pressed and the user 101 is doing nothing that indicates a transition should occur, is about to occur, or is occurring, no transition will occur.

Additionally, while various embodiments of semi-supervised intent recognition methods are discussed having a single button (e.g., the X-button 1230), it should be clear that various embodiments can comprise a single input type, with one or more input methods for the single input type. For example, in some embodiments, an exoskeleton system 100 can comprise a first and second X-button 1230 disposed respectively on the left and right actuator units 110A, 110B of the exoskeleton system 100, and the user 101 can press either of the buttons 1230 to make the exoskeleton system 100 more sensitive or responsive to identifying state transitions. Also, the single input type can be associated with multiple input methods in some embodiments. For example, a user 101 can press an X-button 1230, can knock on the body of the exoskeleton system 100 or provide a voice command to make the exoskeleton system 100 more sensitive or responsive to identifying state transitions.

One way to mathematically describe the difference between a fully supervised method and a semi-supervised method is to examine the probability of possible state transitions from a given starting state. In fully supervised methods for various state machines (e.g., state machine 1100 of FIG. 11 or state machine 1700 of FIG. 17), the probability of transitioning from standing 1125 to walk 1150 can be equal to N: P(Walking/Standing)=N. The probability of transitioning from standing 1125 to standing 1125 is then 1−N: P(Standing/Standing)=1−N, in which case the exoskeleton system 100, (e.g., due to a safety feature), does not allow the transition to occur. The probability of transitioning from standing 1125 to sit 1135 equals 0: P(Sit/Standing)=0, because in various fully supervised methods, a manual input can only map a single desired transition from a single starting state.

In a semi-supervised method for such same state machines (e.g., state machine 1100 of FIG. 11 or state machine 1700 of FIG. 17), the probability of transitioning from standing 1125 to walk 1150 can be equal to A: P(Walking/Standing)=A. The probability of transitioning from standing 1125 to standing 1125 is B: P(Standing/Standing)=B. The probability of transitioning from standing 1125 to sit 1135 is 1−A−B: P(Sit/Standing)=1−A−B. This can be because in some embodiments of a semi-supervised intent recognition method, the exoskeleton system 100 is left to interpret the desired state transition from the given starting state, allowing the exoskeleton system 100 to decide between sit 1135, walk 1150, or remaining standing 1125.

Turning to FIG. 20, a semi-supervised intent recognition method 2000 in accordance with one embodiment is illustrated, which in various examples can be implemented by an exoskeleton device 510 of an exoskeleton system 100 (see FIG. 5). The method 2000 begins at 2005 where the exoskeleton system 100 operates in a first mode with sensitivity to detecting state transitions at a first sensitivity level. At 2010, a determination is made whether a state transition is identified, and if so, the exoskeleton device facilitates the identified state transition at 2015 and the method 2000 cycles back to 2005 where the exoskeleton system 100 operates in the first mode with sensitivity to detecting state transitions at the first sensitivity level. However, if at 2010 a state transition is not identified, then at 2020 a determination is made whether a state transition intention input is received, and if not, the method 2000 cycles back to 2005 where the exoskeleton system 100 operates in the first mode with sensitivity to detecting state transitions at the first sensitivity level.

For example, the exoskeleton 100 can operate in a normal sensitivity mode (e.g., the first mode) and can identify one or more state transitions being initiated or made by the user 101 and can act accordingly to support the user with such identified one or more state transitions as necessary. Also, the exoskeleton system 100 can monitor or wait for a state transition intention input to be received, which as discussed herein can be received in various suitable ways such as via pressing a button on a user interface 515, via haptic input, via audio input, or the like.

In various embodiments, the exoskeleton system 100 can operate and transition the user 101 through some or all available states during a given operating session without a state transition intention input ever being received. For example, exoskeleton system 100 can be powered up, operate in various position states and then be powered off without a state transition intention input being received. In other words, in various embodiments, the exoskeleton system 100 can be fully functional and have the ability to move through all available position states and transitions without a state transition intention input ever being received.

Returning to the method 2000, if a state transition intention input is received at 2020, then the method 2000 continues to 2025 where the exoskeleton system 100 operates in a second mode with sensitivity to detecting state transitions at a second sensitivity level. At 2030, a determination is made whether a state transition is identified, and if so, at 2035 the exoskeleton system 100 facilities the identified state transition and the method 2000 cycles back to 2025 where the exoskeleton system 100 operates in the second mode with sensitivity to detecting state transitions at a second sensitivity level.

However, if a state transition is not identified at 2030, the method 2000 continues to 2040 where a determination is made whether a second mode timeout has occurred. If not, the method 2000 cycles back to 2025 where the exoskeleton system 100 operates in the second mode with sensitivity to detecting state transitions at a second sensitivity level. However, if a second mode timeout is determined, then the method 2000 cycles back to 2005 where the exoskeleton system 100 operates in the first mode with sensitivity to detecting state transitions at the first sensitivity level.

For example, where a state transition intention input is received by the exoskeleton system 100, the exoskeleton system 100 can switch from detecting state transitions at the first sensitivity level in the first mode to detecting state transitions at the second sensitivity level in the second mode, with the first and second sensitivity levels being different. The exoskeleton system 100 can monitor for state transitions and can facilitate one or more state transitions that are identified until a timeout for operating in the second mode occurs. However, it is not necessary that state transitions are ever identified and/or facilitated while operating in the second mode before a timeout of the second mode occurs.

As discussed herein, in various examples, the second sensitivity level of the second mode can be more sensitive to detecting or identifying state transitions compared to the first sensitivity level of the first mode. The greater sensitivity of the of the second sensitivity level can be achieved in various suitable ways including lowering one or more thresholds associated with identifying one or more state transitions; removing or modifying criteria for identifying one or more state transitions; or the like. However, in various embodiments, a subset of thresholds and/or criteria of a set of criteria need not be changed, removed or modified. Also, in some embodiments, one or more thresholds can be increased if the overall effect of the difference between the second sensitivity level from the first sensitivity level results in greater overall sensitivity of the second sensitivity level. In further embodiments, the first and second mode can be different in any suitable way such that for some sets of sensor data, a given state transition would not be identified as being present when the exoskeleton system 100 is operating in the first mode, but would be identified as being present when the exoskeleton system 100 is operating in the second mode.

A second mode timeout can be generated or implemented in various suitable ways. In some embodiments, a second mode timeout can comprise a timer corresponding to the time that a given second mode session has been active (e.g., an amount of time from when a switch from the first mode to the second mode occurs), and the second mode timeout can occur when the timer reaches or exceeds a defined timeout threshold. For example, a timeout threshold can be a number of seconds, minutes, or the like, including 1 second, 5 seconds, 10 seconds, 20 seconds, 30 seconds, 45 seconds, 60 seconds, 90 seconds, 2 minutes, 3 minutes, 5 minutes, or the like.

Such a timeout threshold can be static or variable. In some embodiments, second mode sessions can last a defined amount of time. In further embodiments, second mode sessions can last a defined amount of time by default but can be extended or shortened based on any suitable criteria, conditions, sensor data, or the like. For example, in some embodiments, a second mode session can end after a state transition is identified and/or the identified state transition is facilitated.

Intent recognition methods can be used in various suitable applications. One example embodiment includes an intent recognition method for a lower extremity exoskeleton system 100 for assisting with community mobility of aging adults. The exoskeleton system 100 can be designed to assist with transitions between seated and standing positions, ascending and descending stairs, as well as providing assistance during walking maneuvers. In this example, the user is provided with a single input to the exoskeleton system 100 in the form of knocking or tapping twice on the exterior of the exoskeleton system 100. This manual interaction by the user 101 can be sensed through monitoring integrated accelerometers or other sensors 513 of the exoskeleton system 100. The exoskeleton system 100 can interpret the input from the user 101 as an indication that a change in behavior is coming. The exoskeleton system 100 can utilize unsupervised intent recognition methods that monitor the device sensors 513 to observe a change in the user's behavior to identify intent; however, the specific methods can be tuned to be very conservative so as to avoid false indications of intent. When the intent is indicated from the user 101, the required confidence threshold for the method can lower, allowing the exoskeleton system 100 to be much more sensitive and willing to respond to what it interprets as a triggered motion.

In such an example, the subject may have donned the exoskeleton system 100 from a seated position and the only available state transition to the device is to then stand up. When the user 101 taps the exoskeleton system 100 twice, the exoskeleton system 100 can relax the threshold requirements for the stand behavior for a fixed period of time, which for the purpose of this example can be set at 5 seconds. If the user 101 does not seek to initiate a stand behavior the intent indication will simply time out and return the conservative thresholds. If the user 101 does attempt to initiate a stand behavior, the exoskeleton system 100 will see the motion and respond with assistance accordingly. Once in a standing position, the user 101 can make a variety of actions including walking, transition to sit, ascend stairs or descend stairs. In this case, the user 101 can decide to not tap the machine and begin walking. At this point, the device can still respond to the behavior, but it may require a much more confident identification of the targeted behavior.

After stopping walking, the user 101 intends to ascend the stairs. The user 101 taps the device twice to indicate the coming change in intended behavior and then begins to complete the motion. Here, the user's indicated intent does not specify for the exoskeleton system 100 what behavior the user 101 intends to transition to, only that a transition will likely occur in the near future. The exoskeleton system 100 observes the user 101 is standing, and using a more sensitive transition threshold the exoskeleton system 100 allows for the transition in behavior modes to occur.

Figure 21A:
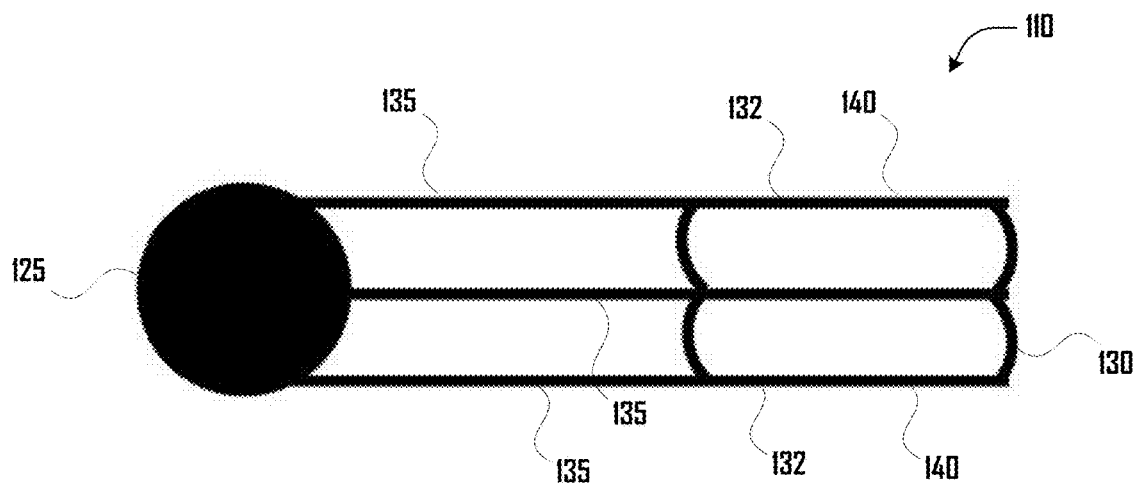
FIG. 21a illustrates a side view of a pneumatic actuator in a compressed configuration in accordance with one embodiment.
Figure 21B:
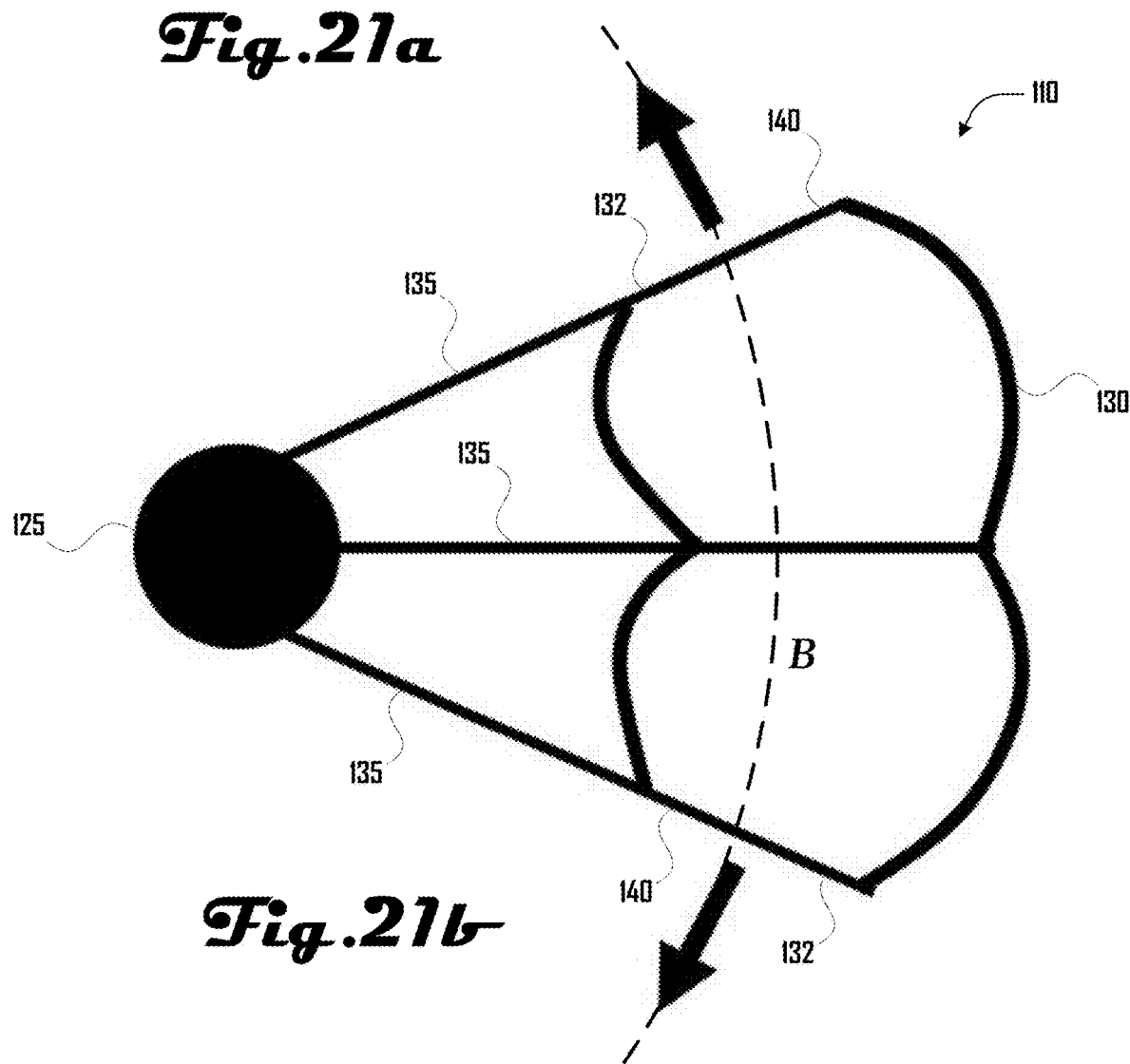
FIG. 21b illustrates a side view of the pneumatic actuator of FIG. 21a in an expanded configuration.
Figure 22A:
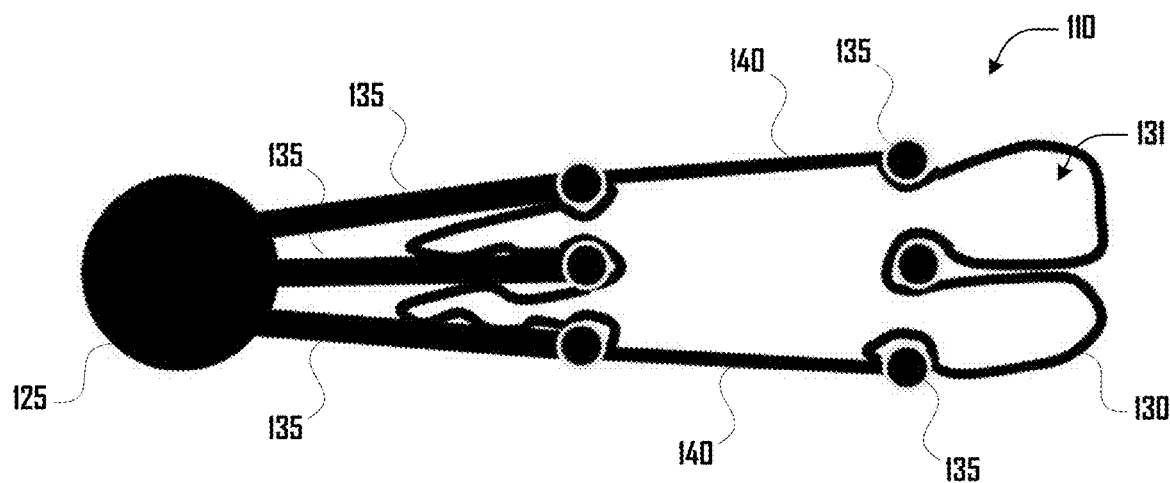
FIG. 22a illustrates a cross-sectional side view of a pneumatic actuator in a compressed configuration in accordance with another embodiment.
Figure 22B:
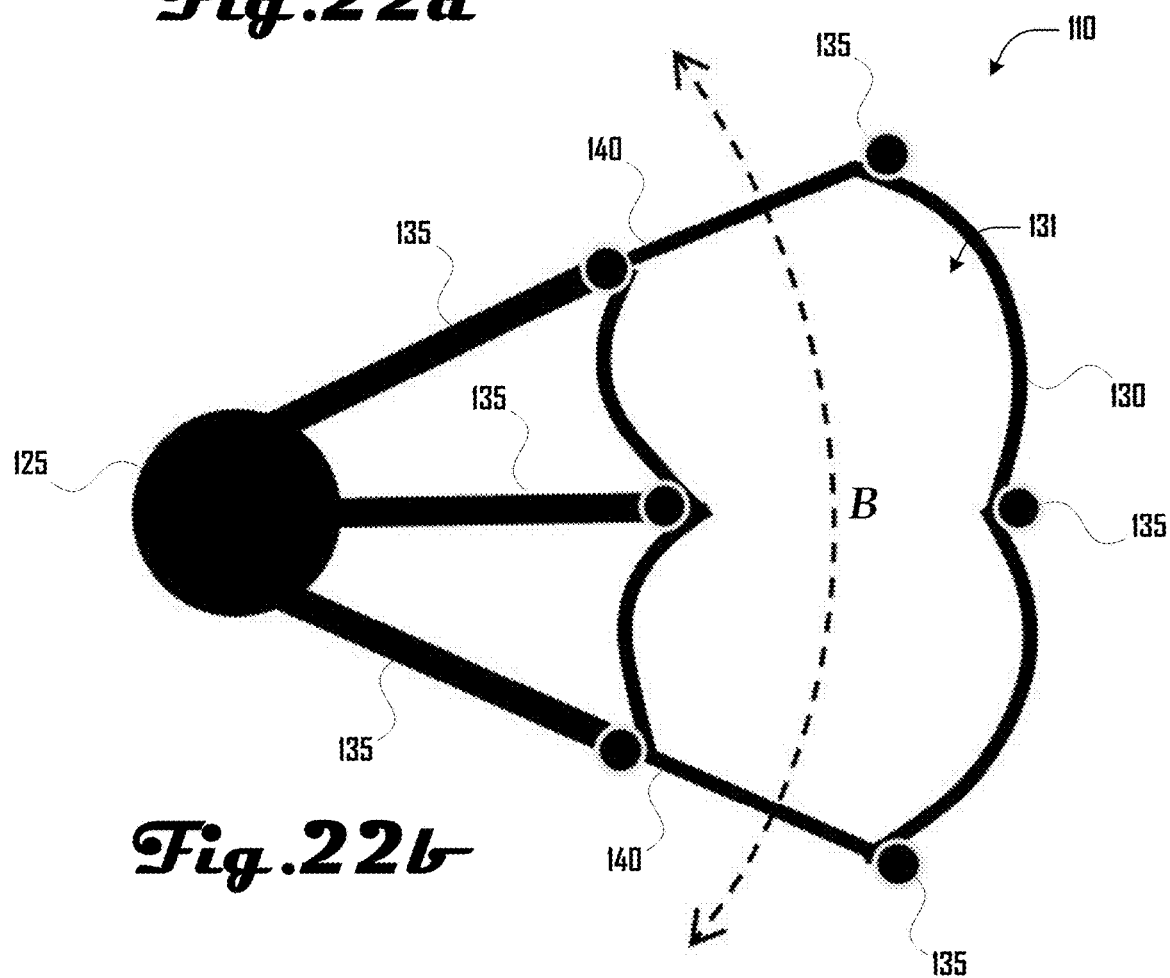
FIG. 22b illustrates a cross-sectional side view of the pneumatic actuator of FIG. 22a in an expanded configuration.

Turning to FIGS. 21*a*, 21*b*, 22*a* and 22*b*, examples of a leg actuator unit 110 can include the joint 125, bellows actuator 130, constraint ribs 135, and base plates 140. More specifically, FIG. 21*a* illustrates a side view of a leg actuator unit 110 in a compressed configuration and FIG. 21*b* illustrates a side view of the leg actuator unit 110 of FIG. 21*a* in an expanded configuration. FIG. 22*a* illustrates a cross-sectional side view of a leg actuator unit 110 in a compressed configuration and FIG. 22*b* illustrates a cross-sectional side view of the leg actuator unit 110 of FIG. 22*a* in an expanded configuration.

As shown in FIGS. 21*a*, 21*b*, 22*a* and 22*b*, the joint 125 can have a plurality of constraint ribs 135 extending from and coupled to the joint 125, which surround or abut a portion of the bellows actuator 130. For example, in some embodiments, constraint ribs 135 can abut the ends 132 of the bellows actuator 130 and can define some or all of the base plates 140 that the ends 132 of the bellows actuator 130 can push against. However, in some examples, the base plates 140 can be separate and/or different elements than the constraint ribs 135 (e.g., as shown in FIG. 1). Additionally, one or more constraint ribs 135 can be disposed between ends 132 of the bellows actuator 130. For example, FIGS. 21*a*, 21*b*, 22*a* and 22*b* illustrate one constraint rib 135 disposed between ends 132 of the bellows actuator 130; however, further embodiments can include any suitable number of constraint ribs 135 disposed between ends of the bellows actuator 130, including 1, 2, 3, 4, 5, 6, 7, 8, 9, 10, 15, 20, 25, 30, 50, 100 and the like. In some embodiments, constraint ribs can be absent.

As shown in cross sections of FIGS. 22*a* and 22*b*, the bellows actuator 130 can define a cavity 131 that can be filled with fluid (e.g., air), to expand the bellows actuator 130, which can cause the bellows to elongate along axis B as shown in FIGS. 21*b* and 22*b*. For example, increasing a pressure and/or volume of fluid in the bellows actuator 130 shown in FIG. 21*a* can cause the bellows actuator 130 to expand to the configuration shown in FIG. 21*b*. Similarly, increasing a pressure and/or volume of fluid in the bellows actuator 130 shown in FIG. 22*a* can cause the bellows actuator 130 to expand to the configuration shown in FIG. 22*b*. For clarity, the use of the term "bellows" is to describe a component in the described actuator unit 110 and is not intended to limit the geometry of the component. The bellows actuator 130 can be constructed with a variety of geometries including but not limited to a constant cylindrical tube, a cylinder of varying cross-sectional area, a 3-D woven geometry that inflates to a defined arc shape, and the like. The term 'bellows' should not be construed to necessary include a structure having convolutions.

Alternatively, decreasing a pressure and/or volume of fluid in the bellows actuator 130 shown in FIG. 21*b* can cause the bellows actuator 130 to contract to the configuration shown in FIG. 21*a*. Similarly, decreasing a pressure and/or volume of fluid in the bellows actuator 130 shown in FIG. 22*b* can cause the bellows actuator 130 to contract to the configuration shown in FIG. 22*a*. Such increasing or decreasing of a pressure or volume of fluid in the bellows actuator 130 can be performed by pneumatic system 520 and pneumatic lines 145 of the exoskeleton system 100, which can be controlled by the exoskeleton device 510 (see FIG. 5).

In one preferred embodiment, the bellows actuator 130 can be inflated with air; however, in further embodiments, any suitable fluid can be used to inflate the bellows actuator 130. For example, gasses including oxygen, helium, nitrogen, and/or argon, or the like can be used to inflate and/or deflate the bellows actuator 130. In further embodiments, a liquid such as water, an oil, or the like can be used to inflate the bellows actuator 130. Additionally, while some examples discussed herein relate to introducing and removing fluid from a bellows actuator 130 to change the pressure within the bellows actuator 130, further examples can include heating and/or cooling a fluid to modify a pressure within the bellows actuator 130.

As shown in FIGS. 21*a*, 21*b*, 22*a* and 22*b*, the constraint ribs 135 can support and constrain the bellows actuator 130. For example, inflating the bellows actuator 130 causes the bellows actuator 130 to expand along a length of the bellows actuator 130 and also cause the bellows actuator 130 to expand radially. The constraint ribs 135 can constrain radial expansion of a portion of the bellows actuator 130. Additionally, as discussed herein, the bellows actuator 130 comprise a material that is flexible in one or more directions and the constraint ribs 135 can control the direction of linear expansion of the bellows actuator 130. For example, in some embodiments, without constraint ribs 135 or other constraint structures the bellows actuator 130 would herniate or bend out of axis uncontrollably such that suitable force would not be applied to the base plates 140 such that the arms 115, 120 would not be suitably or controllably actuated. Accordingly, in various embodiments, the constraint ribs 135 can be desirable to generate a consistent and controllable axis of expansion B for the bellows actuator 130 as they are inflated and/or deflated.

In some examples, the bellows actuator 130 in a deflated configuration can substantially extend past a radial edge of the constraint ribs 135 and can retract during inflation to extend less past the radial edge of the constraint ribs 135, to extend to the radial edge of the constraint ribs 135, or not to extend less past the radial edge of the constraint ribs 135. For example, FIG. 22*a* illustrates a compressed configuration of the bellows actuator 130 where the bellows actuator 130 substantially extend past a radial edge of the constraint ribs 135 and FIG. 22*b* illustrates the bellows actuator 130 retracting during inflation to extend less past the radial edge of the constraint ribs 135 in an inflated configuration of the bellows actuator 130.

Figure 23A:
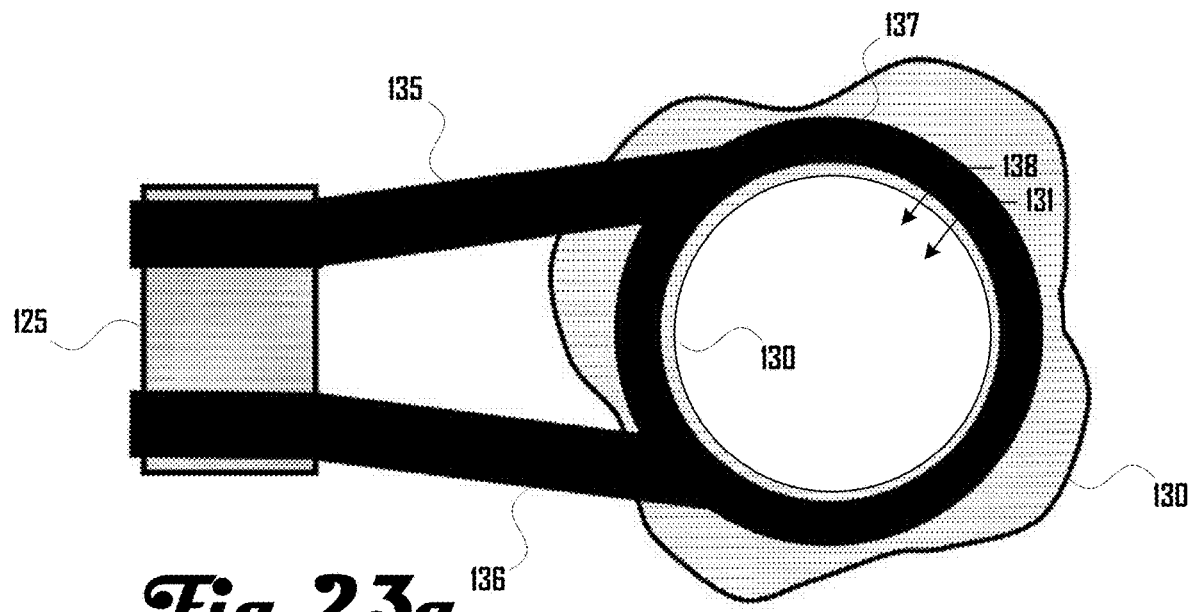
FIG. 23a illustrates a top view of a pneumatic actuator in a compressed configuration in accordance with another embodiment.
Figure 23B:
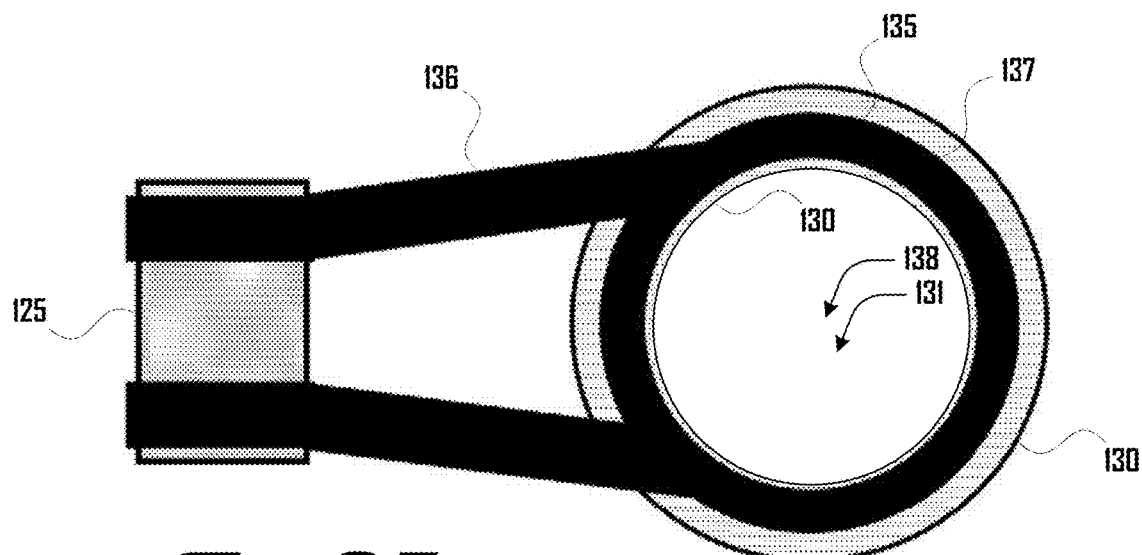
FIG. 23b illustrates a top view of the pneumatic actuator of FIG. 23a in an expanded configuration.

Similarly, FIG. 23*a* illustrates a top view of a compressed configuration of bellows actuator 130 where the bellows actuator 130 substantially extend past a radial edge of constraint ribs 135 and FIG. 23*b* illustrates a top view where the bellows actuator 130 retract during inflation to extend less past the radial edge of the constraint ribs 135 in an inflated configuration of the bellows actuator 130.

Figure 24:
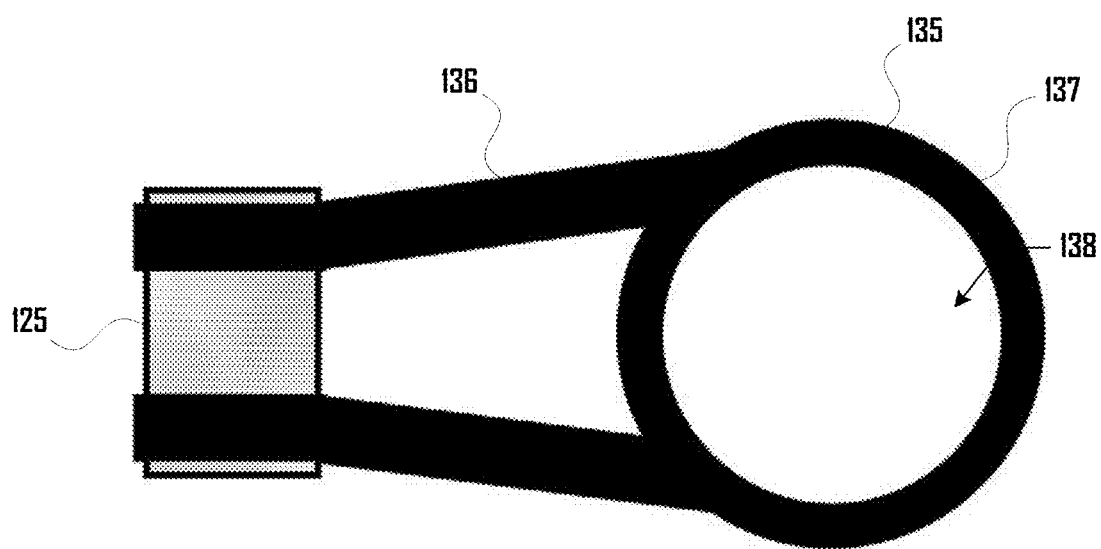
FIG. 24 illustrates a top view of a pneumatic actuator constraint rib in accordance with an embodiment.

Constraint ribs 135 can be configured in various suitable ways. For example, FIGS. 23*a*, 23*b* and 24 illustrate a top view of an example embodiment of a constraint rib 135 having a pair of rib arms 136 that extend from the joint structure 125 and couple with a circular rib ring 137 that defines a rib cavity 138 through which a portion of the bellows actuator 130 can extend (e.g., as shown in FIGS. 22*a*, 22*b*, 23*a* and 23*b*). In various examples, the one or more constraint ribs 135 can be a substantially planar element with the rib arms 136 and rib ring 137 being disposed within a common plane.

In further embodiments, the one or more constraint ribs 135 can have any other suitable configuration. For example, some embodiments can have any suitable number of rib arms 136, including one, two, three, four, five, or the like. Additionally, the rib ring 137 can have various suitable shapes and need not be circular, including one or both of an inner edge that defines the rib cavity 138 or an outer edge of the rib ring 137.

In various embodiments, the constraining ribs 135 can be configured to direct the motion of the bellows actuator 130 through a swept path about some instantaneous center (which may or may not be fixed in space) and/or to prevent motion of the bellows actuator 130 in undesired directions, such as out-of-plane buckling. As a result, the number of constraining ribs 135 included in some embodiments can vary depending on the specific geometry and loading of the leg actuator unit 110. Examples can range from one constraining rib 135 up to any suitable number of constraining ribs 135; accordingly, the number of constraining ribs 135 should not be taken to limit the applicability of the invention. Additionally, constraining ribs 135 can be absent in some embodiments.

The one or more constraining ribs 135 can be constructed in a variety of ways. For example the one or more constraining ribs 135 can vary in construction on a given leg actuator unit 110, and/or may or may not require attachment to the joint structure 125. In various embodiments, the constraining ribs 135 can be constructed as an integral component of a central rotary joint structure 125. An example embodiment of such a structure can include a mechanical rotary pin joint, where the constraining ribs 135 are connected to and can pivot about the joint 125 at one end of the joint structure 125, and are attached to an inextensible outer layer of the bellows actuator 130 at the other end. In another set of embodiments, the constraining ribs 135 can be constructed in the form of a single flexural structure that directs the motion of the bellows actuator 130 throughout the range of motion for the leg actuator unit 110. Another example embodiment uses a flexural constraining rib 135 that is not connected integrally to the joint structure 125 but is instead attached externally to a previously assembled joint structure 125. Another example embodiment can comprise the constraint ribs 135 being composed of pieces of fabric wrapped around the bellows actuator 130 and attached to the joint structure 125, acting like a hammock to restrict and/or guide the motion of the bellows actuator 130. There are additional methods available for constructing the constraining ribs 135 that can be used in additional embodiments that include but are not limited to a linkage, a rotational flexure connected around the joint structure 125, and the like.

In some examples, a design consideration for constraining ribs 135 can be how the one or more constraining ribs 135 interact with the bellows actuator 130 to guide the path of the bellows actuator 130. In various embodiments, the constraining ribs 135 can be fixed to the bellows actuator 130 at predefined locations along the length of the bellows actuator 130. One or more constraining ribs 135 can be coupled to the bellows actuator 130 in various suitable ways, including but not limited to sewing, mechanical clamps, geometric interference, direct integration, and the like. In other embodiments, the constraining ribs 135 can be configured such that the constraining ribs 135 float along the length of the bellows actuator 130 and are not fixed to the bellows actuator 130 at predetermined connection points. In some embodiments, the constraining ribs 135 can be configured to restrict a cross sectional area of the bellows actuator 130. An example embodiment can include a tubular bellows actuator 130 attached to a constraining rib 135 that has an oval cross section, which in some examples can be a configuration to reduce the width of the bellows actuator 130 at that location when the bellows actuator 130 is inflated.

The bellows actuator 130 can have various functions in some embodiments, including containing operating fluid of the leg actuator unit 110, resisting forces associated with operating pressure of the leg actuator unit 110, and the like. In various examples, the leg actuator unit 110 can operate at a fluid pressure above, below or at about ambient pressure. In various embodiments, bellows actuator 130 can comprise one or more flexible, yet inextensible or practically inextensible materials in order to resist expansion (e.g., beyond what is desired in directions other than an intended direction of force application or motion) of the bellows actuator 130 beyond what is desired when pressurized above ambient pressure. Additionally, the bellows actuator 130 can comprise an impermeable or semi-impermeable material in order to contain the actuator fluid.

Figure 26:
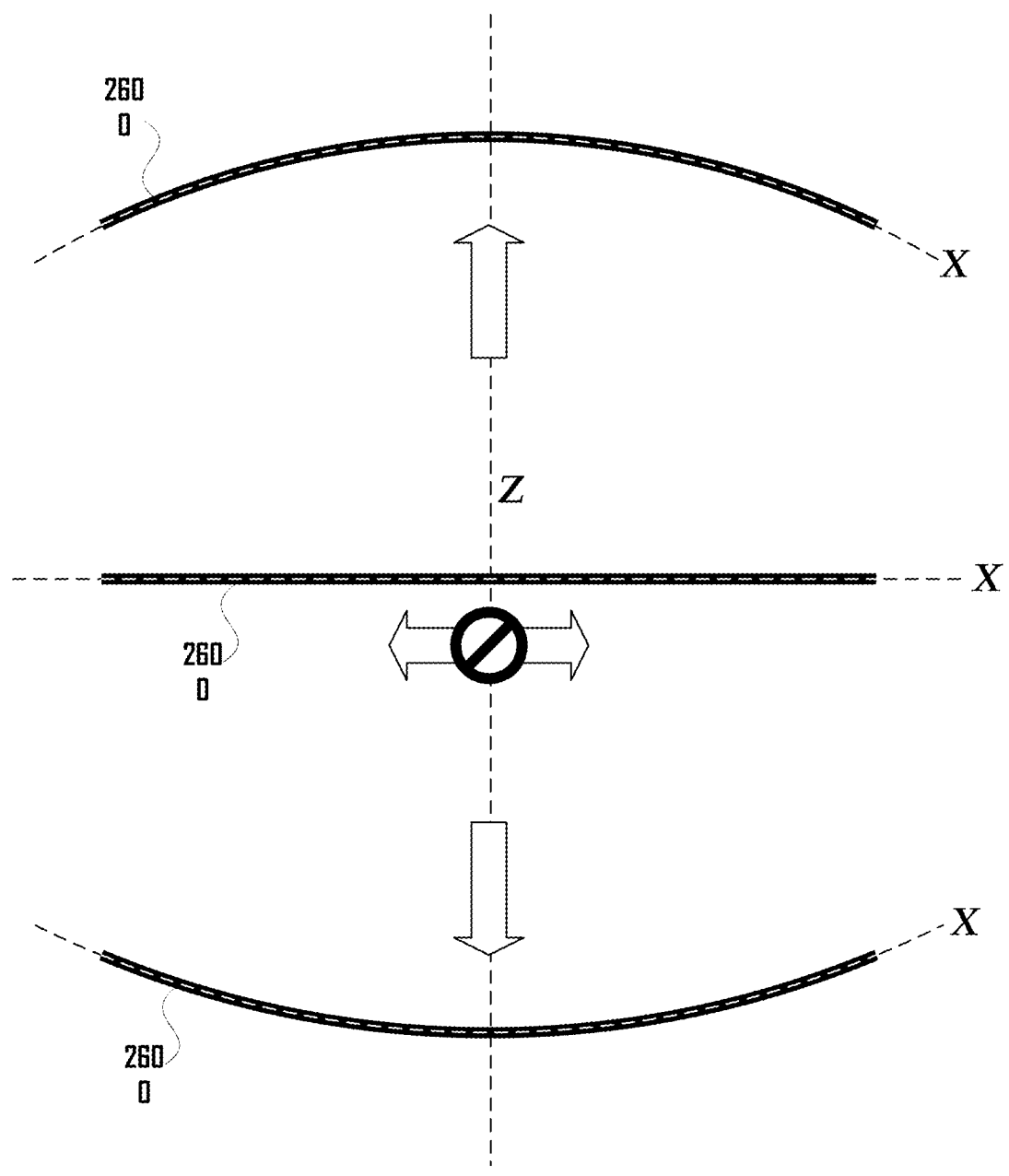
FIG. 26 illustrates an example planar material that is substantially inextensible along one or more plane axes of the planar material while being flexible in other directions.

For example, in some embodiments, the bellows actuator 130 can comprise a flexible sheet material such as woven nylon, rubber, polychloroprene, a plastic, latex, a fabric, or the like. Accordingly, in some embodiments, bellows actuator 130 can be made of a planar material that is substantially inextensible along one or more plane axes of the planar material while being flexible in other directions. For example, FIG. 26 illustrates a side view of a planar material 2600 (e.g., a fabric) that is substantially inextensible along axis X that is coincident with the plane of the material 2600, yet flexible in other directions, including axis Z. In the example of FIG. 26, the material 2600 is shown flexing upward and downward along axis Z while being inextensible along axis X. In various embodiments, the material 2600 can also be inextensible along an axis Y (not shown) that is also coincident with the plane of the material 2600 like axis X and perpendicular to axis X.

In some embodiments, the bellows actuator 130 can be made of a non-planar woven material that is inextensible along one or more axes of the material. For example, in one embodiment the bellows actuator 130 can comprise a woven fabric tube. Woven fabric material can provide inextensibility along the length of the bellows actuator 130 and in the circumferential direction. Such embodiments can still be able to be configured along the body of the user 101 to align with the axis of a desired joint on the body 101 (e.g., the knee 103).

In various embodiments, the bellows actuator 130 can develop its resulting force by using a constrained internal surface length and/or external surface length that are a constrained distance away from each other (e.g. due to an inextensible material as discussed above). In some examples, such a design can allow the actuator to contract on bellows actuator 130, but when pressurized to a certain threshold, the bellows actuator 130 can direct the forces axially by pressing on the plates 140 of the leg actuator unit 110 because there is no ability for the bellows actuator 130 to expand further in volume otherwise due to being unable to extend its length past a maximum length defined by the body of the bellows actuator 130.

In other words, the bellows actuator 130 can comprise a substantially inextensible textile envelope that defines a chamber that is made fluid-impermeable by a fluid-impermeable bladder contained in the substantially inextensible textile envelope and/or a fluid-impermeable structure incorporated into the substantially inextensible textile envelope. The substantially inextensible textile envelope can have a predetermined geometry and a non-linear equilibrium state at a displacement that provides a mechanical stop upon pressurization of the chamber to prevent excessive displacement of the substantially inextensible textile actuator.

In some embodiments, the bellows actuator 130 can include an envelope that consists or consists essentially of inextensible textiles (e.g., inextensible knits, woven, non-woven, etc.) that can prescribe various suitable movements as discussed herein. Inextensible textile bellows actuator 130 can be designed with specific equilibrium states (e.g., end states or shapes where they are stable despite increasing pressure), pressure/stiffness ratios, and motion paths. Inextensible textile bellows actuator 130 in some examples can be configured accurately delivering high forces because inextensible materials can allow greater control over directionality of the forces.

Accordingly, some embodiments of inextensible textile bellows actuator 130 can have a pre-determined geometry that produces displacement mostly via a change in the geometry between the uninflated shape and the pre-determined geometry of its equilibrium state (e.g., fully inflated shape) due to displacement of the textile envelope rather than via stretching of the textile envelope during a relative increase in pressure inside the chamber; in various embodiments, this can be achieved by using inextensible materials in the construction of the envelope of the bellows actuator 130. As discussed herein, in some examples "inextensible" or "substantially inextensible" can be defined as expansion by no more than 10%, no more than 5%, or no more than 1% in one or more direction.

Figure 25A:
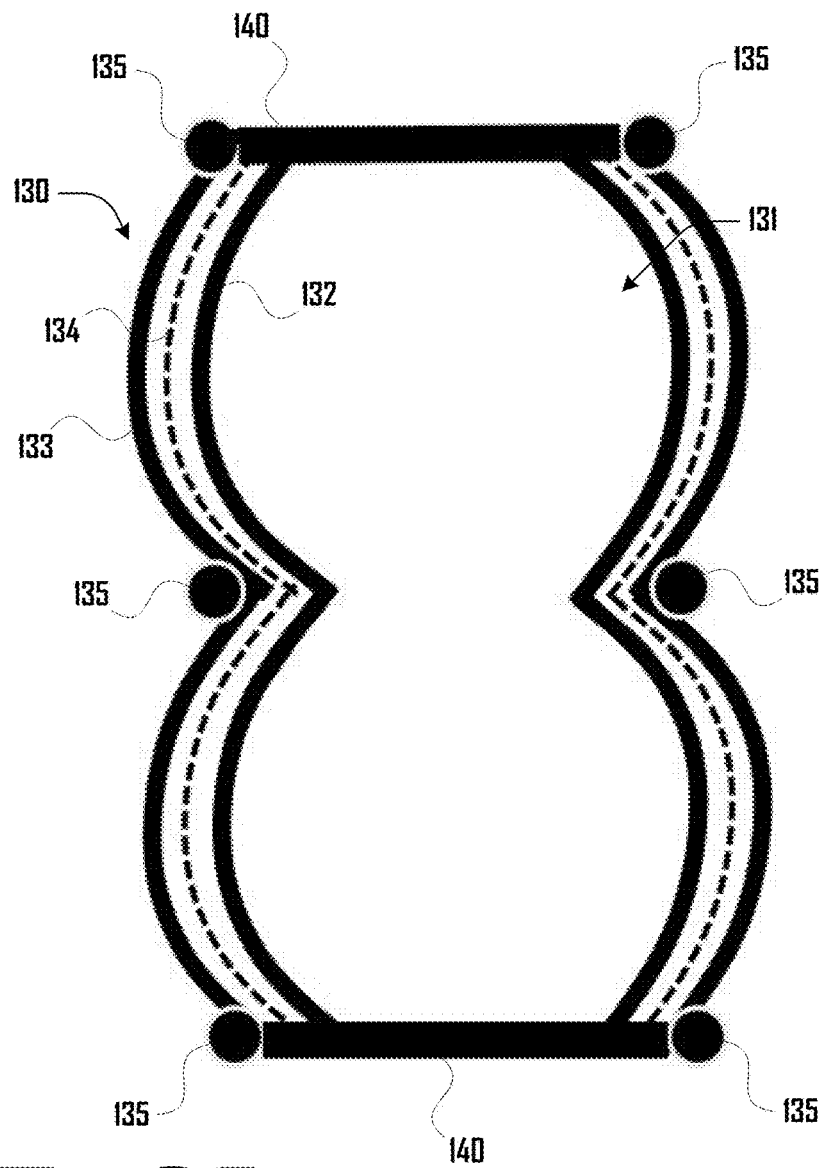
FIG. 25a illustrates a cross-sectional view of a pneumatic actuator bellows in accordance with another embodiment.
Figure 25B:
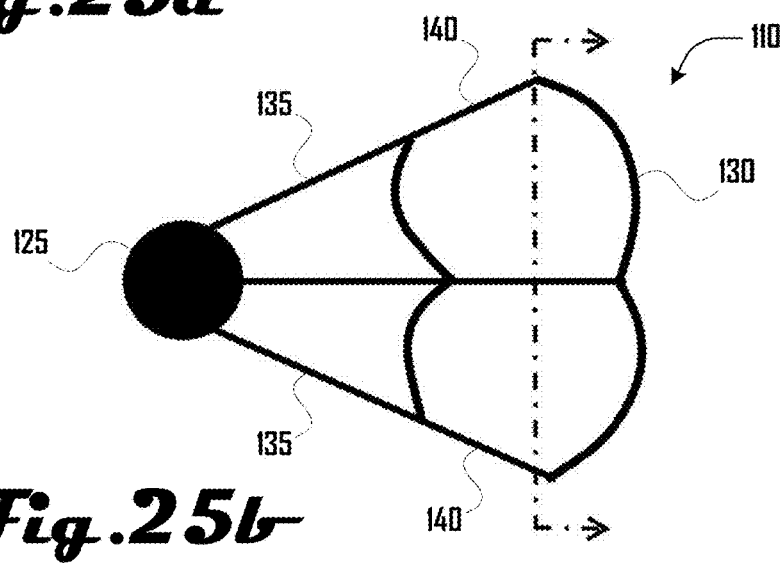

FIG. 25*a* illustrates a cross-sectional view of a pneumatic actuator unit 110 including bellows actuator 130 in accordance with another embodiment and FIG. 25*b* illustrates a side view of the pneumatic actuator unit 110 of FIG. 25*a* in an expanded configuration showing the cross section of FIG. 25*a*. As shown in FIG. 25*a*, the bellows actuator 130 can comprise an internal first layer 132 that defines the bellows cavity 131 and can comprise an outer second layer 133 with a third layer 134 disposed between the first and second layers 132, 133. Throughout this description, the use of the term "layer" to describe the construction of the bellows actuator 130 should not be viewed as limiting to the design. The use of 'layer' can refer to a variety of designs including but not limited to: a planar material sheet, a wet film, a dry film, a rubberized coating, a co-molded structure, and the like.

In some examples, the internal first layer 132 can comprise a material that is impermeable or semi-permeable to the actuator fluid (e.g., air) and the external second layer 133 can comprise an inextensible material as discussed herein. For example, as discussed herein, an impermeable layer can refer to an impermeable or semi-permeable layer and an inextensible layer can refer to an inextensible or a practically inextensible layer.

In some embodiments comprising two or more layers, the internal layer 132 can be slightly oversized compared to an inextensible outer second layer 133 such that the internal forces can be transferred to the high-strength inextensible outer second layer 133. One embodiment comprises a bellows actuator 130 with an impermeable polyurethane polymer film inner first layer 132 and a woven nylon braid as the outer second layer 133.

The bellows actuator 130 can be constructed in various suitable ways in further embodiments, which can include a single-layer design that is constructed of a material that provides both fluid impermeability and that is sufficiently inextensible. Other examples can include a complex bellows assembly that comprises multiple laminated layers that are fixed together into a single structure. In some examples, it can be necessary to limit the deflated stack height of the bellows actuator 130 to maximize the range of motion of the leg actuator unit 110. In such an example, it can be desirable to select a low-thickness fabric that meets the other performance needs of the bellows actuator 130.

In yet another embodiment, it can be desirable to reduce friction between the various layers of the bellows actuator 130. In one embodiment, this can include the integration of a third layer 134 that acts as an anti-abrasive and/or low friction intermediate layer between the first and second layers 132, 133. Other embodiments can reduce the friction between the first and second layers 132, 133 in alternative or additional ways, including but not limited to the use of a wet lubricant, a dry lubricant, or multiple layers of low friction material. Accordingly, while the example of FIG. 23*a* illustrates an example of a bellows actuator 130 comprising three layers 132, 133, 134, further embodiments can include a bellows actuator 130 having any suitable number of layers, including one, two, three, four, five, ten, fifteen, twenty five, and the like. Such one or more layers can be coupled along adjoining faces in part or in whole, with some examples defining one or more cavities between layers. In such examples, material such as lubricants or other suitable fluids can be disposed in such cavities or such cavities can be effectively empty. Additionally, as described herein, one or more layers (e.g., the third layer 134) need not be a sheet or planar material layer as shown in some examples and can instead comprise a layer defined by a fluid. For example, in some embodiments, the third layer 134 can be defined by a wet lubricant, a dry lubricant, or the like.

The inflated shape of the bellows actuator 130 can be important to the operation of the bellows actuator 130 and/or leg actuator unit 110 in some embodiments. For example, the inflated shape of the bellows actuator 130 can be affected through the design of both an impermeable and inextensible portion of the bellows actuator 130 (e.g., the first and second layer 132, 133). In various embodiments, it can be desirable to construct one or more of the layers 132, 133, 134 of the bellows actuator 130 out of various two-dimensional panels that may not be intuitive in a deflated configuration.

In some embodiments, one or more impermeable layers can be disposed within the bellows cavity 131 and/or the bellows actuator 130 can comprise a material that is capable of holding a desired fluid (e.g., a fluid impermeable first internal layer 132 as discussed herein). The bellows actuator 130 can comprise a flexible, elastic, or deformable material that is operable to expand and contract when the bellows actuator 130 are inflated or deflated as described herein. In some embodiments, the bellows actuator 130 can be biased toward a deflated configuration such that the bellows actuator 130 is elastic and tends to return to the deflated configuration when not inflated. Additionally, although bellows actuator 130 shown herein are configured to expand and/or extend when inflated with fluid, in some embodiments, bellows actuator 130 can be configured to shorten and/or retract when inflated with fluid in some examples. Also, the term "bellows" as used herein should not be construed to be limiting in any way. For example the term "bellows" as used herein should not be construed to require elements such as convolutions or other such features (although convoluted bellows actuator 130 can be present in some embodiments). As discussed herein, bellows actuator 130 can take on various suitable shapes, sizes, proportions and the like.

The bellows actuator 130 can vary significantly across various embodiments, so the present examples should not be construed to be limiting. One preferred embodiment of a bellows actuator 130 includes fabric-based pneumatic actuator configured such that it provides knee extension torque as discussed herein. Variants of this embodiment can exist to tailor the actuator to provide the desired performance characteristics of the actuators such as a fabric actuator that is not of a uniform cross-section. Other embodiments can use an electro-mechanical actuator configured to provide flexion and extension torques at the knee instead of or in addition to a fluidic bellows actuator 130. Various embodiments can include but are not limited to designs that incorporate combinations of electromechanical, hydraulic, pneumatic, electro-magnetic, or electro-static for positive power or negative power assistance of extension or flexion of a lower extremity joint.

The actuator bellows actuator 130 can also be located in a variety of locations as required by the specific design. One embodiment places the bellows actuator 130 of a powered knee brace component located in line with the axis of the knee joint and positioned parallel to the joint itself. Various embodiments include but are not limited to, actuators configured in series with the joint, actuators configured anterior to the joint, and actuators configured to rest around the joint.

Various embodiments of the bellows actuator 130 can include secondary features that augment the operation of the actuation. One such embodiment is the inclusion of user-adjustable mechanical hard end stops to limit the allowable range of motion to the bellows actuator 130. Various embodiments can include but are not limited to the following extension features: the inclusion of flexible end stops, the inclusion of an electromechanical brake, the inclusion of an electro-magnetic brake, the inclusion of a magnetic brake, the inclusion of a mechanical disengage switch to mechanically decouple the joint from the actuator, or the inclusion of a quick release to allow for quick changing of actuator components.

In various embodiments, the bellows actuator 130 can comprise a bellows and/or bellows system as described in related U.S. patent application Ser. No. 14/064,071 filed Oct. 25, 2013, which issued as U.S. Pat. No. 9,821,475; as described in U.S. patent application Ser. No. 14/064,072 filed Oct. 25, 2013; as described in U.S. patent application Ser. No. 15/823,523 filed Nov. 27, 2017; or as described in U.S. patent application Ser. No. 15/472,740 filed Mar. 29, 2017.

In some applications, the design of the fluidic actuator unit 110 can be adjusted to expand its capabilities. One example of such a modification can be made to tailor the torque profile of a rotary configuration of the fluidic actuator unit 110 such that the torque changes as a function of the angle of the joint structure 125. To accomplish this in some examples, the cross-section of the bellows actuator 130 can be manipulated to enforce a desired torque profile of the overall fluidic actuator unit 110. In one embodiment, the diameter of the bellows actuator 130 can be reduced at a longitudinal center of the bellows actuator 130 to reduce the overall force capabilities at the full extension of the bellows actuator 130. In yet another embodiment, the cross-sectional areas of the bellows actuator 130 can be modified to induce a desired buckling behavior such that the bellows actuator 130 does not get into an undesirable configuration. In an example embodiment, the end configurations of the bellows actuator 130 of a rotary configuration can have the area of the ends reduced slightly from the nominal diameter to provide for the end portions of the bellows actuator 130 to buckle under loading until the actuator unit 110 extends beyond a predetermined joint angle, at which point the smaller diameter end portion of the bellows actuator 130 would begin to inflate.

In other embodiments, this same capability can be developed by modifying the behavior of the constraining ribs 135. As an example embodiment, using the same example bellows actuator 130 as discussed in the previous embodiment, two constraining ribs 135 can fixed to such bellows actuator 130 at evenly distributed locations along the length of the bellows actuator 130. In some examples, a goal of resisting a partially inflated buckling can be combated by allowing the bellows actuator 130 to close in a controlled manner as the actuator unit 110 closes. The constraining ribs 135 can be allowed to get closer to the joint structure 125 but not closer to each other until they have bottomed out against the joint structure 125. This can allow the center portion of the bellows actuator 130 to remain in a fully inflated state which can be the strongest configuration of the bellows actuator 130 in some examples.

In further embodiments, it can be desirable to optimize the fiber angle of the individual braid or weave of the bellows actuator 130 in order to tailor specific performance characteristics of the bellows actuator 130 (e.g., in an example where a bellows actuator 130 includes inextensibility provided by a braided or woven fabric). In other embodiments, the geometry of the bellows actuator 130 of the actuator unit 110 can be manipulated to allow the robotic exoskeleton system 100 to operate with different characteristics. Example methods for such modification can include but are not limited to the following: the use of smart materials on the bellows actuator 130 to manipulate the mechanical behavior of the bellows actuator 130 on command; or the mechanical modification of the geometry of the bellows actuator 130 through means such as shortening the operating length and/or reducing the cross sectional area of the bellows actuator 130.

In further examples, a fluidic actuator unit 110 can comprise a single bellows actuator 130 or a combination of multiple bellows actuator 130, each with its own composition, structure, and geometry. For example, some embodiments can include multiple bellows actuator 130 disposed in parallel or concentrically on the same joint assembly 125 that can be engaged as needed. In one example embodiment, a joint assembly 125 can be configured to have two bellows actuator 130 disposed in parallel directly next to each other. The exoskeleton system 100 can selectively choose to engage each bellows actuator 130 as needed to allow for various amounts of force to be output by the same fluidic actuator unit 110 in a desirable mechanical configuration.

In further embodiments, a fluidic actuator unit 110 can include various suitable sensors to measure mechanical properties of the bellows actuator 130 or other portions of the fluidic actuator unit 110 that can be used to directly or indirectly estimate pressure, force, or strain in the bellows actuator 130 or other portions of the fluidic actuator unit 110. In some examples, sensors located at the fluidic actuator unit 110 can be desirable due to the difficulty in some embodiments associated with the integration of certain sensors into a desirable mechanical configuration while others may be more suitable. Such sensors at the fluidic actuator unit 110 can be operably connected to the exoskeleton device 610 (see FIG. 7) and the exoskeleton device 610 can use data from such sensors at the fluidic actuator unit 110 to control the exoskeleton system 100.

As discussed herein, various suitable exoskeleton systems 100 can be used in various suitable ways and for various suitable applications. However, such examples should not be construed to be limiting on the wide variety of exoskeleton systems 100 or portions thereof that are within the scope and spirit of the present disclosure. Accordingly, exoskeleton systems 100 that are more or less complex than the examples of FIGS. 1-5 are within the scope of the present disclosure.

Additionally, while various examples relate to an exoskeleton system 100 associated with the legs or lower body of a user, further examples can be related to any suitable portion of a user body including the torso, arms, head, legs, or the like. Also, while various examples relate to exoskeletons, it should be clear that the present disclosure can be applied to other similar types of technology, including prosthetics, body implants, robots, or the like. Further, while some examples can relate to human users, other examples can relate to animal users, robot users, various forms of machinery, or the like.

The described embodiments are susceptible to various modifications and alternative forms, and specific examples thereof have been shown by way of example in the drawings and are herein described in detail. It should be understood, however, that the described embodiments are not to be limited to the particular forms or methods disclosed, but to the contrary, the present disclosure is to cover all modifications, equivalents, and alternatives. Additionally, elements of a given embodiment should not be construed to be applicable to only that example embodiment and therefore elements of one example embodiment can be applicable to other embodiments. Additionally, elements that are specifically shown in example embodiments should be construed to cover embodiments that comprise, consist essentially of, or consist of such elements, or such elements can be explicitly absent from further embodiments. Accordingly, the recitation of an element being present in one example should be construed to support some embodiments where such an element is explicitly absent.

What is claimed is:

1. An exoskeleton system comprising:
a left leg actuator unit and a right leg actuator unit configured to be respectively coupled to a left leg and a right leg of a user, the left leg actuator unit and the right leg actuator unit each including:
an upper arm and a lower arm that are rotatably coupled via a joint, the joint configured to be positioned at a knee of the user with the upper arm configured to be coupled about an upper leg portion of the user above the knee and with the lower arm configured to be coupled about a lower leg portion of the user below the knee,
a leg-actuator-unit user interface comprising a plurality of input and feedback elements,
a bellows actuator that extends between the upper arm and the lower arm, and
one or more sets of fluid lines coupled to the bellows actuator to introduce fluid to the bellows actuator to cause the bellows actuator to expand and move the upper arm and the lower arm;
a pneumatic system operably coupled to, and configured to introduce fluid to, the bellows actuators of the left leg actuator unit and the right leg actuator unit via the one or more sets of fluid lines of the left leg actuator unit and the right leg actuator unit;
an exoskeleton device that includes a processor and memory, the memory storing instructions, that when executed by the processor, are configured to control the pneumatic system to introduce fluid to the bellows actuators of the left leg actuator unit and the right leg actuator unit; and
a shoulder-mounted backpack configured to be worn by the user that houses:
a power source for powering the pneumatic system and for powering the exoskeleton device,
at least a portion of the pneumatic system, and
at least a portion of the exoskeleton device,
the shoulder-mounted backpack further including a pack user interface associated therewith, the pack user interface comprising a set of input elements and feedback elements, the pack user interface being disposed on a shoulder strap of the shoulder-mounted backpack and configured to be disposed over the user's chest and proximate to the user's shoulder with a communication line of the pack user interface configured to extend along the shoulder strap and over the user's shoulder, the pack user interface comprising:
a unitary function button configured to allow the user to indicate one or more inputs, including one or more of:
input for unsupervised intent recognition,
input for supervised intent recognition,
input for semi-supervised intent recognition, or
enabling and disabling a functionality, and
a selection indicator button configured to allow the user to generate an input for one or more of:
increasing or decreasing one or more settings, or
cycling through a group of settings,
wherein the exoskeleton system is configured to be independently operated by the user, including at least activating the exoskeleton system and using the exoskeleton system to assist with leg extension, and wherein the exoskeleton system is configured to support the user in moving, including at least using the exoskeleton system to assist with leg extension, via physical force generated by the exoskeleton system including at least via the pneumatic system introducing fluid to the bellows actuators of the left leg actuator unit and the right leg actuator unit via the one or more sets of fluid lines of the left leg actuator unit and the right leg actuator unit.

2. The exoskeleton system of claim 1, wherein an external device that comprises a smartphone is operably coupled to the exoskeleton system via a direct or indirect wired or wireless communication channel, the external device presenting an external-device user interface that is separate from the leg-actuator-unit user interface of the left leg actuator unit or the right leg actuator unit and separate from the pack user interface associated with the shoulder-mounted backpack.

3. The exoskeleton system of claim 1, wherein the leg-actuator-unit user interfaces of each of the left leg actuator unit and the right leg actuator unit have a set of redundant input elements and a set of redundant feedback elements, the redundant input elements the left leg actuator unit and the right leg actuator unit each associated with the same function, and each of the redundant feedback elements of the left leg actuator unit and the right leg actuator unit configured to present the same feedback.

4. The exoskeleton system of claim 3, wherein the exoskeleton system is configured to operate in a dual-leg configuration where both of the left leg actuator unit and the right leg actuator unit are operably coupled to the exoskeleton system, with the exoskeleton system configured to obtain input and present feedback via each of the leg-actuator-unit user interfaces of the left leg actuator unit and the right leg actuator unit and/or the pack user interface, and
wherein the exoskeleton system is configured to operate in a single-leg configuration where only one of the left leg actuator unit and the right leg actuator unit is operably coupled to the exoskeleton system, with the exoskeleton system configured to obtain input and present feedback via the leg-actuator-unit user interface of the left leg actuator unit or the right leg actuator unit operably coupled to the exoskeleton system and/or the pack user interface.

5. The exoskeleton system of claim 1, wherein each of the leg-actuator-unit user interfaces of the left leg actuator unit and the right leg actuator unit and the pack user interface associated with the shoulder-mounted backpack include one or more of:
a first feedback element comprising a plurality of lights, wherein a number of lit lights of the plurality of lights indicates a battery level of one or more batteries of the exoskeleton system or an assistance level of the exoskeleton system, a color of lit lights of the plurality of lights indicates a currently set mode of operation of the exoskeleton system, and a set of lights of the plurality of lights being lit red indicating that an error or fault is present, a second feedback element comprising a screen;
a third feedback element comprising an audio speaker or noise maker;
a fourth feedback element comprising a vibratory element such as a motor or piezo;
a first input element comprising a single button for indicating an intention to make a state transition;
a second input element comprising a button mapped to a single transition and state pair;
a third input element comprising a dedicated button that immediately stops positive torque transmission to the left leg actuator unit and the right leg actuator unit,
a fourth input element comprising a button associated with a quick-doff feature that is configured to cause a plurality of couplings of at least one of the left leg actuator unit and the right leg actuator unit to decouple and cause at least one of the left leg actuator unit and the right leg actuator unit to be decoupled from the user;
a fifth input element comprising a touch-screen;
a sixth input element comprising a button that disconnects electrical power to the exoskeleton system;
a seventh input element comprising a button that disconnects pneumatic power between the shoulder-mounted backpack and either or both of the left leg actuator unit and the right leg actuator unit; and
an eighth input element comprising a button that shuts off all visible lights of the exoskeleton system.

6. The exoskeleton system of claim 1, wherein the unitary function button is disposed on a front face of a housing of the pack user interface and wherein the selection indicator button is disposed on a side face of the housing of the pack user interface.

7. The exoskeleton system of claim 1, wherein the unitary function button is configured for enabling and/or disabling the functionality which comprises:
when the exoskeleton system is active, pushing the unitary function button is configured to generate a deactivate response that deactivates the exoskeleton system, immediately stopping any fluid flow to the left leg actuator unit and the right leg actuator unit from the pneumatic system.

* * * * *